(12) United States Patent
Fischer et al.

(10) Patent No.: US 7,692,532 B2
(45) Date of Patent: Apr. 6, 2010

(54) INTERFERENCE MONITORING IN AN RFID SYSTEM

(75) Inventors: Jeffrey H. Fischer, Boston, MA (US);
David J. Husak, Windham, NH (US);
Pattabhiraman Krishna, Westborough, MA (US)

(73) Assignee: Reva Systems Corporation, Chelmsford, MA (US)

( * ) Notice: Subject to any disclaimer, the term of this patent is extended or adjusted under 35 U.S.C. 154(b) by 1285 days.

(21) Appl. No.: 11/194,145

(22) Filed: Jul. 29, 2005

(65) Prior Publication Data

US 2006/0022815 A1 Feb. 2, 2006

Related U.S. Application Data

(60) Provisional application No. 60/592,933, filed on Jul. 30, 2004.

(51) Int. Cl.
*H04Q 5/22* (2006.01)
*G08B 13/14* (2006.01)
*G08C 19/00* (2006.01)

(52) U.S. Cl. .............. 340/10.2; 340/10.31; 340/572.1; 340/825.69; 340/505; 455/41.2

(58) Field of Classification Search ............... 340/10.2, 340/10.31, 572, 825.69, 505, 539; 370/314; 708/250, 255; 455/41.2
See application file for complete search history.

(56) References Cited

U.S. PATENT DOCUMENTS

| | | | |
|---|---|---|---|
| 4,636,950 A | 1/1987 | Caswell et al. | |
| 6,011,597 A | 1/2000 | Kubo | 348/725 |
| 6,150,921 A | 11/2000 | Werb et al. | 340/10.1 |
| 6,177,861 B1 | 1/2001 | MacLellan et al. | 340/10.1 |
| 6,480,108 B2 * | 11/2002 | McDonald | 340/505 |
| 6,501,807 B1 * | 12/2002 | Chieu et al. | 375/329 |
| 6,566,997 B1 * | 5/2003 | Bradin | 340/10.2 |
| 6,608,551 B1 | 8/2003 | Anderson et al. | 340/10.1 |
| 6,714,121 B1 | 3/2004 | Moore | 340/10.3 |
| 6,724,308 B2 | 4/2004 | Nicholson | 340/572.1 |
| 6,784,789 B2 | 8/2004 | Eroglu et al. | 340/10.6 |

(Continued)

FOREIGN PATENT DOCUMENTS

EP 1 727 042 A1 11/2006

(Continued)

OTHER PUBLICATIONS

"Passive RFID Basics" Pete Sorrells, © 1998 Microchip Technology Inc.

*Primary Examiner*—Brian A Zimmerman
*Assistant Examiner*—Nam V Nguyen
(74) *Attorney, Agent, or Firm*—Weingarten, Schurgin, Gagnebin & Lebovici LLP

(57) ABSTRACT

A system and method for monitoring and characterizing various sources of RF interference within an RFID environment, and for adjusting the operational characteristics of an array of RFID readers within the system based on these interference characterizations. The system examines the received transmissions from readers in the network by controlling a calibration cycle or while they are operating as interrogators to determine interference parameters, and to verify the operation of the readers in the array. The system also examines outside sources of interference, and signal dependent interference. The interference characterization can also be estimated from a combination of calculations and co-monitoring.

75 Claims, 27 Drawing Sheets

U.S. PATENT DOCUMENTS

| | | |
|---|---|---|
| 6,804,537 B1 | 10/2004 | Fujii |
| 6,828,902 B2 | 12/2004 | Casden ...................... 340/10.3 |
| 6,860,422 B2 * | 3/2005 | Hull et al. ................... 235/376 |
| 7,039,359 B2 * | 5/2006 | Martinez ................... 455/41.2 |
| 7,132,948 B2 | 11/2006 | Sweeney, II |
| 7,253,717 B2 * | 8/2007 | Armstrong et al. ......... 340/10.2 |
| 7,256,682 B2 | 8/2007 | Sweeney, II |
| 7,298,270 B2 | 11/2007 | Ishiguro et al. |
| 7,411,921 B2 * | 8/2008 | Strong et al. ................ 370/328 |
| 7,416,122 B2 | 8/2008 | Sato |
| 7,463,142 B2 * | 12/2008 | Lindsay ................ 340/539.12 |
| 2005/0109844 A1 | 5/2005 | Hilliard |
| 2005/0154570 A1 | 7/2005 | Sweeney |
| 2005/0154572 A1 | 7/2005 | Sweeney, II |
| 2005/0222999 A1 | 10/2005 | Nihei |
| 2005/0231370 A1 | 10/2005 | Tagato |
| 2005/0237157 A1 | 10/2005 | Cooper et al. .............. 340/10.2 |
| 2006/0049944 A1 | 3/2006 | Ishiguro et al. |
| 2006/0082444 A1 | 4/2006 | Sweeney, II et al. |
| 2006/0158313 A1 | 7/2006 | Satou |
| 2006/0175407 A1 | 8/2006 | Kinoshita |
| 2008/0022290 A1 | 1/2008 | Ochiai et al. |
| 2008/0234862 A1 | 9/2008 | Funada et al. |
| 2008/0250117 A1 | 10/2008 | Nihei |

FOREIGN PATENT DOCUMENTS

WO    WO 2006/109700 A1    10/2006

* cited by examiner

| Co-Interrogation | | | | | |
|---|---|---|---|---|---|
|  | R1 | R2 | R3 | R4 | R5 |
| R1 |  | 1 | 1 | 0 | 0 |
| R2 | 1 |  | 1 | 0 | 0 |
| R3 | 1 | 1 |  | 1 | 0 |
| R4 | 0 | 0 | 1 |  | 0 |
| R5 | 0 | 0 | 0 | 0 |  |

*Fig. 8*

| Segment Resolution | | | | | |
|---|---|---|---|---|---|
|  | R1 | R2 | R3 | R4 | R5 |
| A | 1 | 0 | 0 | X | X |
| B | 1 | 1 | 0 | X | X |
| C | 0 | 1 | 0 | X | X |
| D | 1 | 1 | 1 | X | X |
| E | 0 | 1 | 0 | 0 | X |
| F | 0 | 1 | 1 | 0 | X |
| G | 0 | 0 | 1 | 0 | X |
| H | X | X | 1 | 1 | X |
| J | X | X | 0 | 1 | X |
| K | X | X | X | X | 1 |

*Fig. 9*

INTERFERENCE MONITORING IN AN RFID SYSTEM

CROSS REFERENCE TO RELATED APPLICATIONS

This application claims benefit of U.S. Provisional patent application Ser. No. 60/592,933 filed Jul. 30, 2004 entitled ACCESSING RFID TAG DATA USING A READER ARRAY.

STATEMENT REGARDING FEDERALLY SPONSORED RESEARCH OR DEVELOPMENT

N/A

BACKGROUND OF THE INVENTION

The present invention relates generally to radio frequency identification (RFID) systems, and more specifically to a system and method of performing interference monitoring in an RFID system.

In recent years, radio frequency identification (RFID) systems have been employed in an ever increasing range of applications. For example, RFID systems have been used in supply chain management applications to identify and track merchandise throughout manufacture, warehouse storage, transportation, distribution, and retail sale. RFID systems have also been used in security applications to identify and track personnel for controlling access to restricted areas of buildings and plant facilities, thereby prohibiting access to such areas by individuals without the required authorization. Accordingly, RFID systems have been increasingly employed in diverse applications to facilitate the identification and tracking of merchandise, personnel, and other items and/or individuals that need to be reliably monitored and/or controlled within a particular environment.

A conventional RFID system typically includes at least one RFID transponder or tag, at least one RFID reader, and at least one controller or host computer. For example, in a manufacturing environment, RFID tags can be attached to selected items of manufacture or equipment, and at least one RFID reader can be deployed in the environment to interrogate the tags as the tagged items pass predefined points on the manufacturing floor. In a typical mode of operation, the reader transmits a radio frequency (RF) signal in the direction of a tag, which responds to the transmitted RF signal with another RF signal containing information identifying the item to which the tag is attached, and possibly other data acquired during the manufacture of the item. The tag may also include at least one integrated transducer or environmental sensor for providing data such as the temperature or humidity level of the ambient environment. The reader receives the information and data transmitted by the tag, and provides the tag data to the host computer for subsequent processing. In this typical operating mode, the reader can be configured as a peripheral connected to a serial port of the host computer.

More recently, RFID readers have been developed that are capable of being connected via a communications network to enterprise computer resources running one or more RFID-enabled client software applications. Such readers have been deployed in complex systems including many readers (e.g., greater than 10) connected via one or more communications networks to a number of host computers, which may be part of an enterprise network server. Such host computers can run client applications for processing tag data to control access to building and plant facilities, the movement of personnel and property, the operation of lighting/heating/ventilation/air conditioning facilities, and/or other diverse functions.

Whether implemented as computer peripherals or networked devices, conventional RFID readers generally collect data from RFID tags much like optical barcode readers collect data from barcode labels. However, whereas an optical barcode reader typically requires a direct line of sight to a barcode label to read the data imprinted on the label, the RF signals employed by the typical RFID reader can penetrate through and/or diffract around objects obstructing an RFID tag from the RF field of view of the reader, thereby allowing the reader to access data from a tag that, for example, might be buried beneath one or more boxes of merchandise. In addition, unlike the optical barcode reader, the conventional RFID reader can operate on and distinguish between multiple RFID tags within the field of the reader.

In the conventional RFID system, each RFID tag typically includes a small antenna operatively connected to a microchip. For example, in the UHF band, the tag antenna can be just several inches long and can be implemented with conductive ink or etched in thin metal foil on a substrate of the microchip. Further, each tag can be an active tag powered by a durable power source such as an internal battery, or a passive tag powered by inductive coupling, receiving induced power from RF signals transmitted by an RFID reader. For example, an RFID reader may transmit a continuous unmodulated RF signal (i.e., a continuous wave, CW) or carrier signal for a predetermined minimum period of time to power a passive tag. The volume of space within which a reader can deliver adequate power to a passive tag is known as the power coupling zone of the reader. The internal battery of active tags may be employed to power integrated environmental sensors, and to maintain data and state information dynamically in an embedded memory of the tag. Because passive tags do not have a durable power source, they do not include active semiconductor circuitry and must therefore maintain data and state information statically within its embedded memory. In addition, passive tags have an essentially unlimited life span, while the life span of active tags is typically limited by the lifetime of the internal battery, which in some implementations may be replaceable.

In conventional RFID systems that employ passive tags, each RFID reader typically follows a predefined sequence or protocol to interrogate and retrieve data from one or more RFID tags within the RF field of the reader (also known as the interrogation zone of the reader). It is noted that the interrogation zone of a reader is generally determined by the physical positioning and orientation of the reader relative to the tags, and the setting of various parameters (e.g., the transmit power) employed by the reader during the interrogation sequence. In systems employing passive tags, the interrogation zone is typically defined by the power coupling zone. For example, a typical interrogation sequence performed by an RFID reader includes transmitting a CW to one or more passive tags within the reader's interrogation zone to power the tags, and transmitting a message packet (e.g., a request or command) by modulating the carrier signal. The passive tag then reads the message packet while tapping some of the energy of the CW to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the CW, and reflects a portion of the modulated wave back to the reader by changing the reflection characteristics of its antenna via a technique known as backscatter modulation. In the event the interrogation sequence is employed in a system including active tags, the target active tag generates and transmits an appropriate response to the reader.

During the typical interrogation sequence described above, the reader is tuned to detect changes in the small signals reflected from the antennae of the passive tags, or to receive the responses generated and transmitted by the active tags. In the event the reader detects changes in signal reflections or receives responses from more than one tag in response to a message packet, the reader refines the identification (e.g., the address) of the target of the message in an iterative manner until only one tag provides data or information in response to the request or command contained within the packet. For example, the tag address may be an electronic product code (EPC). This process of iterative refinement of the communication between an RFID reader and a selected one of a plurality of RFID tags within the reader's interrogation zone is known as singulation. Conventional singulation algorithms typically employ techniques similar to binary tree searches or randomized transmission delay techniques.

After the reader has confirmed the presence of and received data from the targeted tag, it may send another message packet to a next tag until all of the tags within its interrogation zone have been addressed. It is noted that some conventional interrogation protocols allow the creation of alias addresses for tags so that the reader is not required to transmit the actual tag address, which may carry private information. For example, a tag can indicate to the reader how its alias tag address is related to its actual tag address via the backscatter transmission. Further, the relationship between the alias address and the actual address can change each time the reader addresses that tag. The reader then typically sends the data provided by the tags to the host computer for subsequent processing.

However, the conventional RFID systems described above have a number of drawbacks. For example, in the event the system employs a single RFID reader, various factors such as (1) multi-path signal reflections from items, individuals, and/or other tags in the vicinity of a targeted tag, (2) dielectric loading of the tag antenna caused by the item or individual to which the tag is attached, and (3) shadowing of the RF signal transmitted by the reader caused by shielding and/or absorbing material near the tag, may prevent the single reader from successfully addressing and accessing data from each tag within its interrogation zone. The ability of an RFID reader to address RFID tags that may be at least partially obscured within its interrogation zone is known as the penetration ability of the reader. For an RFID system that includes a single RFID reader, the penetration ability of the reader is typically limited by the reader's maximum transmit power.

In addition, the interrogation zone of an RFID reader often changes depending upon the RF signal propagation characteristics in the environment in which the reader is deployed. It may therefore be virtually impossible to infer the actual interrogation zone of the reader directly from the reader's transmission and reception settings and the transmission/reception capabilities of the tags. For example, a particular transmitter setting of an RFID reader may result in significantly different qualities of reception for two different RFID tags disposed in substantially the same location. Moreover, the interrogation zone of an RFID reader often fails to match the space that needs to be monitored in the RFID application.

In addition, the conventional RFID system employing a single RFID reader is generally incapable of determining the location and/or direction of a moving RFID tag with precision. As described above, RFID systems have been used to identify and track merchandise, equipment, or personnel within a particular environment. Further, the tags attached to these items or individuals may be mobile or stationary, i.e., moving or disposed at fixed locations in the environment. For example, in the event an RFID tag is attached to a forklift truck at a warehouse storage facility, a single RFID reader may be unable to determine whether the forklift is leaving or entering the facility at it passes the reader, which may be disposed at a dock bay. For this reason, a single RFID reader is often accompanied by one or more photoelectric (electric eye) detectors for determining the location and/or direction of movement of mobile tags. It is noted that an RFID reader can also be mobile (e.g., the reader may be a hand-held device or mounted to a vehicle) or stationary (e.g., the reader may be attached to a door, a wall, shelving, scaffolding, etc.).

Conventional RFID systems that employ multiple RFID readers also have drawbacks. Such systems have included tens to hundreds of RFID readers and/or other input/output devices connected to a communications network controlled by tens to hundreds of host computers running specialized client applications. Such systems are frequently employed in applications that require many readers to perform tag monitoring within a relatively large space, to provide adequate resolution for determining the physical locations of tags within the designated space, and/or to provide frequent or continuous operation as tagged items or individuals move briskly through the interrogation zones of the readers.

However, such dense deployments of RFID readers are problematic due to RF interference and potentially conflicting channel assignments of the readers. For example, the space within which the transmissions of a first reader may interfere with the reception of a second RFID reader operating on the same channel as the first reader can be greater than the interrogation zones of the respective readers. Significant RF interference may also occur when readers operate on adjacent channels. Even if multiple readers operate on channels sufficiently far apart to avoid reader-to-reader interference, reader-to-tag interference may still occur since RFID tags are broadband devices capable of receiving RF transmissions from more than one reader at a time, which can confuse the tag circuitry.

In addition, when multiple RFID readers are deployed within a conventional RFID system, the system is typically incapable of successfully coordinating the operation of the readers. Further, each of the multiple readers is limited in time and frequency usage to the transaction paradigms typically employed by conventional standalone readers. For example, each reader may only have access to its own information, and may therefore be unable to react to events detected by the other readers within the system. As a result, the multiple readers are generally incapable of managing the large amount of potentially redundant information collected by the readers from the same group of tags within the same environment over an extended period of time. Further, such conventional systems are generally unable to discriminate between significant events and essentially meaningless movements of items and/or individuals within the RFID environment. Moreover, such conventional systems are generally incapable of keeping track of the various locations and functions of the many readers deployed within the environment, and assuring that all of the readers within the system are properly maintained and operational.

It would therefore be desirable to have an improved system and method of accessing RFID tag data within an RFID environment. Such a system and method would have the capability of identifying and tracking tagged merchandise, personnel, and other items and/or individuals within an RFID environment with increased reliability. It would also be desirable to have a system and method of monitoring and characterizing the various sources of interference within an RFID environment, and adjusting the operational characteristics of RFID readers within the system based on these interference characterizations, thereby assuring that all of the readers within the system operate properly.

BRIEF SUMMARY OF THE INVENTION

In accordance with the present invention, a system and method is provided for monitoring and characterizing various sources of RF interference within an RFID environment, and for adjusting the operational characteristics of RFID readers within the system based on the interference characterizations, thereby assuring that all of the readers within the system operate properly. The RFID system includes a plurality of RFID readers, each reader being operable to transmit and receive RF signals for interrogating at least one RFID tag, and for receiving tag data in response to the interrogation of the tag.

In one embodiment, the RFID system is operative to determine a presence of RF interference between the plurality of readers while at least one of the readers performs tag interrogation operations. To that end, a first RFID reader interrogates by transmitting a first RF signal on a first frequency channel. At least one second RFID reader then receives the first RF signal, which is representative of RF interference occurring between the first and second readers while the first reader transmits the first signal, and is a function of the difference of the first and second frequency channels. Next, a first level associated with the first signal received by the second reader is measured. In the event the first level is greater than a threshold level that is specified or is a function of other signals in the system, the second reader recognizes that the frequency channel relationship is such that there will be an interference problem if the readers attempt to perform interrogation operations at the same time. The second reader may check another frequency channel for the interference level. The receiving, measuring, and transmitting steps are then repeated until the interference characteristics of the RF link between the readers are determined.

Additionally, the RFID system is operative to determine an operational status of at least one of the plurality of readers. To that end, a first RFID reader transmits a first RF signal on a first frequency channel. Next, a second RFID reader receives the first signal on the first channel at a first angle of signal reception, and a third RFID reader receives the first signal on the first channel at a second angle of signal reception. First and second power levels associated with the first signal received by the second and third readers at the first and second angles of signal reception, respectively, are then measured, and this is repeated across the available bandwidth to factor out multi-path effects. Next, a baseline power profile is generated using the first and second power levels associated with the first signal received at the first and second angles of signal reception, respectively. The transmitting, first and second receiving, measuring, and generating steps are then repeated to generate a second power profile. Next, the second power profile is compared to the baseline power profile, and the operational status of the first reader is determined based on the comparison of the second power profile to the baseline power profile.

The RFID system may also characterize RF interference within an environment in which the plurality of readers is deployed. To that end, a plurality of RF signals are received on a plurality of frequency channels by a plurality of RFID readers. The plurality of channels define a frequency band, and the plurality of received signals is representative of RF interference within the environment. Next, the plurality of RF signals is sampled over a specified time interval to obtain a plurality of time domain signal samples, which are subsequently transformed to corresponding frequency domain information. The RF interference in the time and frequency domains is then characterized using the plurality of time domain signal samples and the corresponding frequency domain information.

The RFID system may also determine the presence of signal dependent RF interference associated with at least one of the plurality of RFID readers within the environment. To that end, a first RFID reader transmits a burst of continuous sine wave (CW). Next, an RF signal is received by the first RFID reader in response to the transmission of the CW by the first reader. The RF signal is filtered by a variable sub-carrier filter to obtain a plurality of filtered versions of the received signal, in which each filtered version of the received signal corresponds to a respective sub-carrier frequency. A power level associated with each filtered version of the received signal is then measured, thereby obtaining power level measurements of the received RF signal across the respective sub-carrier frequencies. Finally, the power level measurements of the received RF signal are analyzed across the respective sub-carrier frequencies to determine the presence of signal dependent RF interference associated with the first reader. This information is used to coordinate the backscatter sub-carrier frequencies each reader instructs RFID tags to use.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 8 is a co-interrogation matrix employed in the example illustrated in FIG. 7;

FIG. 9 is a segment resolution matrix employed in the example illustrated in FIG. 7;

FIGS. 18a-18b are diagrams of power profiles associated with RF signal responses received by the RFID reader of FIG. 17a;

FIGS. 19b-19c are block diagrams of two techniques of combining power measurements provided by the respective RFID readers of FIG. 19a;

DETAILED DESCRIPTION OF THE INVENTION

The disclosure of U.S. Provisional Patent Application No. 60/592,933 filed Jul. 30, 2004 entitled ACCESSING RFID TAG DATA USING A READER ARRAY is incorporated herein by reference.

A system and method of accessing radio frequency identification (RFID) tag data is disclosed that provides enhanced coordination of multiple RFID readers with respect to frequency, time, space, and transmit power. The presently disclosed system employs at least one mid-level processing component disposed between the multiple readers and at least one host computer running client software applications. The mid-level processing component effectively transforms the operation of the RFID readers from an aggregated but essentially autonomous operating mode to a highly coordinated operating mode, in which the respective readers effectively function as elements of an RFID reader array. A system and method is also disclosed for monitoring and characterizing various sources of RF interference within an RFID environment, and for adjusting the operational characteristics of RFID readers within the system based on these interference characterizations, thereby assuring that all of the readers within the system operate properly in the presence of such interference.

Figure 1:
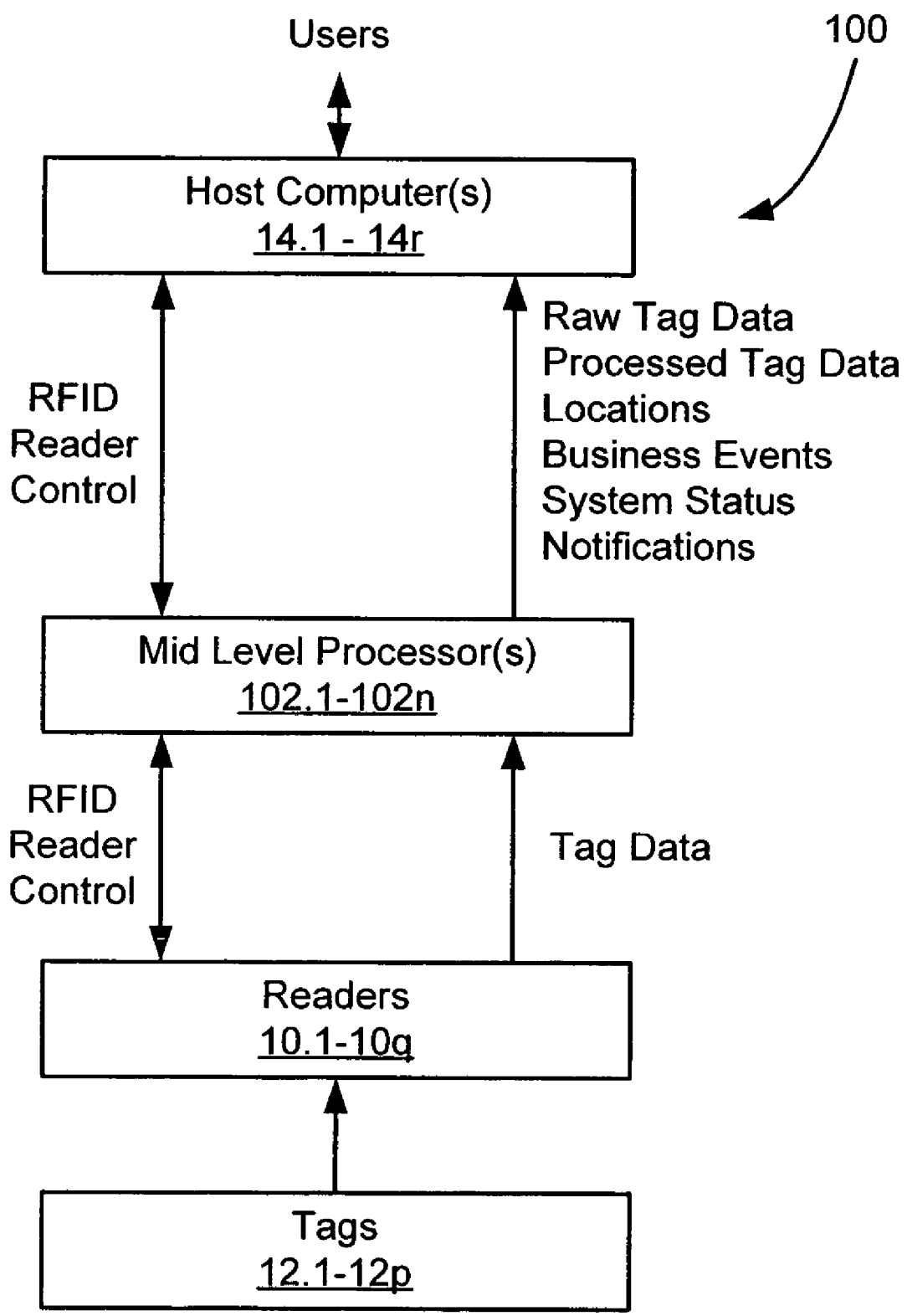
FIG. 1 is a block diagram of a radio frequency identification (RFID) system architecture according to the present invention.

FIG. 1 depicts an illustrative embodiment of an RFID system architecture 100, in accordance with the present invention. In the illustrated embodiment, the RFID system architecture 100 includes a plurality of RFID transponders or tags 12.1-12.p, a plurality of RFID readers 10.1-10.q, at least one host computer 14.1-14.r running client software applications, and at least one mid-level controller/processor 102.1-102.n in communication with the readers 10.1-10.q and the host computers 14.1-14.r. It should be appreciated that the functions necessary to implement the various elements of the system architecture 100 may be embodied in whole or in part using hardware or software or some combination thereof using microprocessors, microcontrollers, digital signal processors, programmable logic arrays, data storage devices, embedded memory, ROM, RAM, FLASH memory, or any other suitable types of hardware and/or software. It is further appreciated that although the functionality of the system architecture 100 is illustrated in FIG. 1 as being implemented within the respective system elements listed above, the system functions may alternatively be implemented in any other suitable arrangement of elements and in any suitable form. For example, the system architecture 100 may include multiple instances of each type of system element operating in a coordinated manner to deliver the required application services. In addition, it should be understood that each of the readers 10.1-10.q includes an RF interrogator and an RF receiver, and that the RF interrogator and the RF receiver may reside in separate units or may be integrated into a single device. Furthermore, when the term "reader" is employed to refer to the function associated with RF tag interrogation, the term "reader" should be understood to correspond to a device that solely performs that function or is integrated with a component that also performs RF reception. Similarly, when the term "reader" is employed to refer to the function associated with RF reception, the term "reader" should be understood to correspond to a device that solely performs that function or is integrated with a component that also performs RF tag interrogation.

In the presently disclosed embodiment, the various elements and components of the system architecture 100 including the readers 12.1-12.p, the host computers 14.1-14.r, and the mid-level processor 102 are configured to communicate with each other over a network infrastructure, which may include switches, routers, bridges, hubs, media converters, and/or any other suitable types of network elements or components. Further, the various elements and components of the system architecture 100 and the network infrastructure can be interconnected by communications links comprising Ethernet, serial, fiber, rings, wireless, WAN, and/or any other suitable type of communications links, depending upon the connectivity requirements and the characteristics of the RFID environment.

The network infrastructure underlying the system architecture 100 is referred to herein as an RFID reader backbone, which can be implemented as a full duplex switched network or a half duplex non-switched network. It is noted that if the reader backbone is implemented as a full duplex switched network, then collisions of multiple reader transmissions can be easily avoided, and system latency requirements can generally be easily satisfied. However, if the reader backbone is implemented as a half-duplex non-switched network, then it may be necessary to provide suitable transmission control information to the respective readers 10.1-10.q to avoid potentially colliding reader transmissions. Such transmission control information may be provided via unicast or multicast signaling within the network infrastructure.

As shown in FIG. 1, the system architecture 100 includes the plurality of tags 12.1-12.p. In one embodiment, each of the tags 12.1-12.p includes a small antenna operatively connected to a microchip including embedded memory. The tags 12.1-12.p can be made in any suitable shape and size, and can be configured to function in any suitable mode of operation. For example, each of the tags 12.1-12.p can be implemented as a passive tag, an active tag, or a semi-passive tag. In general, passive tags have no battery or internal power source, and operate by back-scattering or load modulation of an incident RF signal, which may be transmitted by one of the readers 10.1-10.q. Although some types of passive tags can store energy for a period of time, passive tags typically require continuous input power as an energy source. Active tags generally include an internal power source such as a battery, a solar cell, or any other suitable type of power source. Further, active tags can transmit RF signals in response to a request or command provided by a reader, on a predetermined schedule (e.g., every 5 minutes), or upon detection of a threshold event (e.g., when the ambient temperature exceeds a predefined temperature level). Semi-passive tags are hybrids of passive and active tags, and are generally configured to provide improved read-range, data storage, sensor sophistication, level of security, etc., in comparison with purely passive tags.

In addition, each of the tags 12.1-12.p can be configured to operate in an inductive mode or a propagation mode. Inductive mode (or near field coupling) tags employ magnetic coupling, operate in the LF and HF frequency bands (LF=100+kHz, HF=10+MHz), and are relatively short range (e.g., a few inches or contact). Propagation-mode (or far field coupling) tags employ radio wave coupling, operate in the UHF and microwave frequency bands (UHF≈900 MHz, microwave=2.4+Ghz), and generally have a longer range, e.g., 5-15 meters.

The tags 12.1-12.p may also be configured as read-only tags, programmable write-once/read-many tags, or re-programmable read-many/write-many tags. In general, read-only tags have permanent unalterable code (e.g., identification and/or other data), which is fixed in embedded memory at the time of manufacture. Programmable write-once/read-many tags include embedded memory that can be written to once in the field with the desired information. Re-programmable read-many/write-many tags include embedded memory that can be written to multiple times with the desired information.

It is noted that the small antennae included in the tags 12.1-12.p can be provided in various types and configurations. For example, a multiple polarization antenna can be employed as a loaded antenna, i.e., an antenna designed to anticipate the dielectric loading resulting from the tag being attached to a particular item or individual. Further, a fractal antenna can be employed to reduce the antenna size. In one embodiment, the tags 12.1-12.p are operative to employ standardized RFID air protocols (e.g., the ISO 18000-6 protocol, the EPCglobal $1^{st}$ and $2^{nd}$ generation protocols) to communicate with the plurality of readers 10.1-10.q within the system.

Figure 10:
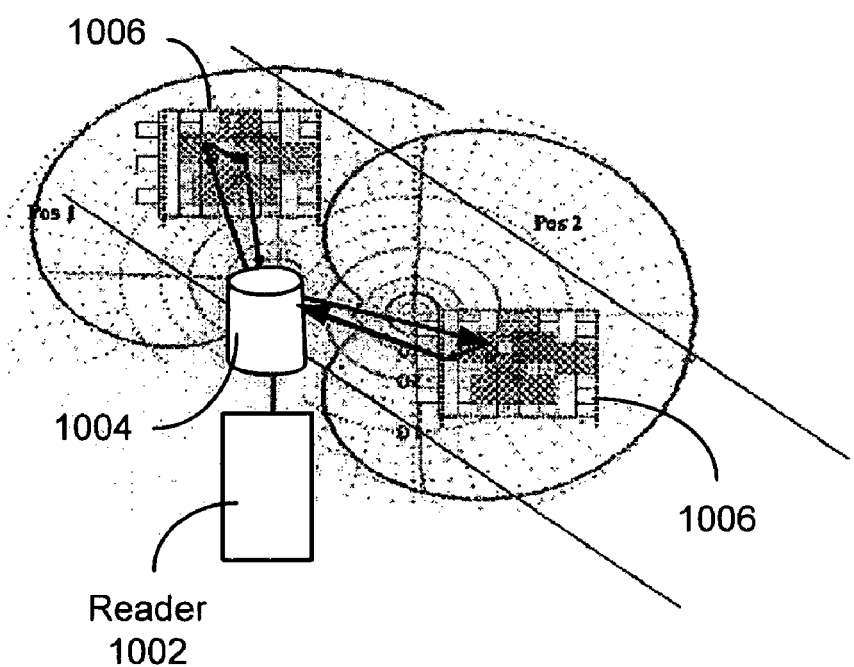
FIG. 10 is a diagram illustrating the RFID reader of FIG. 2b having an antennae configuration capable of providing angle diversity according to the present invention.

Various antenna types and configurations may also be incorporated into the plurality of readers 10.1-10.q. The antenna types and configurations are selected to mitigate the limitations of a single reader deployment within the RFID environment. Specifically, to improve the ability to power, to interrogate, and to receive signals from multiple tags, steerable beam antennae can be incorporated into the reader. The steerable beam antenna may be steered through an angle such that either communications to a moving tag or moving the reader past a tag will achieve diversity in the angle of interrogation, thereby allowing unique multi-path profiles to be obtained at the different angles. Such angle diversity achieved in this manner is illustrated in FIG. 10, which depicts a reader 1002 including a steerable beam antenna 1004 transmitting and receiving RF signals to/from a tag 1006 moving from Position 1 to Position 2 within an RFID environment. It is noted that an improvement in angle diversity at a particular range is obtained over a fixed beam antenna, particularly in the strongest part of the antenna field. The diversity gain is attributable to the relatively short range from the reader to the tags such that a wide angle is traversed over a modest length of relative travel between the reader and the tags.

More specifically, angle diversity is obtained by transmitting and receiving through a different multi-path profile for each antenna pointing angle without requiring relative movement between the reader and the tags. It is noted that different bore-sight pointing angles can be used to adjust the gain of the antenna along the signal path in the direction of the reflections of signals (e.g., off of objects and walls) generated by longer range active tags. These gain adjustments result in different relative levels of signals in each direction, thereby providing the angle diversity required to improve communication performance.

In an alternative embodiment, at least one beam forming antenna can be incorporated into the reader to achieve angle diversity. Specifically, the beam forming antenna creates a change in its beam pattern, which is subsequently used to obtain angle diversity by transmitting and receiving through a different multi-path profile for each beam-shape, without requiring a tag to move or a change in the main beam bore sight pointing angle. The beam pattern changes provide different relative levels of signals in each direction, thereby providing the angle diversity required to improve communication performance. The beam shapes may be selected by trial and error from a predefined table including the complex weights for each antenna element. In another embodiment, the predominant multi-path reflectors are predetermined and the beam-shapes are selected to create a power gradient in the direction of those reflectors with respect to the line-of-sight path.

In still another embodiment, an adaptive nulling antenna is incorporated into the single reader that creates a bias against chosen multi-path directions by increasing the ratio of signal levels that arrive by a desired signal path to those arriving by undesired signal paths. The predominant multi-path reflectors may be predetermined and the antenna nulls selected to create a power gradient in the direction of those reflectors with respect to the line of sight path. It is noted that antenna nulls correspond to locations in the antenna pattern having a significant reduction in antenna gain relative to the desired direction of maximum antenna gain. An adaptive nulling antenna may be employed that creates a bias against certain interference by increasing the ratio of signal levels that arrive by a desired signal path to those arriving by undesired signal paths. The interference source may be foreign to the system or part of the system, in which case the system has control over the transmissions of the interferers. The predominant interference direction may be determined by scanning with the null until the received signal-to-noise ratio (SNR) is improved. A monitor can be used to determine the degree and location of activity in the associated frequency band so that appropriate frequency channelization can be utilized. For example, the frequency band can be monitored using a high speed sampler and Fourier transform, a filter bank, a swept filter, or any other suitable apparatus or technique.

The steerable beam antenna described above can also be used to determine the direction of movement of a tag or a group of tags by discriminating the signal level when the direction of the antenna beam or the beam pattern is changed. In one embodiment, a small angle dithering of the beam is employed at a rate faster than the rate that the tag moves through the angle of beam change, and the received signal level is differentiated. The sign of the differentiated output is then correlated with the direction of beam movement. The sign of the correlator output determines the side of the beam that the tag is on. The received signal level can be integrated to determine whether the tag is moving into the main beam or away from it. The combination of knowing what side of the beam the tag is on, and whether it is approaching or leaving the beam's field, determines the direction of travel of the tag along the axis perpendicular to the bore-sight and in the direction of the dither.

Adaptive nulling of the antenna pattern can also be used to improve the accuracy of locating tags within a site or facility. Specifically, a sensitive discriminator can be formed by minimizing the signal level in a null. The null is placed where the tag is estimated to be, and is swept in at least one dimension of ambiguity to scan the area. When the tag response is minimized, the null is pointing in the direction of the strongest response from the tag.

In addition, a tag may be tracked using an adaptive nulling or steerable beam antenna by nulling or peaking the signal level, respectively. In one embodiment, the antenna null is pointed slightly off the angle that produces a null in the signal return from a tag, a small angle dithering of the null is used at a rate faster than the rate that the tag moves through the angle of beam change, and the received signal level is differentiated. The sign of the differentiated output is then correlated with the direction of the beam movement. The sign of the correlator output determines the side of the null that the tag is on. The received signal level can be integrated to determine whether the tag is moving toward the null or away from it.

Both the direction and the rate of movement can therefore be determined from this data. The null is adjusted so that the integrated signal level remains nearly constant. Further, the angle of the offset null is the tracking output. The tag location can be further refined along the axis normal to the reader antenna by adaptively adjusting the transmit power of the reader to estimate the power level and the range where the tag becomes visible.

Each of the plurality of readers 10.1-10.q included in the system architecture 100 (see FIG. 1) is configured to transmit RF signals comprising at least one message packet (e.g., a request or command) to one or a subset of the tags 12.1-12.p within its interrogation zone, and to receive RF signals comprising tag data from the tag(s) in response to the message packet. A reader's interrogation zone is defined herein as the physical space within which the reader can successfully perform RF interrogations of tags. Each of the readers 10.1-10.q is also operative to provide the tag data received from the tag(s) to the mid-level processor 102, and to exchange RFID reader control signaling with the mid-level processor 102. The readers 10.1-10.q may be configured to support TCP/IP stacks, and are connectable via wired (e.g., Ethernet) or wireless (e.g., IEEE 802.11) LAN technology to the mid-level processor 102.

Figure 2A:
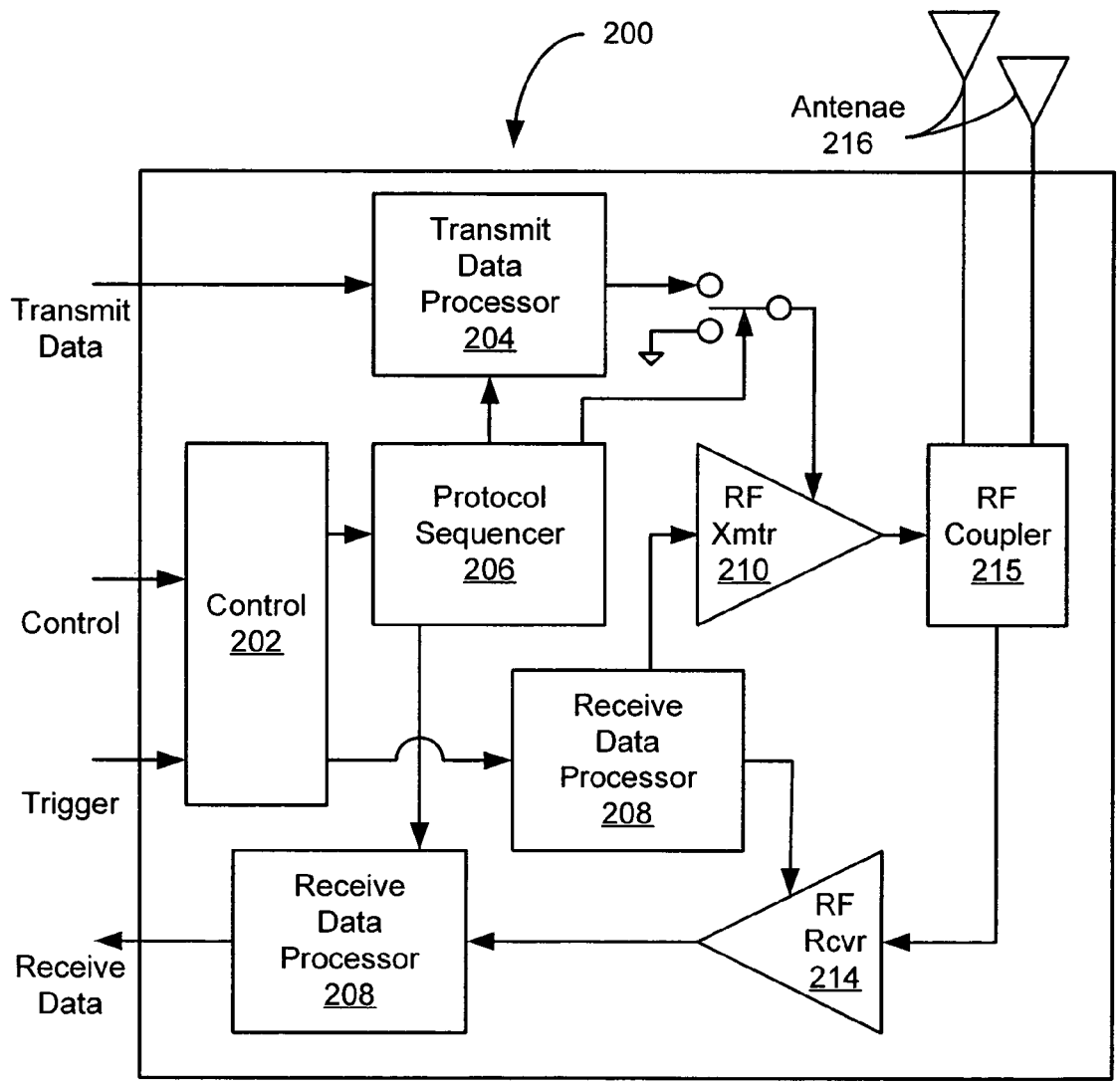
FIG. 2a is a block diagram of a conventional RFID reader that may be employed within the system architecture of FIG. 1.

In the presently disclosed embodiment, each of the readers 10.1-10.q can be implemented using conventional or specialized RFID reader apparatus. FIG. 2a depicts a conventional RFID reader 200 including control circuitry 202, a transmit data processor 204, a protocol sequencer 206, a receive data processor 208, an RF transmitter 210, a tunable RF reference 212, an RF receiver 214, antennae 216, and an RF coupler 215 operatively coupling the antennae 216 to the RF transmitter 210 and the RF receiver 214. The RF transmitter 210 is operable to send at least one message packet (e.g., a request or command) to at least one of the tags 12.1-12.p, and the RF receiver 214 is operable to receive data (e.g., tag data and/or other data or information) from at least one of the tags 12.1-12.p. It is noted that the RF transmit and receive functions of the conventional RFID reader 200 are normally simultaneously active to perform passive tag operations.

To transmit data to at least one of the tags 12.1-12.p, the reader 200 receives the Transmit Data at the transmit data processor 204, which generates a message packet. The message packet is forwarded to the RF transmitter 210, which transmits the message packet over the antenna 216. Both the RF transmitter 210 and the RF receiver 214 use the RF reference 212 to determine the carrier frequency. When receiving data or other information from at least one of the tags 12.1-12.p, the reader 200 receives an RF signal at the RF receiver 214 over the antennae 216. The RF receiver 214 converts the RF signal to digital form and forwards it to the receive data processor 208. The operation of both the transmit data processor 204 and the receive data processor 208 is controlled via the control circuitry 202 and the protocol sequencer 206. The receive data processor 208 then provides the Receive Data as output. It is noted that the protocol sequencer 206 is operative to create an initial RF CW power-up sequence.

Figure 2B:
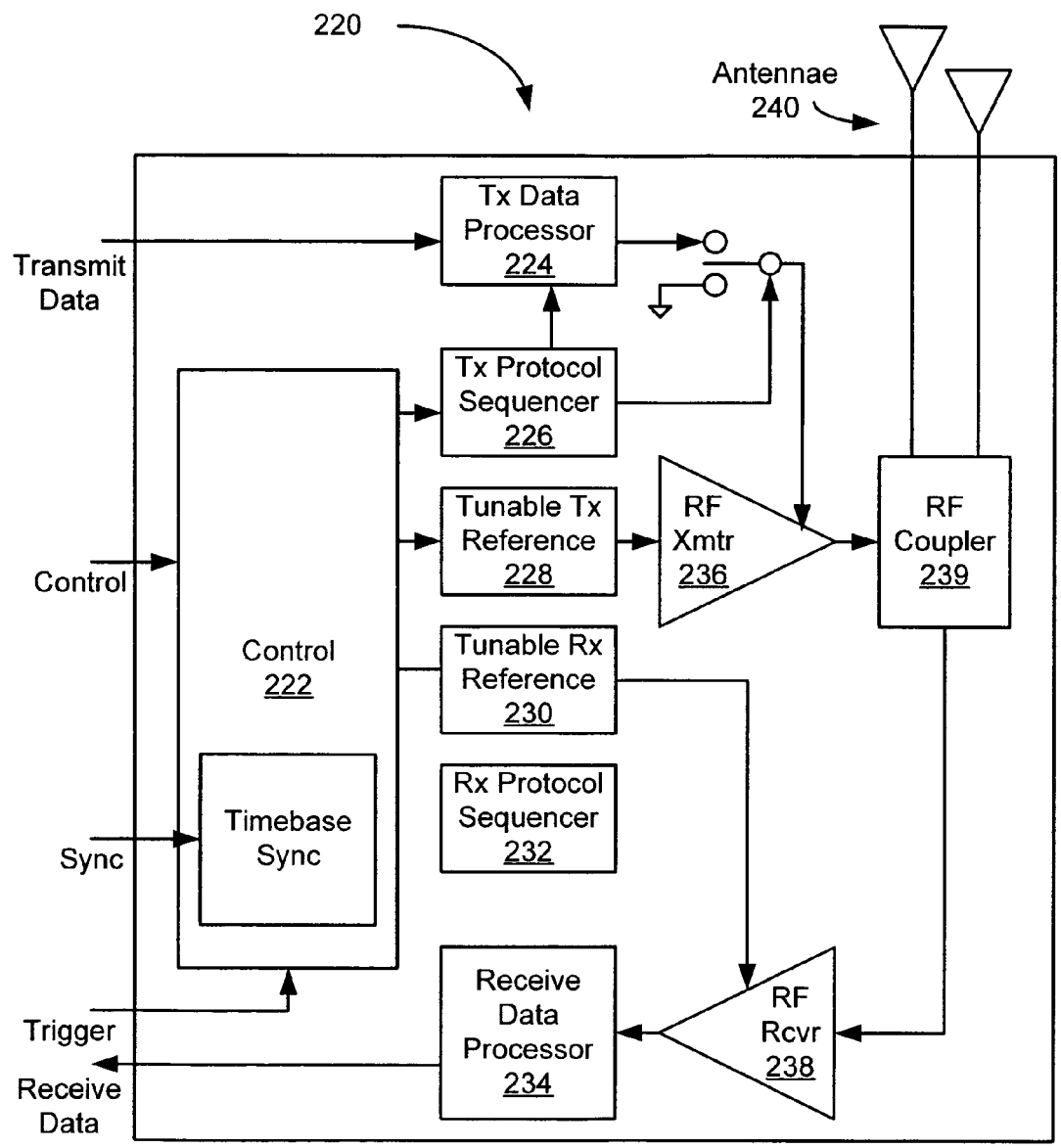
FIG. 2b is a block diagram of an illustrative embodiment of an RFID reader that may be employed within the system architecture of FIG. 1 according to the present invention.

FIG. 2b depicts an illustrative embodiment of an improved RFID reader 220. In the presently disclosed embodiment, the reader 220 is configured to perform bi-static or multi-static operations, i.e., the reader 220 can perform RF transmit and receive functions either independently or simultaneously. In addition, the reader 220 can time-synchronize the RF transmit and receive functions to the operation of the other readers within the system, set the bandwidth of the RF receiver to capture one or more channels of RF transmitter operation, and identify itself among other simultaneously transmitting readers to cooperating receivers. The reader 220 is further configured to allow the functionality of the RF power source, the RF data source, and the RF receiver portions of the reader to be implemented as physically separate devices, which can be strategically placed in different locations within an RFID environment while being operated in a coordinated manner. Accordingly, the reader 220 can comprise any suitable combination of the RF power source, the RF data source, and the RF receiver, since any combination of these portions of the reader can be employed in the interrogation of a tag.

As shown in FIG. 2b, the reader 220 comprises control circuitry 222 including a time-base synchronization subcomponent, a transmit data processor 224, a transmitter protocol sequencer 226, a tunable RF transmitter reference 228, a tunable RF receiver reference 230, a receiver protocol sequencer 232, a receive data processor 234, an RF transmitter 236, an RF receiver 238, antennae 240, and an RF coupler 239 operatively coupling the antennae 240 to the RF transmitter 236 and the RF receiver 238. To facilitate the incorporation of the reader 220 into an array or a network of coordinated RFID readers, the RFID reader 220 is operable to receive and process RF transmissions provided by the other readers within the array or on the network. It is noted that these inter-reader signal transmissions can include RF signals generated in the normal course of interrogating the tags. Via such inter-reader signal transmissions, the readers within an array or on a network can determine and evaluate each other's locations and interference potential.

For example, when a reader such as the reader 220 receives RF signals from another reader within an array or on a network, the receiving reader can evaluate the status of the transmitting reader by determining the signal level, the transmitting reader's settings relating to frequency, time, and power, and the transmitting reader's frequency/time resource demands. Further, the receiving reader can perform correlation analysis on a plurality of transmitting readers over time. Moreover, the reader undergoing evaluation can identify itself by sending codes or commands in a proprietary or reserved field of a message packet, as defined by the reader communications protocol. In addition, the mid-level processor 102 (see FIG. 1) can identify a transmitting reader using the information it has stored therein relating to which RFID reader is transmitting on what frequency at the specific time an inter-reader signal is received by another reader.

In one embodiment, the readers such as the reader 220 (see FIG. 2b) arranged within an array or connected to a network are time synchronized and operative to time-stamp the time of reception of RF signals transmitted by the reader devices, thereby allowing information received by different readers to be combined for the purpose of locating a particular transmitting reader and performing interference analysis. In one embodiment, the process of determining the physical location of a reader includes calculating the time differences of signal arrivals by combining information relating to the time-stamped signal receptions. It is noted that knowledge of the signal arrival times and signal transmit times generally provides sufficient information for performing interference profiling, tag tracking, and triangulation of a reader. It is further noted that the reader 220 can transmit RF signals in response to commands provided by the mid-level processor 102 (see FIG. 1).

The reader 220 can be configured to communicate directly with one or more of the other readers within an array or on a network over the reader backbone. Such peer-to-peer reader communications allow the readers to exchange information without having to bridge through the mid-level processor 102 (see FIG. 1). For example, the information exchanged between the respective reader devices may include signal transmit times, and identification and discovery data associated with the readers and the tags. The readers may also exchange information relating to functional responsibilities, thereby allowing one reader device to perform part of a task while another reader device performs the remaining part(s) of the task. For example, if one reader includes an RF power source or an RF data source while another reader device includes an RF receiver, then the two reader devices can coordinate their functional activities via such an exchange of information.

The reader 220 can be operated to receive multiple RF signals on different frequency channels, and to perform a transform of the received signals, e.g., a fast Fourier transform (FFT), thereby creating a plurality of independent receive data streams from the received signals. Such independent receive data streams can be individually demodulated to create multiple demodulated data streams, which can be used to identify the RF data sources and to determine the received signal strength and interference profile of multiple simultaneous transmitters. In one embodiment, a swept filter such as a phase-locked loop (PLL) can be used to demodulate a single channel at a time for determining the interference level of a specific channel.

In the presently disclosed embodiment, the reader 220 is configured to respond substantially immediately to commands provided by the mid-level processor 102 for the purpose of reactive control. The reader 220 can then drive its transmitter control section via the control circuitry 222 based on information subsequently received or conditions subsequently detected in the RF domain. The reader 220 may be powered using a Power-Over-Ethernet (PoE) technique to assure quick access to the control information. For example, the reader 220 may have one or more PoE connectors, thereby allowing multiple reader devices and/or other PoE devices to be configured in a daisy-chain arrangement. Because the PoE connections are bi-directional, the daisy-chained reader and/or PoE devices can be connected in a loop to allow the devices to be powered from either direction for increased reliability in the event one of the devices becomes non-operational.

In one mode of operation, before transmitting an RF signal, the reader 220 sends a request to transmit to the mid-level processor 102 to allow the processing component 102 to schedule, parameterize, and coordinate the RF transmission with the operation of the other readers within an array or on a network. Further, the reader 220 monitors a specific channel for activity or interference just prior to transmitting the RF signal on that channel to avoid an inadvertent collision with another transmitting reader. It is noted that the reader 220 can be equipped with inputs for external proximity detectors, e.g., photoelectric (electric eye) detectors. Accordingly, when the proximity detector is triggered, the reader 220 can send its request to transmit to the mid-level processor 102 so that the transmission can be scheduled, parameterized, and coordinated with the other readers in the array or on the network. It should be appreciated that the reader 220 can be configured to communicate with more than one mid-level processor within the system.

In alternative modes of operation, the reader 220 is operable to determine the difference between the carrier frequency employed in its own RF transmissions and that employed in the RF transmissions of another reader device, and to pass that information along to one or more other reader devices to impose a correction value on the carrier frequency for subsequent RF signal transmissions. Further, the reader 220 is operable to capture a digitized received modulation waveform (time stamped), and to forward it to another device for remote analysis/correlation. Moreover, the reader 220 is operable to receive back-scattered signals provided by a tag responding to the RF transmissions of another reader device. In addition, the reader 220 is operable to receive pre-formatted message packets or commands for transmission via the reader backbone, and to transmit the pre-formatted packets or commands over a selected RF channel. The reader 220 is also operable to capture packets or responses over an RF channel, and to convey them to the mid-level processor 102 via the reader backbone. In this way, the reader 220 can be made to function as a proxy RF repeater or access point.

As shown in FIG. 1, the mid-level processor 102 can provide raw unprocessed tag data, processed tag data, reader location information, event information, and system status notifications to the host computers 14.1-14.r running client applications, and can exchange RFID reader control signaling with the host computers 14.1-14.r. In the presently disclosed embodiment, the mid-level processor 102 also exchanges RFID reader control signaling with the readers 10.1-10.q to provide coordinated control of the multiple readers. Such coordination of reader control can be employed to assure proper RF spectrum management, to enhance tag management functions, to achieve higher tag read throughput, and to assure that multiple readers (across one or more mid-level processors) do not interfere with each other's operation.

In addition, the mid-level processor 102 is operable to control the sequencing of multiple readers performing tag interrogation functions, thereby providing advanced singulation and resolution capabilities and tag location virtualization. For example, the mid-level processor 102 can control the readers 10.1-10.q based on various input requirements, as determined by the activity within the RFID environment, the constraints imposed by regulatory rules, the limitations of the reader capabilities, the limitations of RF resources multiplexed in frequency and time, and the co-interference levels existing between the multiple readers and any environmental interference.

Figure 3A:
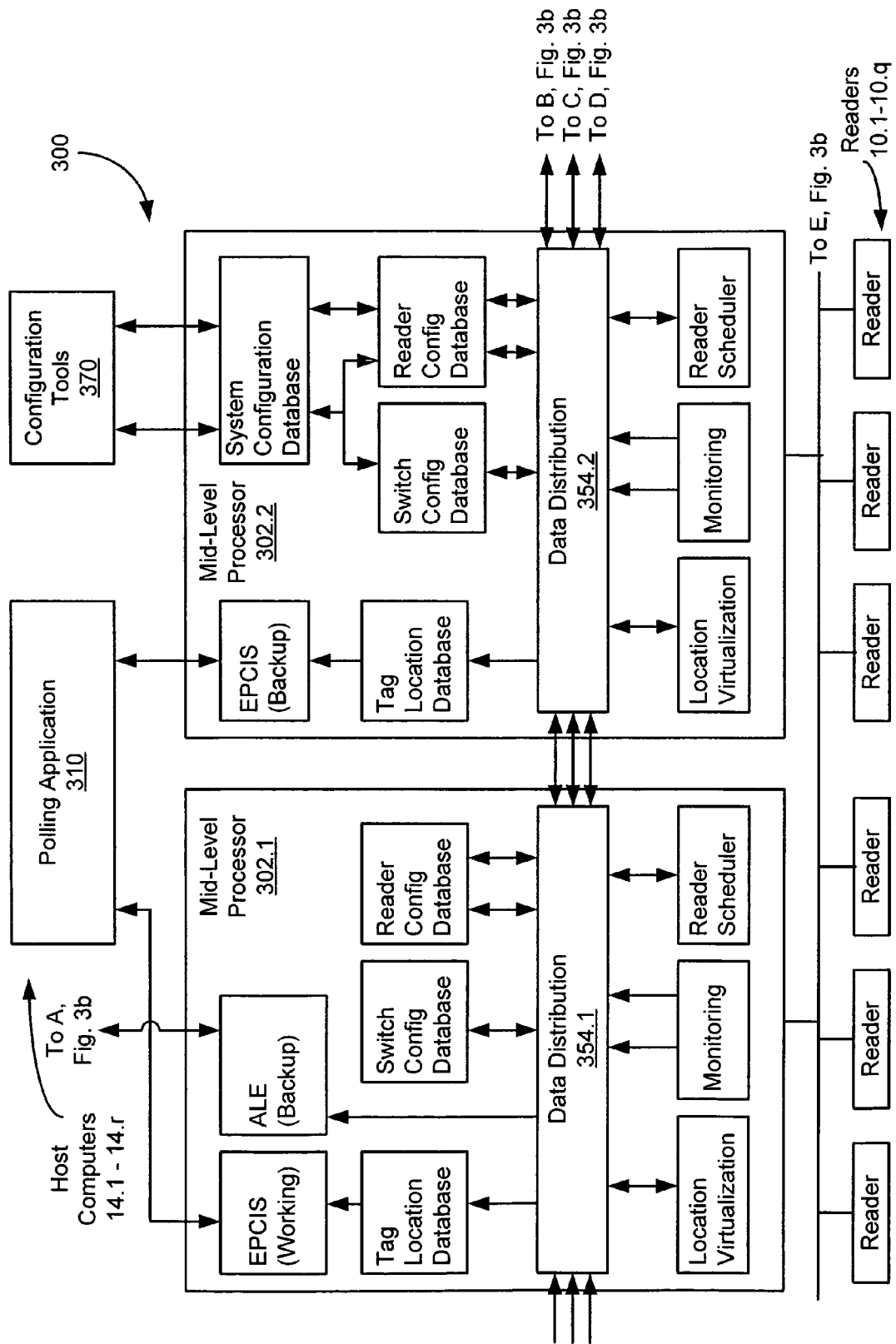
FIGS. 3a-3b is a block diagram of an illustrative embodiment of an RFID system having the architecture of FIG. 1 according to the present invention.
Figure 3B:
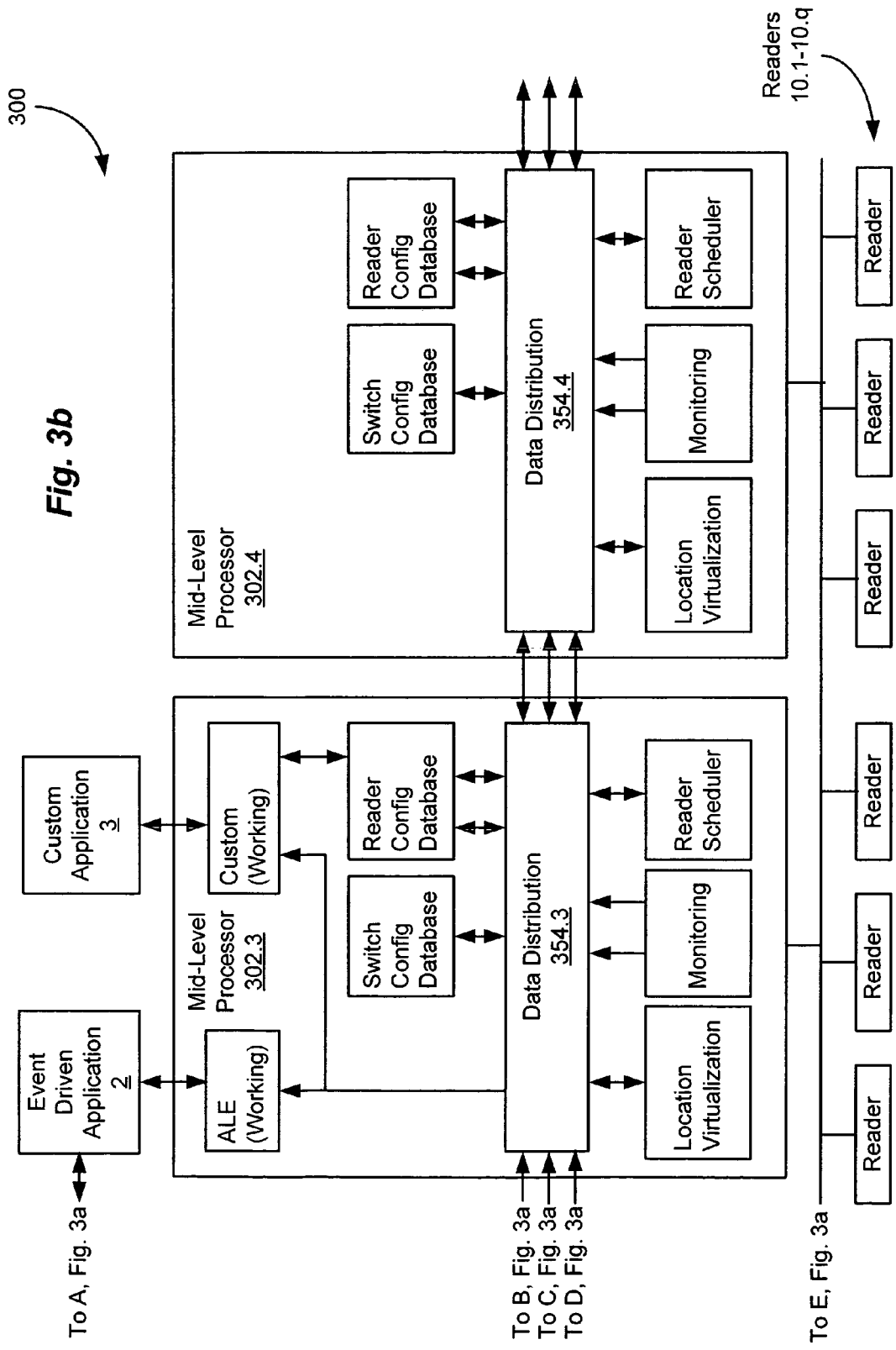

As described above, the system architecture 100 can include multiple mid-level processors like the mid-level processor 102 (see FIG. 1). FIGS. 3a-3b depict an illustrative embodiment of an RFID system 300 including a plurality of RFID readers 10.1-10.q, a plurality of mid-level controller/processor 302.1-302.4, and at least one host computer 14.1-14.r running respective client applications, including a host computer 370 providing software configuration tools for configuring the system. In the illustrated embodiment, the client applications include a polling application running on a host computer 1 receiving tag data from and exchanging control information with the mid-level processors 302.1-302.2, an event-driven application running on a host computer 2 receiving tag data from and exchanging control information with the mid-level processors 302.1 and 302.3, and a custom application running on a host computer 3 receiving tag data from and exchanging control information with the mid-level processor 302.3. It is noted that the respective host computers 1-3 are operative to access redundant (backup) local data storage included in the mid-level processors 302.1-302.2, and the host computer 370 is operative to access a configuration database within the mid-level processor 302.2. As shown in FIGS. 3a-3b, each of the mid-level processors 302.1-302.4 is capable of exchanging scheduling information, reader/tag location information, configuration information, and any other suitable information, with one or more of the other mid-level processors.

Figure 4A:
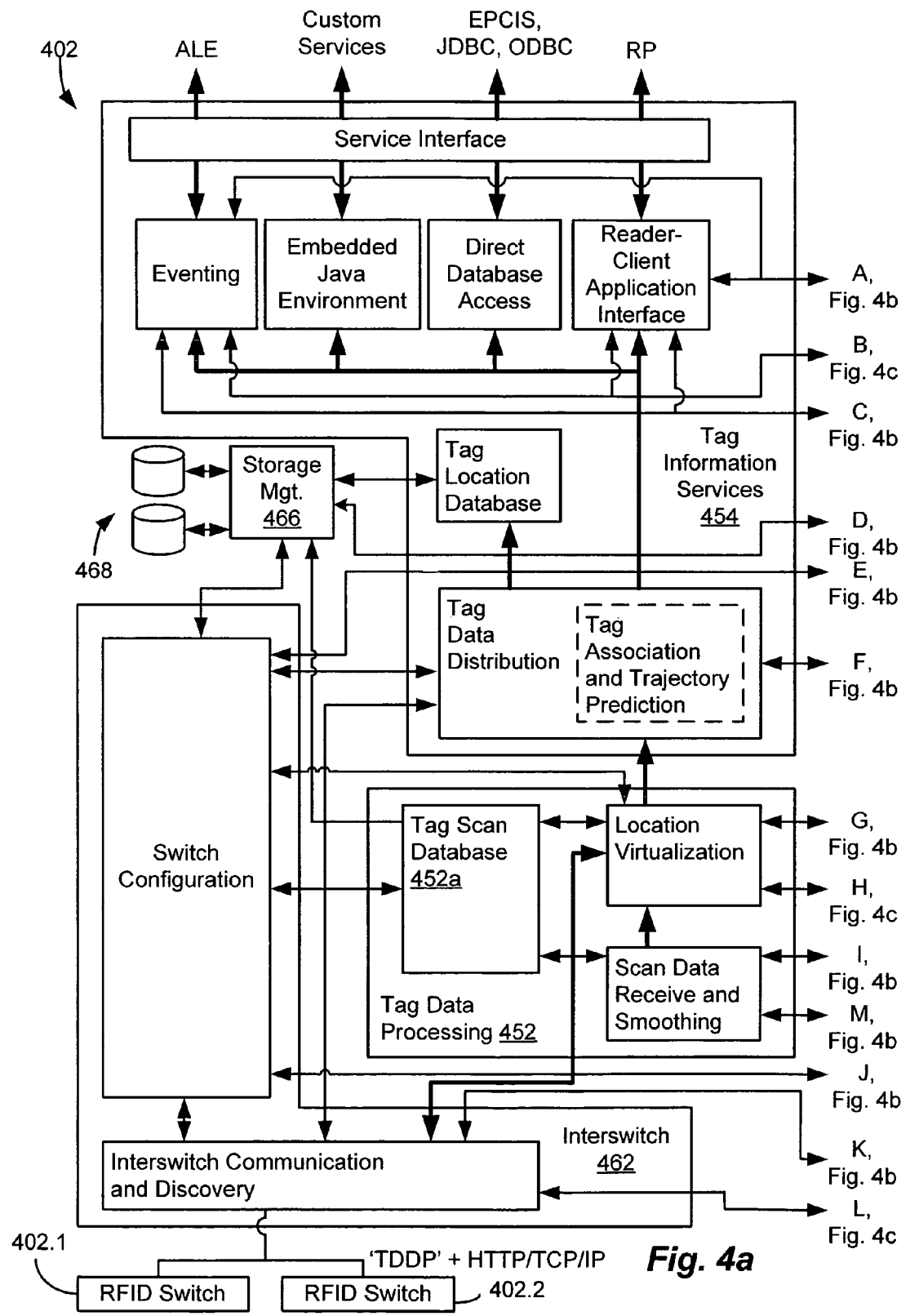
FIGS. 4a-4c is a block diagram of a mid-level processor included in the system of FIGS. 3a-3b.
Figure 4B:
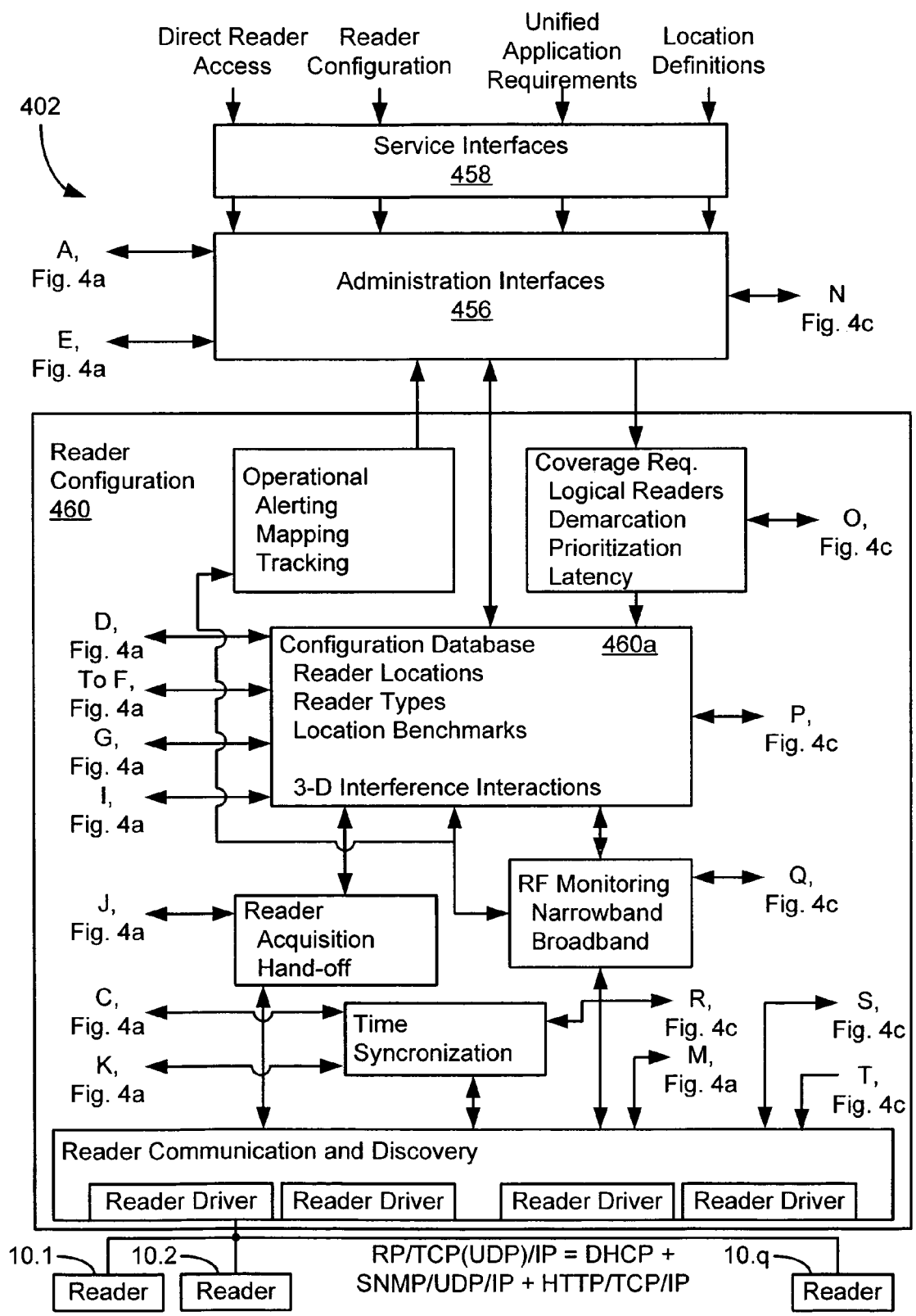
Figure 4C:
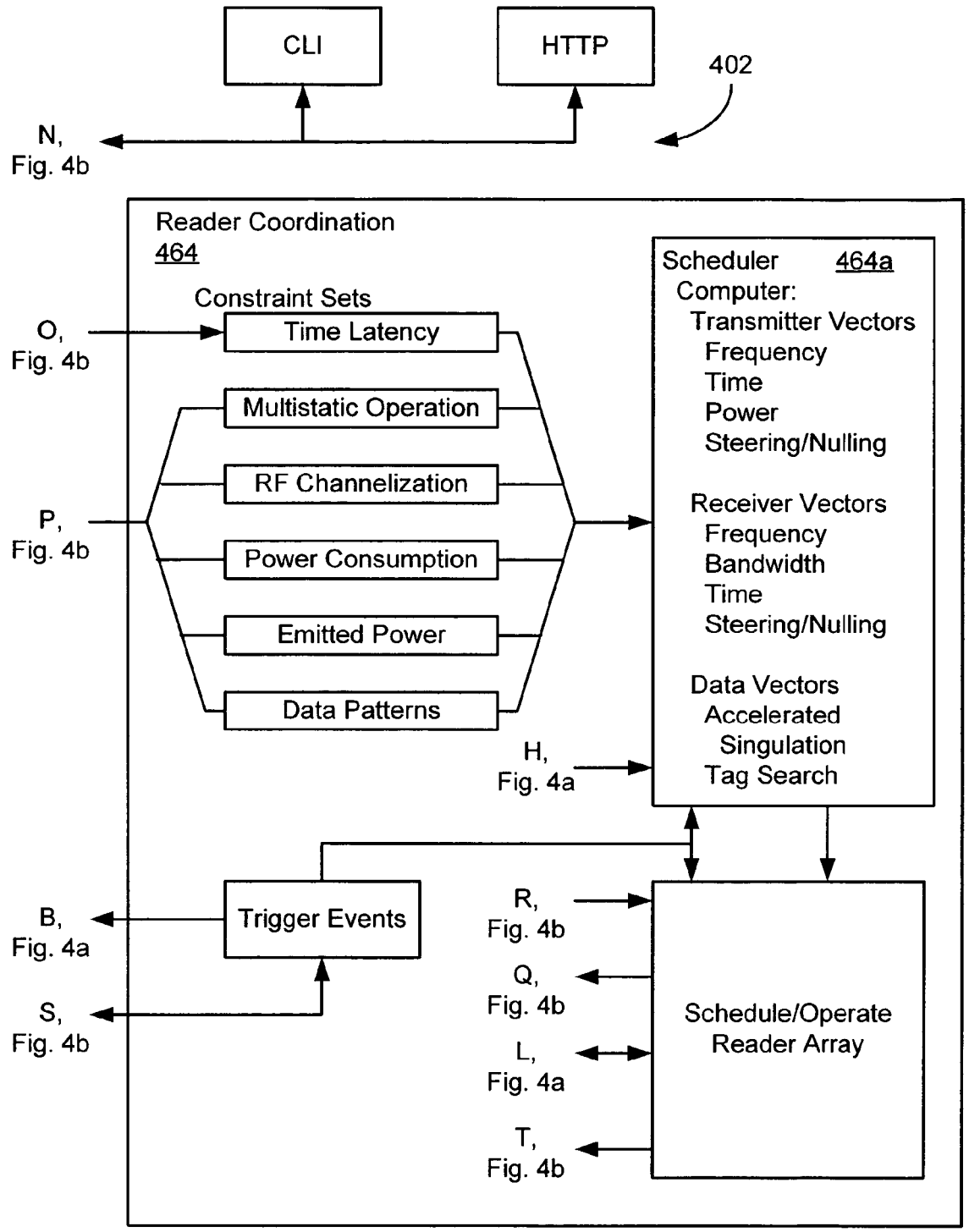

FIGS. 4a-4c depict a detailed view of a mid-level controller/processor 402, in accordance with the present invention. In the illustrated embodiment, the mid-level processor 402 comprises a plurality of elements including an RFID tag data processing component 452, an RFID tag information services component 454, an administration interfaces component 456, a service interfaces component 458, an RFID reader configuration component 460, an inter-switch component 462, an RFID reader coordination component 464, and a storage management component 466 coupled to a plurality of storage devices 468. The mid-level processor 402 further comprises a system management interface including a command line interface (CLI) and an embedded HTTP server function accessible by a system operator (Operator).

Referring to FIG. 4b, the reader configuration component 460 is coupleable to a plurality of RFID readers 10.1-10.q via a reader communication and discovery sub-component included therein. Further, the inter-switch component 462 is coupleable to a plurality of RFID switches 402.1-402.2 via an inter-switch communication and discovery sub-component included therein. It should be understood that the plurality of RFID switches 402.1-402.2 represent other mid-level processors included in the RFID system, and that the term "switch" is used herein interchangeably with "mid-level processor".

Specifically, the tag data processing component 452 (see FIG. 4a) includes a tag scan database, a scan data receive and smoothing sub-component, and a tag location virtualization sub-component. The tag data processing component 452 is operable to receive tag data acquired during interrogations performed by a subset or all of the readers 10.1-10.q via the reader communication and discovery sub-component included in the reader configuration component 460 (see FIG. 4b), and to store the tag data in the tag scan database for subsequent processing. A "tag scan" may be interchangeably referred to herein as a "tag interrogation". In addition, "scan data" may be interchangeably referred to herein as "tag data".

In the presently disclosed embodiment, the tag data includes an RFID reader identifier (ID), reader interrogations parameters, a tag identifier, a time-stamp, presence information, and/or RSSI, sensor data. The reader ID uniquely identifies the reader that collected the tag data. For example, the reader ID may be implemented as that reader's Media Access Control (MAC) address or Internet protocol (IP) address, an electronic product code (EPC), or any other suitable identifier. It is noted that if the reader's IP address is employed, then some additional processing may be required to identify the reader since the IP address may be changed or reassigned during system operation. The reader interrogation parameters include those reader parameters in use while the tag interrogation was being performed. In an alternative embodiment, the reader interrogation parameters may be associated with a logical reader identifier, which is defined herein as an index to one of a set of reader parameters that a particular reader may employ. For example, the set of reader parameters may include the transmit power, the receive sensitivity, an antenna selection, an antenna pointing parameter, a protocol parameter, and/or any other suitable reader parameter. Further, the set of reader parameters may be configured by the mid-level processor 402 at system initialization or at a subsequent time during system operation. It is noted that a logical reader can be uniquely identified by the combination of a reader ID and a logical reader identifier. Alternatively, a logical reader can be identified using a logical reader identifier that is constructed using a combination of reader ID and an operating profile ID. In addition, the timestamp is the time when the tag interrogation was performed, the presence information indicates whether a particular tag is present within the reader's interrogation zone, and the sensor data can represent different types of application-specific data, which may be encoded in a type-length-value format.

For example, the tag data collected by a reader during an interrogation of one or more tags may include sensor data on environmental factors relating to temperature, humidity, shock, orientation, or any other suitable environmental factor. In one embodiment, a subset or all of the tags attached to items or individuals within a reader's interrogation zone may incorporate environmental sensors, and may report the sensor data collected by the sensors during each RF interrogation of the tags. The sensor data reported by these tags may also be associated with other tags based on their physical proximity to the sensor-bearing tags. In another embodiment, tags having environmental sensors may be disposed at fixed locations within the various interrogation zones of the readers, and the sensor data reported by these tags may be associated with the other tags based on their physical proximity to the fixed sensor-bearing tags. The tags disposed at fixed locations can also function as location benchmarks in the event their actual physical locations within the RFID environment are known. One or more of the readers may incorporate environmental sensors or sensor inputs. The sensor data provided by such a sensor may be associated with a subset or all of the tag interrogations performed by the reader.

As described above, the tag data processing component 452 (see FIG. 4a) includes the scan data receive and smoothing sub-component, which is operative to perform scan data smoothing by eliminating redundant interrogation information from a data stream provided by one or more readers. In the presently disclosed embodiment, the scan data smoothing is performed by discarding otherwise-identical tag data (e.g., the same tag(s), or the same sensor data as that collected during the most recent interrogation of that tag(s)) over a predetermined time interval, which is configurable on a logical-reader-by-logical-reader basis. It is noted that the setting of this time interval can result in a trade-off between the processing rate and the timeliness of the tag data. Data smoothing may be performed by one or more of the readers 10.1-10.q.

The tag data processing component 452 is operative to identify interrogations of location benchmark tags, and to direct the location benchmark tag data to a configuration database within the reader configuration component 460 (see FIG. 4b). Location benchmark tags are defined herein as tags temporarily or permanently attached to a known part of the physical RFID environment. For example, a location benchmark tag may be embedded in the floor or a wall, or attached to a pillar, a shelf, a conveyor belt, or a vehicle. Further, predetermined locations of the location benchmark tags can be supplied as configuration information at the time of system initialization or at a later time during system operation, since one or more location benchmark tags may subsequently be added, moved, or removed from the system.

Specifically, when one of the readers 10.1-10.q (or a logical reader) interrogates a location benchmark tag, a predetermined location of that tag can be used to establish the physical extent of the interrogation range for that reader. Further, the interrogation of location benchmark tags connects coincident interrogations of non-benchmark tags by the same reader to the physical proximity of the location benchmark tag. Location benchmark tags may be identified by consulting a configured list of tag identifiers or tag identifier sub-fields, or by referencing a bit-field or a code-point for the benchmark tags, thereby accelerating the recognition of these tags by allowing the identification to be made by comparing a small number of bits (e.g., 3 bits) in the tag identifier to a known value.

In the presently disclosed embodiment, the tag scan database within the tag data processing component 452 operates as a short-term low-latency data storage for the scan data receive and smoothing sub-component and the tag location virtualization sub-component. In one embodiment, the tag scan database allows low-latency lookups based on tag identifiers over specified time intervals. For example, such a low-latency lookup can include a request for all interrogations of a particular tag occurring during the previous 2 seconds, thereby resulting in the generation of a list of all readers that interrogated that particular tag over that 2 second interval. In one embodiment, the lifetime of interrogation events stored in the tag scan database extends over the longest interval during which tag location virtualization processing may occur, after which the interrogation events are purged from the database. The tag scan database creates a log of reader interrogation events that can be stored in one or more of the storage devices 468, which may comprise a hard disk or any other suitable non-volatile storage. The log of reader interrogation events can be accessed by administrative functions to trace and/or debug individual interrogation events. In addition, the tag scan database incorporates a tag data aging function, which synthesizes negated reader-sourced interrogations after a configurable-time interval and reports them to the tag location virtualization sub-component, and a function for organizing and reclaiming memory used for obsolete tag data storage.

In one embodiment, the tag data aging function operates by periodically examining each entry in the tag scan database included in the tag data processing component 452, and, for each tag identifier and logical reader entry, performing the following operation, as expressed in an illustrative algorithmic description using pseudo-code:

```
For each <T,<R,π>> {
    if (P=Y and current_time − most_recent_timestamp > age)
        generate <T,<R,π>,P=N,current_time>;
},
``` in which "T" is a tag identifier, "<R, π>" corresponds to a logical reader designated by a reader identifier "R" and corresponding reader parameters "π", "P" is a tag presence indicator, and "age" is an aging interval. In this embodiment, the aging interval is a configured parameter.

In a further embodiment, the function for organizing and reclaiming memory used for obsolete tag data storage operates by examining the tag scan database entries, and deleting those entries that are older than a predetermined time interval. For example, the predetermined time interval can be twice the maximum data smoothing time window or maximum observation time window employed in tag location virtualization processing.

The tag information services component 454 (see FIG. 4a) includes the tag data distribution sub-component, the tag location database, the event generating (eventing) sub-component, an embedded Java environment sub-component, the direct database access sub-component, the reader-client application interface, and service interfaces, which are coupleable to the host computers running client applications. The tag information services component 454 provides the results generated by the tag data processing component 452 to the client applications via the service interfaces, which are enabled based on the requirements of the respective applications. It is noted that a system including more than one mid-level processor (see, e.g., FIGS. 3a-3b) can supply these services to the client applications with service-level redundancy, thereby providing increased quality and reliability access to the applications in the event of a system failure.

Specifically, the tag data distribution sub-component receives the results of tag location virtualization processing, and, based on the system configuration, propagates these results to the local tag location database within the tag information services component 454, to the tag location databases within any other mid-level processors included in the system, to the local event generating (eventing) services within the tag information services component 454, and/or to the event generating services within the other mid-level processors within the system. Such propagation of the tag location data provides the source of all data services to all client applications running within the system.

As described above, the tag location database stores the results of location virtualization processing. In one embodiment, the stored tag locations can be indexed by tag identification, location, timestamp, and/or any other associated tag data. The tag location database is instantiated within at least two mid-level processors included in the system, thereby assuring continuous system operation in the event of a failure of one mid-level processor. The event generating (eventing) sub-component is operative to convert the results of location virtualization processing to system level notifications based on the system configuration and client application event subscriptions. The notifications generated by the event generating sub-component can be carried by application protocols such as ALE (EPCglobal application Layer Event protocol) or any other suitable application protocol.

The reader-client application interface provides an interface abstraction to the location virtualization sub-component by encapsulating the location virtualization results in the RP (EPCglobal's reader Protocol) control protocol or any other suitable reader control protocol. Via the reader-client application interface, the mid-level processor 402 can effectively masquerade as a set of logical reader instances directly connecting to the client applications, thereby providing support for legacy applications designed to interface directly to the readers. As a result, the mid-level processor 402 appears to the client applications as one or more virtual readers, each corresponding to a predetermined location within the RFID environment.

The functionality of the reader-client application interface includes the following: (1) the ability to provide client applications with representations of physical readers as locally instantiated readers, (2) the ability to communicate with the client applications using standard or proprietary protocols normally intended for use with readers, (3) the ability to map and represent the physical readers connected to the mid-level processor as logical or virtual readers to the client applications, and (4) the ability to communicate with the physical readers using standard and/or proprietary protocols appropriate for the particular operations supported on the device.

The reader-client application interface also supports internal processing operations that translate protocol operations from the client applications into appropriate reader protocol operations. Such translations may occur in both directions. For example, the internal processing operations may include direct mapping of inbound protocol messages to outbound messages, or indirect mapping involving a degree of indirection, whereby the inbound protocol indication (in either direction) is translated into an intermediate internal system function. This intermediate system function and/or other functions in the system along with operations based on previous actions, e.g., actions associated with application-specific state machines, may at a subsequent time generate appropriate application-directed or reader-directed protocol operations.

It is noted that the virtual reader representations provided via the reader-client application interface may be configured and instantiated based on one or more data filters. For example, one virtual reader corresponding to a particular location may report on one subset of interrogated tags, while another virtual reader corresponding to the same location may report on a different subset of the tags. By employing the reader-client application interface, a client application specifically designed to interact with physical readers can interface directly to the mid-level processor 402. As a result, the client application has access to tag location virtualization processing, which may be employed to process and combine the interrogation results of a plurality of physical readers to provide more extensive, more reliable, more accurate, and more relevant application data than individual physical readers could otherwise supply. It is noted that to maximize compatibility with the client applications, the reader-client application interface may be configured to mimic any other suitable reader management and authentication functions.

The direct database access sub-component included in the tag information services component 454 provides data access to the tag location database via structured queries. The client applications may exercise this function via a set of well-defined protocols such as ODBC, JDBC, or any other suitable protocol, or via the EPCglobal EPC-Information Services (EPC-IS) interface or any other suitable interface. Further, the embedded Java environment sub-component within the tag information services component 452 is operative to provide custom services. The embedded Java environment sub-component provides access to all internal functions of the mid-level processor 402 to allow the custom services to access data processing, interrogation scheduling, configuration, exception handling, error detection, and remediation functions.

Figure 27:
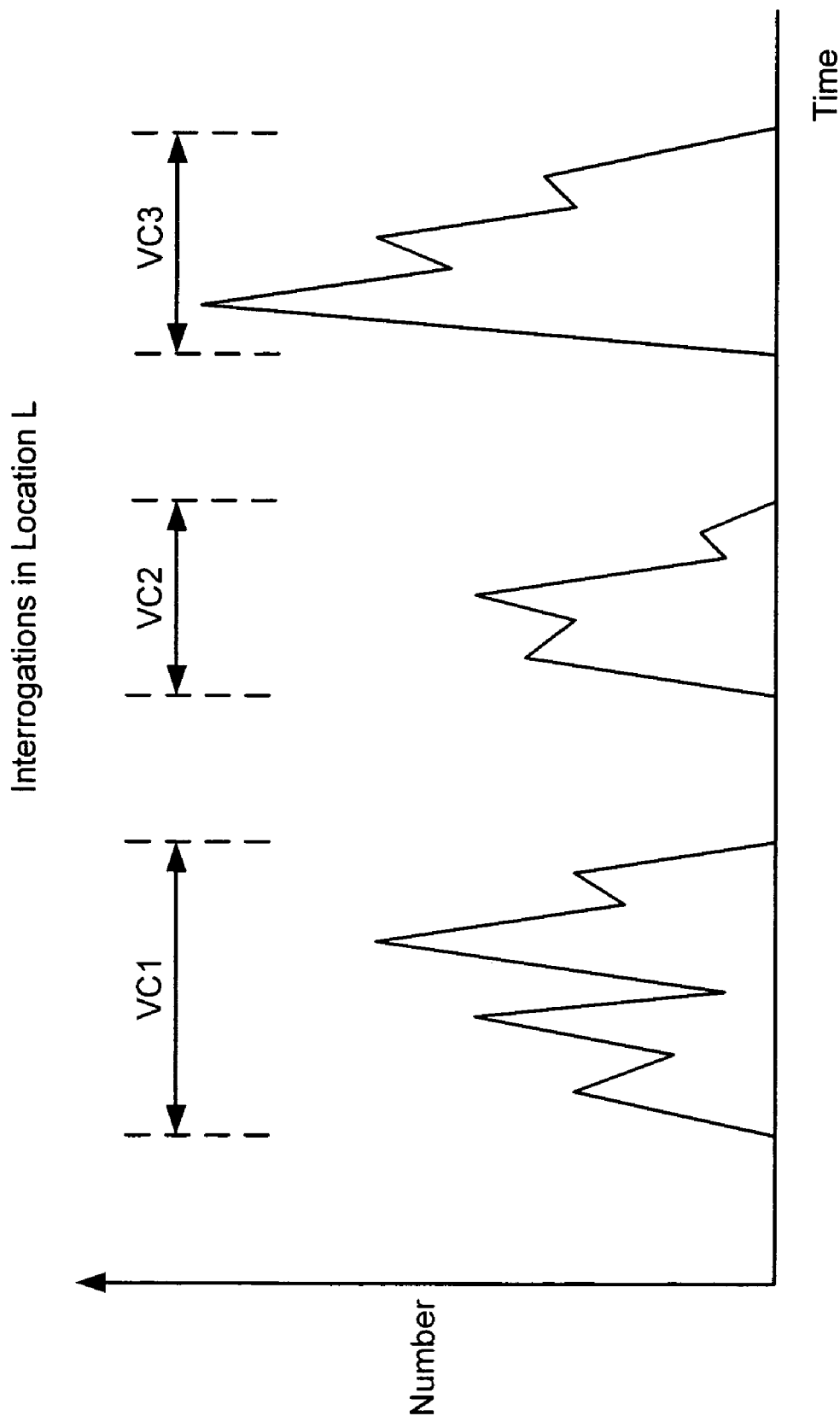
FIG. 27 is a diagram illustrating a plurality of bursts of interrogation activity resulting from physical groupings of RFID tags traversing a location within an RFID environment in a coordinated manner.

For example, the custom services provided by via the embedded Java environment sub-component include container virtualization processing and activity detection processing. Container virtualization processing is a data service that logically binds the results of tag location virtualization processing for specific configured tag locations occurring in time-proximity to one another. FIG. 27 depicts a plurality of bursts of interrogation activity VC1, VC2, and VC3, which can result from physical groupings of tags traversing a location L in a coordinated manner. For example, such tag groupings may be packed on the same pallet or may be carried on the same vehicle. Container virtualization processing monitors the stream of tag location virtualization results for locations so configured to detect rising and falling edges corresponding to the bursts of interrogation activity VC1, VC2, and VC3, and then collects all tag identifiers occurring between those points in time inclusively in a virtual container data structure. The virtual container may be identified by the presence (in the burst of interrogations that delimits the container) of one or more containment tags, which can be predefined by specific identifier, identifier class or prefix, fast-filtering code-points, or any other suitable related data. It is noted that containment tags may be predefined hierarchically. For example, in the case of pallets including cases containing individual items, the pallets are the higher order container identifiers and the cases are the lower order container identifiers. Containment tags may be associated with physical organizations (e.g., pallets and cases), with conveyances (e.g., vehicles or personnel), or with tagged documentation (e.g., license plates or work orders). The container virtualization processing implemented via the embedded Java environment sub-component stores and reports the results of container virtualization to the client applications.

Activity detection processing is a custom data service that combines the results of location virtualization processing with tag identifiers (or tag classes or prefixes) to indicate activities predefined by the user. Activity detection processing recognizes the fact that different tag identifiers in a given location can mean different things, and may be of interest to different client applications. For example, data from a tag associated with a tagged carton interrogated in a receiving location may be forwarded to an inventory management application, while a tagged personnel ID badge may be logged by a workflow monitoring application.

The mid-level processor 402 (see FIGS. 4a-4c) can be configured to provide system management functions. In the presently disclosed embodiment, the mid-level processor 402 provides a suite of administration interfaces 456 that allow access to internal functions and data to facilitate the configuration, operation, and management of the processing component 402. Specifically, the mid-level processor 402 provides a command line interface (CLI), which is a text-based interface to telnet or dumb-terminal management tools. The CLI is typically used by the system operator (Operator), and provides complete low-level access to the mid-level processor 402. The CLI also provides diagnostic, scripting, configuration save/restore, and memory-dumping functions to facilitate system debug, and direct and indirect administrative access to readers under the control of the processing component 402 and to internal functions within the mid-level processor 402. The mid-level processor 402 also provides an embedded HTTP server function to supply the administrative functions available via the CLI to web browser based tools.

Specifically, the administration interfaces component 456 is operative to mediate operator access to the mid-level processor 402 and the readers 10.1-10.q under its control. This includes providing for mutually exclusive access to resources within the mid-level processor 402 or to readers that might be put into an ambiguous non-functional state as a result of conflicting administrative and operational inputs. The mid-level processor 402 also includes a service interfaces component 458 that interfaces to specific configuration and administration applications providing higher-level user interfaces for the configuration and operational management of the system.

The reader configuration component 460 (see FIG. 4b) is operative to collect and maintain reader-level system configuration, status, and state information within the mid-level processor 402. As shown in FIG. 4b, the reader configuration component 460 includes an operational alerting/mapping/tracking sub-component, an RF coverage requirements sub-component, the configuration database, a reader acquisition/hand-off sub-component, an RF monitoring sub-component, a time synchronization sub-component, and the reader communication and discovery sub-component. The reader level system configuration information stored in the configuration database may include the reader locations, the reader types, the location benchmarks, 3-D interference/interactions, and/or any other suitable system configuration information. Such configuration information can be initially derived from the physical properties of the system and the RFID environment in which the readers are deployed via the administration interfaces 456 and suitable configuration tools. It is noted that the system configuration information can be updated dynamically as the system components and the RFID environment change. The reader configuration component 460 is further operative to notify system users of changes in the system configuration, operational state, status, exceptions, and/or errors via the administration interfaces 456. In one embodiment, the configuration database is backed up in the non-volatile storage 468 so that its contents persist across power cycles or resets of the mid-level processor 402.

The operational alerting/mapping/tracking sub-component within the reader configuration component 460 is operative to generate administrative alerts based on operational monitoring of the readers 10.1-10.q. The administrative alerts generated by the operational alerting/mapping/tracking sub-component may correspond to one or more of the following events:

(1) Deviations in the actual behavior of the readers 10.1-10.q from the predicted and/or scheduled reader behavior. It is noted that indications of the reader behavior can be provided by the RF monitoring function in terms of the received signal strength, duration, direction, time-delay, and/or protocol. Such deviations may be indicative of a malfunctioning reader or a reader communication problem, or the result of tampering, unauthorized use, or intrusion into the system.

(2) The presence or absence of trigger events related to the operation of the readers 10.1-10.q. Such triggers can relate to time, or correspond to analog events generated by proximity detectors (e.g., non-reader transducers such as electric eyes, pressure sensors, mechanical switches, etc.) or any other suitable event. For example, an event may be generated when an electric eye is interrupted, thereby indicating the presence of a tagged article even if no coincident tag interrogation were successfully performed. Such an event may also be an indication of a malfunctioning reader, a reader communication problem, or the result of tampering, unauthorized use, or intrusion into the system.

(3) Changes in the RF configuration of the reader array due to changes in the RFID environment, or the movement, addition, and/or removal of one or more readers or other devices within the system.

(4) Events related to tracking mobile or handheld reader devices throughout the system.

The RF coverage requirements sub-component included in the reader configuration component 460 is operative to compute and store system-level reader RF coverage requirements derived from system operational characteristics, location definitions, the physical configuration of the readers, reader configuration and parameterization capabilities, and/or projected traversal rates of tags through the defined locations. These inputs to the coverage requirements sub-component are typically static and sourced from a system configuration tool, but may also be accessed via other system management interfaces. Outputs of the coverage requirements sub-component populate a time/latency constraint set included in the reader coordination component 464, which in turn provides scheduling information to the interrogation scheduler function within the reader coordination component 464. The time/latency constraints specify maximum interrogation intervals for the readers based on estimated tag traversal times through the defined locations.

The configuration database included in the reader configuration component 460 can be employed to map reader locations and tag data to the physical RFID environment. In the presently disclosed embodiment, the data stored in the configuration database includes the following:

(1) A benchmark-to-physical location map.
(2) The identities of location benchmark tags or equivalent fast-filtering code points.
(3) A logical reader co-interrogation matrix.
(4) A logical reader co-interference matrix.
(5) A logical reader-to-segment mapping matrix.
(6) A segment-to-physical location map.
(7) Segment-to-location resolution definitions.

(8) The sets of readers that may be operated in a bi-static or multi-static manner.

(9) The physical reader parameter ranges or parameter sets that may be employed, or equivalently, a physical reader-to-logical reader mapping, if the logical reader parameters are fixed. The physical reader parameters include communication sessions and corresponding network configurations, e.g., addresses, port numbers, physical connections, channel selection, bandwidth, baud rate, protocol, antenna selections and parameters, and the power consumption at the various transmit power levels of the reader.

(10) The physical extent of logical reader interrogation zones, which may be dynamically determined by interrogating location benchmark tags within the RFID environment.

The reader acquisition and hand-off sub-component included in the reader configuration component 460 (see FIG. 4*b*) is operative to assign the readers 10.1-10.q to the one or more of the mid-level processors within the system based on, e.g., computation and memory consumption load-balancing, co-interrogating reader balancing, overall network traffic due to co-interrogating mid-level processors, and/or required redundancy and backup operation. In addition, the time synchronization sub-component within the reader configuration component 460 (see FIG. 4*b*) is operative to synchronize the readers 10.1-10.q and the mid-level processor(s) in the system to a consistent real-time clock. Such time synchronization may be based on the network time protocol (NTP) or equivalent, and provides adequate resolution and accuracy to coordinate reader operation and interrogation events throughout the system.

The reader communication and discovery sub-component included in the reader configuration component 460 (see FIG. 4*b*) is operative to configure, establish, and maintain communication sessions to all of the readers 10.1-10.q under the control of the mid-level processor 402. The reader communication and discovery sub-component is further operative to exercise the protocols necessary to discover new readers in the system, to retrieve reader capabilities (from either the readers themselves or the configuration database), to authenticate the identity of the readers 10.1-10.q assigned to the mid-level processor 402, to synchronize time bases, to provide command and control for the respective readers, and to receive tag data, operational status, and RF monitoring information from those readers. For example, the reported reader capabilities may include the availability of independent RF transmit and receive functions, selectable center frequencies (TX/RX), frequency-hopping patterns, selectable modulation schemes, bandwidths, and corresponding masks, selectable bit rates, antenna configurations, available command sets, available logical reader configurations, available air-protocol specific capabilities, and/or any other suitable reader capability.

In addition, the reader communication and discovery sub-component (see FIG. 4*b*) maintains the characteristics and state of the physical connections between the mid-level processor 402 and the respective readers 10.1-10.q, including whether the connection is wired or wireless, connection capabilities such as the bit rate, security functions such as data encryption, whether the connection supplies power to the readers and the maximum power that may be delivered, and the current power being delivered on the connection. It is noted that the reader communication and discovery sub-component is further operative to field any errors or exceptions generated by the readers 10.1-10.q in response to commands issued by the mid-level processor 402, e.g., the inability to perform a specific command, and incorporate any new expected reader behaviors into the configuration database.

The inter-switch component 462 (see FIG. 4*a*) included in the mid-level processor 402 includes a switch configuration database for storing the identity, reader assignments, redundancy, and any other suitable system configuration parameters for all of the mid-level processors within the system. Elements of the switch configuration database include a mapping of the readers 10.1-10.q to the mid-level processor(s), and a mapping of the data services to the mid-level processor(s) for active and backup assignments. The inter-switch component 462 further includes an inter-switch communication and discovery sub-component, which configures, establishes, and maintains communication sessions to all cooperating mid-level processors within the system. The inter-switch communication and discovery sub-component is the mechanism by which interrogation results and reader demands generated by tag location virtualization and reader coordination computations are communicated between mid-level processors sharing co-interrogating readers. It is also the mechanism by which the mid-level processors ascertain the presence and continued operation of these peer reader devices.

The reader coordination component 464 (see FIG. 4*c*) included in the mid-level processor 402 includes a plurality of constraint sets (i.e., time/latency, multi-static operation, RF channelization, power consumption, emitted power, and data patterns), the interrogation scheduler sub-component, a trigger events sub-component, and a schedule/operate reader array sub-component. The reader coordination component 464 is operative to accept configuration and system state inputs, and to generate and execute the reader operational schedule.

The plurality of constraint sets included in the reader coordination component 464 provide system-level input to the interrogation scheduler sub-component to satisfy the demands of the client applications upon the system. In the presently disclosed embodiment, the constraint sets include the following:

(1) Time/latency constraint set—Derived from the system-level reader coverage requirements. The time/latency constraint set encodes at the reader level the maximum RF interrogation intervals (or equivalently the minimum RF interrogation rates) that may be employed while still satisfying client application demands.

(2) Multi-static operation constraint set—Specifies the requirements and capabilities of sets of readers that may be operated in a bi-static or multi-static manner. For example, bi-static operation may use one reader or interrogator to perform the RF transmit function and a different reader or interrogator to perform the RF receive function. By operating readers or devices in a bi-static manner, angle diversity can be obtained to compensate for mis-alignment, mis-orientation, and/or mis-polarization of the readers and tags, thereby improving read reliability within the system. Multi-static operation employs three or more readers, in which one or more of the readers or interrogators operate as RF transmitters and one or more of the readers or interrogators operate as RF receivers. By operating devices in a multi-static manner, performance advantages in interrogation reliability and RF penetration can be obtained by power-combining among the simultaneously operating transmitters, and by creating angle diversity among the receivers for a single interrogation.

(3) RF channelization constraint set—Encodes the channelization capability and inter-channel interference characteristics of the readers within the system. It is noted that readers from different manufacturers are generally not constrained to a standard set of channel center frequencies, bandwidths, and frequency-hopping patterns, and may therefore have their own channel spacings and number-of-channels. It is therefore necessary to compute and control the reader-to-reader and channel-to-channel interference characteristics of the system in order to schedule interrogation operations effectively.

(4) Power consumption constraint set—Encodes the set of readers that may draw power from shared power supplies such as USB ports, USB hubs, or Power-over-Ethernet (PoE) network connections. The interrogation scheduler sub-component uses this information to assure that the available power is not over-consumed by scheduling too many readers or too much transmit power simultaneously.

(5) Emitted power constraint set—Encodes the maximum aggregate RF emission that may be tolerated in physical locations within the RFID environment. Governmental regulatory and occupational safety authorities typically specify maximum power levels for various site types and over various geographies. These power limits must be accounted for when scheduling readers to assure that these limits are not exceeded during system operation.

(6) Data patterns constraint set—This constraint set encodes data patterns that are known to the system, e.g., expected tag prefixes. The encoded data patterns can be employed to accelerate the tag singulation protocol used by readers in particular locations within the system.

The trigger events sub-component included in the reader coordination component 464 is operative to receive signals generated by non-reader sensors or transducers such as electric eyes, pressure sensors, mechanical switches, proximity detectors, or any other suitable non-reader sensor or transducer within the system. For example, transducer activity may indicate the physical presence of a tagged item, and may stimulate the operation of readers in the vicinity of the transducer. Such transducer activity can also be correlated to the activity of the readers to facilitate the detection of missed reads. If any discrepancies are detected, then alerts may be generated to indicate a potential system malfunction. It is noted that trigger transducers and/or transducer connections may be implemented within a reader. Such transducers may directly stimulate the connected reader as well as, or instead of, communicating with the mid-level processor 402. Such behavior can be accounted for in reader scheduling computations performed by the interrogation scheduler sub-component.

The storage management component 468 (see FIG. 4a) included in the mid-level processor 402 provides a reliable persistent data storage facility for data logging, configuration databases, and any other suitable system data. The storage media 468 are typically hard disk drives, however, any other suitable type of non-volatile storage may alternatively be employed.

The various components and sub-components of the mid-level processor 402 described above cooperate to provide the processing component with numerous operational features. For example, the mid-level processor 402 is operable to provide time synchronization across the multiple readers 10.1-10.q. In the system 300 including the plurality of mid-level processors 302.1-302.4 (see FIGS. 3a-3b), time can be synchronized to a predetermined granularity across the multiple mid-level processors 302.1-302.4 and the multiple readers 10.1-10.q. In one embodiment, the granularity requirement of time synchronization is driven by functions relating to reader control, tag data distribution and coherency, and RF configuration coherency.

In addition, the mid-level processor 402 (see FIGS. 4a-4c) is operable to read, to process, and to store tag data provided by the readers 10.1-10.q. For example, unprocessed tag data may include information relating to the time that a reader collected the tag data, and information identifying that reader. The mid-level processor 402 can process this unprocessed tag data to satisfy queries and event requests generated by a client application, which may then generate new reader control requests and direct these requests toward selected readers whose observations within the RFID environment may help that application refine the quality of the data.

In addition, the mid-level processors 402 are operable to implement mechanisms for providing persistent storage of both unprocessed and processed tag data, thereby increasing data reliability in the event of device failures. This can be accomplished by a combination of redundant local storage, and by replicating data across multiple mid-level processing devices via the network infrastructure. For example, unprocessed tag data from the readers 10.1-10.q can be saved to persistent storage (e.g., the storage devices 468) to support application data verification, debugging, reconciliation, and mining. Processed tag data can also be saved to persistent storage to support queries and mining of processed and/or virtualized data.

In addition, the mid-level processors 402 are operable to implement mechanisms for providing persistent storage of the interrogation schedule results of the reader coordination sub-component 464. For example, schedule results of the readers 10.1-10.q can be saved to persistent storage (e.g., the storage device 468; see FIG. 4a) to support debugging, reconciliation, performance analysis, and mining.

In addition, the mid-level processor 402 is operable to allow client applications and internal system components to request notifications of specific tag data events as the tag data is received from readers 10.1-10.q. For example, client applications can register requests for such notification via standard or non-standard mechanisms when certain tag information is received. Further, the mid-level processor 402 can notify the client applications via standard or non-standard mechanisms that, for example, a certain tag data pattern has been detected. Moreover, the mid-level processor 402 can provide support for such registration and notification relating to virtualized tag data. The client applications can also register requests for notifications of specific tag data events detected by other mid-level processors within the system. In the event one of the mid-level processors fails, registration and notification operations can be transferred to a backup processing component. The mid-level processor 402 is also operable to support multiple registrations and notifications to accommodate the rate at which the tag data is received by the processing component. The mid-level processor 402 is also operable to allow the receipt of tag event notifications to result in the registration of other related event notifications.

In addition, the mid-level processor 402 is operable to provide standards-based interfaces for random access database style queries on tag data and other stored information, thereby allowing the system to handle standard structured query language (SQL) queries on all data and information from any device within the system, including tag data and configuration/state information. Such capability includes the configuration of limits on device resources such as the number of memory and/or computation cycles that may be consumed to satisfy a query, and the ability to support queries on system data even after a device fails and a protection device assumes responsibility for the device operations. In one embodiment, the mid-level processor 402 is configured to assure redundancy via at least one working component and at least one corresponding backup component, thereby providing protection capability for each component within the mid-level processor 402. Such protection capabilities include data and state synchronization mechanisms, heartbeat functions for failure awareness, and redundant connections to the network infrastructure.

As described above, the presently disclosed system architecture supports simultaneous operation of multiple mid-level processors such as the mid-level processors 302.1-302.4, as depicted in FIGS. 3a-3b. Coordination of these multiple mid-level processors 302.1-302.4 is accomplished via tag data distribution sub-components 354.1-354.4 included in the respective processing components 302.1-302.4. It is noted that each of the tag data distribution sub-components 354.1-354.4 is like the tag data distribution sub-component included in the tag information services component 454 (see FIG. 4a). In effect, the tag data distribution sub-components 354.1-354.4 operate to make the multiple mid-level processors 302.1-302.4 look like a single monolithic entity to both the client applications and the plurality of readers 10.1-10.q. Further, the tag data distribution sub-components 354.1-354.4 provide a reliable network infrastructure between the respective mid-level processors 302.1-302.4. Moreover, the tag data distribution sub-components 354.1-354.4 are operable to detect the addition or deletion of one or more mid-level processors 302.1-302.4 within the system. Such operation is transparent to the client applications.

In addition, the mid-level processors 302.1-302.4 are operative to coordinate resource allocation (e.g., frequency) across the multiple readers 10.1-10.q via the tag data distribution sub-components 354.1-354.4. Such a resource allocation process generally assumes a consistent view of the system state. The tag data distribution sub-components 354.1-354.4 also enable the communication of reader configuration information between the mid-level processors 302.1-302.4.

In addition, the tag data distribution sub-components 354.1-354.4 provide a mechanism for selecting one or more of the mid-level processors 302.1-302.4 to be responsible for satisfying a query from one of the client applications. The tag data distribution sub-components 354.1-354.4 also provide a mechanism for one of the mid-level processors 302.1-302.4 currently receiving tag data from a reader to communicate that data to a subset or all of the other mid-level processors 302.1-302.4. For example, the subset of mid-level processors may be selected based on the attributes (e.g., reader information, tag information, etc.) or aggregation requirements of the query or queries these processing components are responsible for, and/or the reliability requirements of the tag database. The tag data distribution sub-components 354.1-354.4 also provide a mechanism to tolerate the failure of one or more than one of the mid-level processors 302.1-302.4 without losing any of the tag data collected up to the time of the failure, and without losing connectivity to any of the readers 10.1-10.q.

As described above, the mid-level processor 402 (see FIGS. 4a-4c) can be configured to provide system management functions, which can be used to manage, e.g., to configure and monitor, the components included in the processor 402. Specifically, the system management interface, including the command line interface (CLI), the embedded HTTP server function, and the administration and service interfaces 456 and 458, allow the components of the mid-level processor 402 to be managed via the network infrastructure and system management applications. For example, if a device implements the agent functions of the Simple Network Management Protocol (SNMP), then that device can participate in the management of the mid-level processor 402 via the network infrastructure applications. In one embodiment, the system management interface is operable as a standards-based or application-specific interface for performing component configuration, monitoring, statistics, and debugging operations. In the presently disclosed embodiment, the system management interface provides support for security mechanisms including user authentication and session privacy for managing session communications, management session auditing capabilities, graphical and text based management interfaces, either of which provide for automation of management functions, and management sessions from local or network infrastructure connections.

Reader Array Operation

The various components of the mid-level processor 402 (see FIGS. 4a-4c) described above also cooperate to mitigate the limitations of a multiple reader deployment by transforming the operation of a plurality of networked readers from an aggregated but essentially autonomous operating mode to a dynamically coordinated operating mode, in which the multiple readers effectively operate as a reader array. Specifically, a network of readers is constructed that includes two or more readers that can be controlled by the mid-level processor 402, which communicates with and controls the readers to coordinate their activity as an array of readers. The reader array is time synchronized to provide bi-static or multi-static capability, and to coordinate the use of the RF resources among the multiple readers. For example, coordination of the transmit frequencies of the readers over time may require one reader to stop transmitting on a particular RF channel when another reader starts transmitting on that channel. If there is an ambiguity in the switching time that causes overlapping transmissions or lost transmission channel occupancy, then the capacity in the RF channel will likely be impacted. In addition, synchronizing the transmission link between the RF power sources and the RF data sources of the multiple readers prevents them from transmitting modulated signals when their respective RF receivers are receiving signals. Such time synchronization can be used to obtain spatial reuse.

Two exemplary techniques are disclosed that achieve non-overlapping control of multiple readers. The first technique uses a low-latency or known-latency communications link. A low-latency link can reliably supply a communications latency that is sufficiently small to support the required tasks, either natively or by application of preemptive quality-of-service (QoS) techniques that prioritize reader commands over other types of data traversing the link. A known-latency link typically does not supply sufficiently small latency, but the latency is predictable and can therefore be compensated. The readers are actively controlled and commanded in real time by the mid-level processor 402 via that communications link. The second technique for achieving non-overlapping control of the multiple readers includes time-synchronizing the readers using a time tic to trigger transmit activity changes. In this second technique, commands only have to be set up before that time tic.

The time synchronization of multiple readers falls into three levels of precision, i.e., transaction scale, packet scale, and bit scale. The transaction scale is the coarsest level of synchronization, and the bit scale is the finest level of synchronization. It is noted that the finest synchronization level includes all coarser levels of synchronization. Specifically, bit-scale synchronization is available when the timing in a reader is resolved and accurate to the time scale of a small fraction of a single modulation bit within a message packet. It is noted that the edge of the bit may be blurred, but not to the point that the bit structure is obscured. Packet-scale synchronization is when the start time of a message packet is known and the finish time and intermediate phases of the packet can be predicted, but the resolution and accuracy of this information is coarser than the small fraction of a bit required for bit synchronization. Transaction-scale synchronization is available when the start time of a viewing period is known to a fraction of a packet. It is noted that a transaction is defined herein as the period of time when a tag is in the field of view of a reader.

In the presently disclosed system, one of two techniques, or a combination of the two techniques, can be employed for creating time-synchronized events across multiple readers. The two techniques are referred to herein as closed-loop and open-loop synchronization. The closed loop synchronization technique can be employed both with and without oscillator correction. In each case, unspecified latency is assumed across the time-compensated network, and commands are asserted anticipating that a synchronously timed event will occur sometime after that command assertion. The time synchronizing of events generally resolves the unknown latency either implicitly or explicitly as part of its algorithm.

In closed loop timing-corrected synchronization, a timer included in a reader is corrected to the best estimate of the network time. This technique includes the steps of measuring or sampling the reader time, determining the difference between the reader time and the network time or the time of a master entity on the network, and then performing a correction of the reader timer. If oscillator correction is employed as well as timer correction, then the rate of drift of the timer can be reduced. It is noted that the reader time can drift away from the network time after the correction is made, and therefore the reader time may have to be updated at a rate faster than the rate it drifts or the rate the reader timer is used, based on the accuracy required for the particular type of synchronization. If the reader timer is used many times faster than the rate at which it drifts from the timing accuracy required for the type of synchronization, then the closed-loop sampling and updating is based on the drift rate of the timer. If the reader timer is used much less often than the rate of drift, then the closed loop technique can sample and adjust the timer only when it needs to make use of it.

In one embodiment, the closed loop sampling and updating described above is performed via an adjustment command provided by the mid-level processor 402. In alternative embodiments, the closed loop sampling and updating may be performed locally by the reader itself, performed using one or more other readers that instruct that reader to adjust its clock, or there may be a distributed negotiation among multiple readers to determine the value of the network time. It is noted that the same network entity need not be employed for sampling the time and for invoking the adjustment since all of the network entities can communicate with each other.

In closed loop oscillator-corrected synchronization, the oscillator associated with the reader is adjusted so that the oscillator frequency is closely related to the oscillator frequencies of the other devices on the network. The correction to the oscillator within the reader may be imposed on the oscillator circuit, or the oscillator signal may be corrected at the cycle scale digitally or with filtering, converting to a digital word and frequency, or phase shifting with a multiplier. The reader timer can also be adjusted, but the drift of that adjustment is greatly reduced once the oscillator is adjusted.

With open-loop synchronization, the mid-level processor 402 anticipates the timer drift within each reader, and adjusts the transmit time in the commands it issues to the readers accordingly. Specifically, the mid-level processor 402 tracks the timing drift and the rate of timing drift due to oscillator offsets and the propagation delays to the readers. Using this information, the mid-level processor 402 calculates the value that each reader will have in its timer at a specific value of the processing component's local time. Before issuing a command for a desired action, the mid-level processor 402 sends the readers these calculated timer values, which correspond to the times the readers will have on their unadjusted timers at the precise command transaction time for the desired action. In this way, the readers can be controlled to transmit substantially simultaneously or in a predetermined relationship to each other.

When employing open-loop synchronization, it is assumed that there is a communications link to each reader that has an equalized latency finer than the required synchronization scale. For example, this communications link can be as simple as a voltage or current level change or a pulse on a direct trigger line, or it can be a high speed communications link connected to each reader with a defined latency such that a packet transfer behaves like a signal trigger. In one embodiment, a wireless signal trigger is provided that may be invoked with RF or infrared to each reader. For example, the wireless signal trigger can have relay points, and can be daisy chained between the multiple readers. Further, commands can be set up prior to the invocation of a trigger, and a reader can wait for a trigger having specific modulation characteristics.

Operating the plurality of readers 10.1-10.q in a highly coordinated operating mode via the above-described techniques facilitates the creation of diversity in the angle of tag interrogation. In one embodiment, the multiple readers are physically separated from one another by a distance commensurate with the range from the readers to the tags. Groups of readers may also be placed on opposite sides of the tags. Further, transmissions from the coordinated readers can be staggered such that when an interrogation sequence is initiated at one of the readers, the other readers follow with their own interrogation sequences directed toward the same vicinity as the interrogation sequence of the first reader. It is noted that the transaction periods of the multiple readers must occur while the tag is in the readers' fields of view for transaction synchronization to be employed. As described above, multiple attempts to read tags from different angles provide independent multi-path profiles, thereby increasing the probability of successfully reading a specific tag.

As described above, the RFID reader 220 (see FIG. 2*b*) can be configured to allow the functionality of the RF power source, the RF data source, and the RF receiver portions of the reader to be implemented as physically separate devices, which can be strategically placed in different locations while being operated in a coordinated manner. Portions of the multiple coordinated readers can be employed in an asymmetric manner to account for cases in which the power coupling zone, i.e., the interrogation zone, of a single reader is smaller than the range at which RF signals from the multiple readers, or back-scattered signals from the tags, can be reliably detected.

Specifically, at least one RF power source and at least one RF data source can be employed to power a tag, while one or more separate RF receivers are used to receive the tag responses. For example, the RF power source and the RF data source can be located close to the tag so that a sufficient signal level is received to power and enable the tag while the RF receiver can be located further away, thereby allowing a single RF power and data source to be logically paired with a multiplicity of receivers for interrogating a multiplicity of locally-powered tags. The associations between the RF transmitters and the RF receivers can be dynamic and mediated by the mid-level processor 402 and the receivers interpreting information from the transmitters and the tags in the course of the shared communication.

As a result, within an array of readers, a single RF receiver is not limited to being matched up with a single RF power source or a single RF data source, and therefore bi-static or multi-static operation within the reader array can be achieved. In the multi-static mode of operation, the configuration and operation of the reader array can be optimized by separately minimizing the numbers of transmitters and receivers necessary to satisfy the application requirements, recognizing that the number, density, and physical placements of the RF power and data sources need not be coincident with the number, density, and physical placement of the RF receivers.

Similarly, an RF power source used to power a tag can be separated from the RF data source and the one or more RF receivers receiving the tag responses. For example, the RF power source can be located close to the tag so that sufficient signal level is received to power and enable the tag, while the RF data source and the RF receiver can be located further away, thereby allowing a single RF data source and receiver to service a wide area of locally-powered tags. In this case, the RF power signal may operate in a frequency band different from that of the RF data source signal. It is noted that a multiplicity of RF data sources and receivers, not necessarily paired, can be arranged to interrogate tags powered by nearby RF power sources.

In addition, operating the plurality of readers 10.1-10.q in a highly coordinated manner via the above-described techniques facilitates the generation of coordinated non-interfering transmissions. Specifically, the above-described techniques can be used to coordinate multiple readers occupying the same general vicinity within a site or facility and connected through a wired or wireless network such that the readers are time-multiplexed and frequency-multiplexed, and their transmit power is adjusted for desired tasks at specific times, thereby reducing the likelihood of the transmissions of one reader interfering with the receptions of the other readers.

In this mode of operation, the channel allocations for frequency multiplexing can be adjusted to accommodate local transmission regulations. For example, if frequency hopping is required, then the channelization can account for hop patterns in a statistical manner. The resulting interference can therefore be estimated probabilistically. The interference estimates may include information relating to the exact selection of carrier frequencies among the multiple readers since different reader manufacturers may choose different frequency plans. The presently disclosed system can coordinate the frequency plans of readers that employ different frequency hopping algorithms, center frequency placements, and resolutions in changing the carrier frequency.

It is noted that time multiplexing of multiple readers may be employed under the following conditions: (1) when the readers occupy the same channel and there is insufficient RF shielding and range between them to allow spatial reuse of the same frequency channel without the RF receiver being disrupted, (2) when the readers are occupying adjacent or separated channels and the adjacent frequency channel rejection is insufficient, and (3) when more than one reader is too close to one tag and the combination of multiple reader transmissions create an interference problem at that tag. It is appreciated that power control and programmable antennae capable of steering, beam forming, and nulling can also be employed to improve spatial reuse, adjacent channel rejection, and prevention of unwanted signals impinging on a tag.

It is further noted that the coordination of multiple readers can be enhanced by making accommodations for potential reader-to-reader interference. Such reader-to-reader interference can be avoided by synchronizing the transmission times of the multiple readers at the packet-scale level. Multiple interrogators simultaneously transmit and multiple receivers simultaneously receive at a time delayed from the activity of the interrogators such that the higher power transmissions do not mask the lower power receptions. Further, the start of transmissions originally scheduled at nearly the same times are delayed. It is noted that a delay range can be established by specifying a time window. In one embodiment, the criteria for mitigating reader-to-reader interference is based on appropriate alignments of the transmit and receive time slots for different readers operating on the same or adjacent but interfering frequency channels. Such alignment can continue throughout the singulation process, which can occur at different rates and with different two-way responses for each reader since the readers can service different tag populations.

Figure 11:
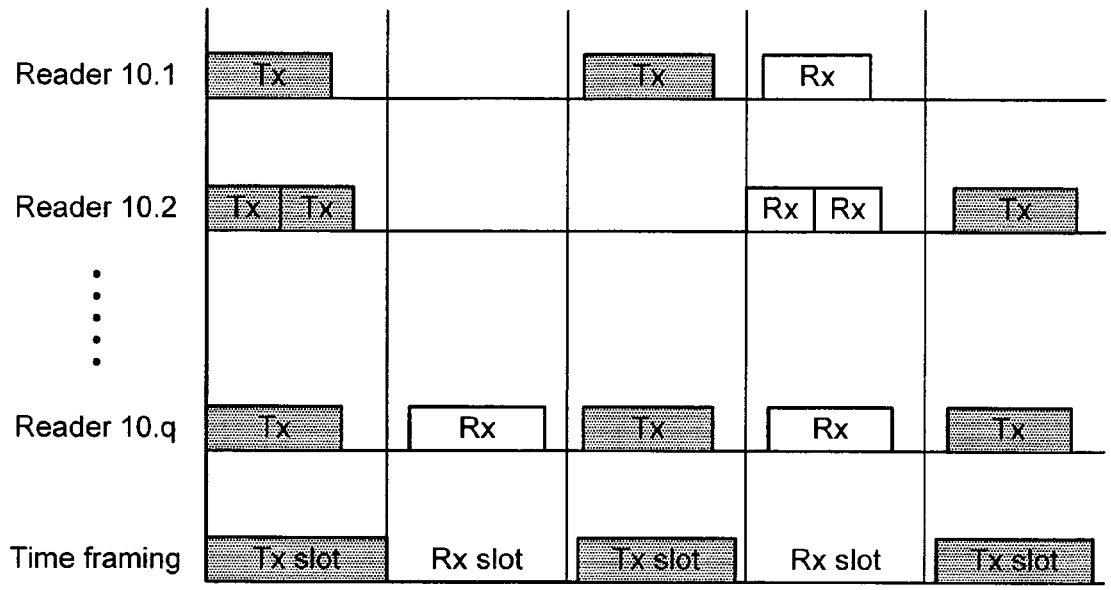
FIG. 11 is a diagram illustrating a representative alignment of transmit and receive time slots for a plurality of RFID readers such as the RFID reader of FIG. 2b.

FIG. 11 depicts a representative alignment of transmit (Tx) time slots and receive (Rx) time slots for a plurality of synchronized readers 10.1-10.q. Time multiplexing is established across the multiple readers 10.1-10.q, and the individual reader devices and tags operate accordingly. The readers 10.1-10.q assert the transmission sequence and the tags synchronize and respond to the transmissions according to the receive slot start and end times (see the Time framing illustrated in FIG. 11), which can be established during the initial setup of the sequence.

The array of coordinated readers can be used to detect and prevent rogue or unauthorized RF transmitters from reading tags, reprogramming writable tags, and/or issuing kill commands by sending intentionally confusing RF signals to the tags. For example, the issuance of a kill command can permanently disable a tag, and render the tag useless and the item or individual to which it is attached undetectable by the system. In the event the mid-level processor 402 detects such rogue or unauthorized transmitters by monitoring the reader activity, the processing component can cause one or more RF signals to be transmitted to interfere with the rogue/unauthorized transmitters, thereby placing modulation on the unauthorized RF data and causing the tags to misinterpret the kill commands. This technique can also be used to prevent other unauthorized communications with the tags. In addition, the presently disclosed system can correlate the operations of the readers with the commands impressed on those devices by the mid-level processor 402. In this way, the system can discover data operations that may have been forged (i.e., the data operations did not correlate to the corresponding RF operations) or masked (i.e., the RF operations did not result in the corresponding data operations).

The array of coordinated readers can also determine the location of a particular reader via wired (e.g., Ethernet) or wireless (e.g., IEEE 802.11) signaling. Specifically, the coordinated readers can monitor each others' backbone transmissions and/or tag transmissions, and use the times of signal arrival, time differences of signal arrival, and information relating to antenna beam pointing, antenna nulling, and received signal strength to determine the physical locations of the readers installed in the system and any new readers subsequently added to the system. In this way, the need to manually configure the exact position of each reader deployed at a site or facility can be avoided. In addition, this technique can be used to enhance security by determining the locations of rogue readers that may have been inserted into the reader network, and might attempt to communicate via the reader backbone. This location information can then be compared against expected values for the installed readers, and any deviations (which may be indicative of malfunctioning readers or tampering) can be reported to the system operator (Operator).

In addition, the time of arrival measurements may be performed with two-way transmission-reception measurements that measure the fixed delays through the reader and tags combined with the two-way propagation time delay. The measurements of delays that are smaller in time than the clock resolution of the measuring device are made by conceptually "chaining" the measurements. The interrogator sends a train of commands, starting each subsequent command a fixed time after the response from the previous one. The internal clock is used to measure the total time of the sequence of commands and the responses. The time difference of these measurements between readers are used to triangulate the location of the tag. The readers can also determine if a tag is moving away from or toward the reader by performing this measurement, and at what rate this movement occurs. Inherent averaging of the chained measurements reduces the noise in the measurement. Measurements may be further averaged to improve noise characteristics.

The array of coordinated readers can also identify the locations of tags within a predetermined area using coordinated RF transmissions. Further, the responses of the tags to the coordinated reader transmissions can be correlated and the general locations of the tags deduced from the correlated responses. As described above, this technique of tag location is referred to herein as tag location virtualization. It is noted that, based on a sequence of known locations relative to co-interrogating readers, the path of travel or trajectory of a tag in the RFID environment can also be deduced by this technique. In addition, tags that are nearly co-located can be identified as being attached to different packages, carriers, pallets, etc., even though they may all be in the main-beam of a single reader. As described above, such co-located tags may be logically grouped together by a process referred to herein as container virtualization.

Location Virtualization

The processing performed by the tag location virtualization sub-component (see FIG. 4a) includes mapping the tag data to actual physical locations within the RFID environment. For example, the physical locations may be defined in the context of a floor plan of a site or facility, i.e., specific functional areas (e.g., receiving areas), particular portals in the workflow (e.g., dock doors), and/or collection areas (e.g., assembly areas). The physical locations may also be defined in the context of a particular business purpose such as inventory calculation, asset tracking, vehicles and conveyance monitoring, access control and security, or any other suitable business purpose. In the presently disclosed embodiment, tag location virtualization is implemented using a process that, over configurable time intervals, resolves tag interrogations performed by the readers 10.1-10.q (including any logical readers) into a plurality of sub-locations or "segments", which are subsequently combined and compared against the defined locations within the environment.

As described above, a logical reader is defined herein as the combination of a physical reader ID and the set of reader parameters that were in effect at the time a reported interrogation was collected by that physical reader. A logical reader therefore has an associated interrogation zone. It is noted that an interrogation zone can vary over time since the RFID environment of the reader (or the logical reader) can vary over time. The mid-level processor 402 (see FIGS. 4a-4c) is operative to compute the extent of the interrogation zones associated with the respective readers, and to detect any variations in the interrogation zones via a number of mechanisms including computation (given the reader/antenna electrical characteristics and a description of the physical RFID environment in which the reader is operating, e.g., the floor plan, layout, and construction materials used), an analysis of location benchmark tag interrogations, and an analysis of tag data collected by other readers in the vicinity.

Interrogation zones typically correspond to 3-dimensional volumes, however, in some applications, interrogation zones may be represented by 2-dimensional areas, e.g., in the event the tags being interrogated are confined to planar sections of the interrogation zones. For example, such tags may be attached to cartons moving on a planar conveyor belt. Further, in the event the readers employed in the system are operable in the bi-static or multi-static operating modes, i.e., the readers can perform RF transmit and receive functions independently, the definition of a logical reader can be extended to include the identity of the transmitting reader and its corresponding transmit parameters, and the identity of the receiving reader and its corresponding receive parameters. It is noted that, in the event the readers are operative in the multi-static mode, a single interrogation operation may involve and generate reports from a multiplicity of logical readers (e.g., one for each transmitter/receiver combination).

As described above, tag location virtualization processing includes resolving tag interrogations performed by the readers 10.1-10.q (including any logical readers) into segments, and combining and comparing these segments against defined physical locations within the RFID environment. Such segments can be determined by computing the intersection or overlap of all of the interrogation zones within the system. It is noted that in the determination of segments, the interrogation zone of a reader generally corresponds to the RF coverage of that reader. Interrogation zones that do not intersect or overlap other interrogation zones are also regarded herein as segments. The segments can be determined at system initialization and recomputed as required during system operation, e.g., as the physical extent of the underlying interrogation zones change. Because interrogation zones can be represented by 3-dimensional volumes or 2-dimensional areas, segments can also be represented by 3-dimensional volumes or 2-dimensional areas. In addition, the defined physical locations within the RFID environment can take the form of 2-dimensional (e.g., polygonal) or 3-dimensional (e.g., polyhedral) geometrical shapes, and can intersect with, overlap, or be wholly contained within one or more other defined locations. During the location virtualization process, the tag locations are determined using inclusive and/or exclusive combinations of various segment resolutions for tag interrogations occurring over predetermined time intervals.

One of the factors that affects the precision and accuracy of location virtualization is the ability to compute, monitor, and track interrogation zones of each logical reader correctly. The interrogation zone is a function of the logical reader's operational parameters (e.g., the transmit power, the receive sensitivity), the physical placement and orientation of the antenna, the RF environment in the vicinity of the antenna, the tag type, the tag orientation, and the penetration characteristics of the interfering medium if the tag happens to be facing away from the antenna. The interrogation zone determines several configuration parameters in the tag data processing component 452, e.g., co-interrogating readers, the smoothing window, the locationing window, and the segments.

The tag type can be distinguished using a handful of bits in the tag identifier field, or by the fact that the tag is a passive, semi-passive, or active tag. For example, a reader operating at full power may have a tag range for a passive tag of about 4 meters. The same reader operating at full power may have a tag range for an active tag of about 20 meters. The definition of a logical reader can be extended to include the tag type.

Figure 5:
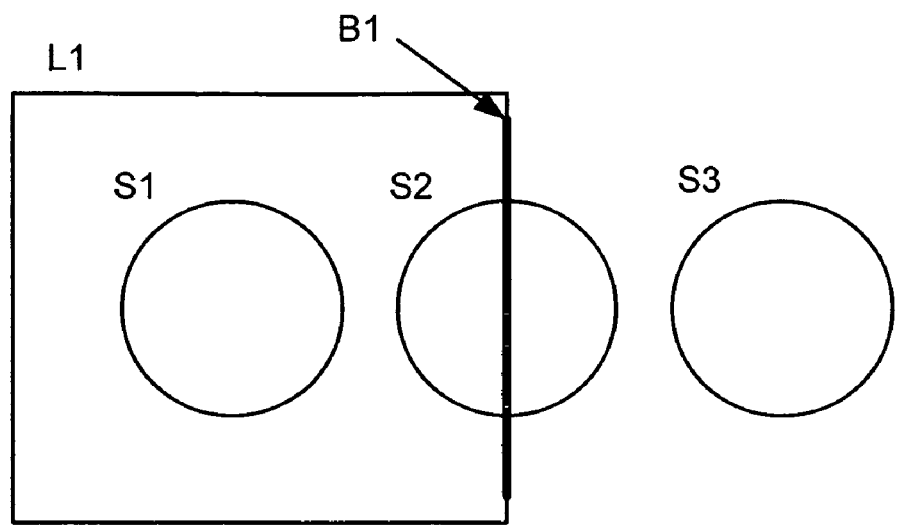
FIG. 5 is a diagram of an illustrative example of a boundary associated with a representative RFID tag location within an RFID environment in which the system of FIGS. 3a-3b operates.

It is noted that one or more of the boundary surfaces or lines associated with a tag location may be defined as a hard boundary, thereby indicating that this boundary represents a definitive demarcation. In the event of an ambiguity regarding an interrogated tag's actual physical location relative to such a hard boundary, the system would not declare the tag to be in that location. FIG. 5 depicts an illustrative example of a hard boundary B1 associated with a location L1. In this example, location virtualization processing may resolve a tag location into one of three possible segments S1-S3. In the event a tag were resolved to segment S1, the location virtualization processing would declare that tag to be in location L1. In the event the tag were resolved to segment S3, the location virtualization processing would not declare that tag to be in location L1. However, if the tag were resolved to be in segment S2, then there would be some ambiguity in the tag's location relative to the boundary B1. Because, in this example, the boundary B1 is defined as a hard boundary, the location virtualization processing would not declare that tag to be in location L1.

It is further noted that one or more of the boundary surfaces or lines associated with a tag location may be defined as a soft boundary, thereby indicating that this boundary is not a definitive demarcation. In the event of an ambiguity regarding a tag's actual physical location relative to a soft boundary, the system would declare the tag to be in that location. With reference to the example illustrated in FIG. 5, if the boundary B1 were defined as a soft boundary, then location virtualization processing would declare a tag resolved to be in either segment S1 or S2 to be in location L1. It is noted that a single tag interrogation can result in multiple location virtualizations since tag locations can overlap, and interrogation and segment resolutions may not necessarily resolve to a single location.

In the presently disclosed embodiment, two inputs, namely, pace and priority, are employed in the processing performed by the tag location virtualization sub-component. Specifically, pace is defined herein as the rate at which tagged items traverse predefined locations within the RFID environment, and is generally a property of the physical system. The pace input is used to derive the size of time windows for determining the segment resolution. For example, the pace input values may be expressed either quantitatively in the form of minimum traversal times (seconds) or qualitatively, e.g., slow, medium, or fast. The priority input relates to the relative importance of an interrogation's reliability in a predefined location within the RFID environment. The priority input also provides additional guidance for an interrogation scheduler function (see the scheduler sub-component included in the reader coordination component 460 of FIG. 4*b*) when the demands of an interrogation operation exceed pre-defined time, RF spectrum frequency, and/or power constraints. For example, the priority input values may be expressed qualitatively, e.g., low, medium, or high. The results of location virtualization processing include the tag identity, the identification of the location or locations where the tag is determined to be located, a timestamp (e.g., the timestamp of the most recent interrogation contributing to the location virtualization processing), and any associated tag data that may have accompanied the interrogation.

It should be appreciated that the location virtualization processing performed by the tag data processing component 452 (see FIG. 4*a*) effectively de-couples the client applications from the actual physical configuration of the system. Further, during location virtualization processing, application data is provided as tag location data as opposed to tag interrogation data, and is therefore generally more useful for particular business purposes. The location virtualization sub-component stores the tag location data in the tag location database via a tag data distribution sub-component (see the tag information services component 454). The tag locations can therefore be accessed by database and event-generation services (see direct database access and event generating (eventing) sub-components within the tag information services component 454) and a reader-client application interface (see the tag information services component 454). As a result, the operation of the various interfaces and the contents of the various databases within the mid-level processor 402, as well as the operation of the interfaces and the data contents of the client applications, are generally more accurate and relevant for the particular business purpose.

As described above, tag location virtualization processing provides information to the interrogation scheduler function within the reader coordination component 460 (see FIG. 4*b*). Such information can take the form of a list of logical readers, a predetermined time interval during which a tag interrogation must be performed to be the most useful, and the identity of the tag or tags for which the location virtualization was performed. It is noted that the predetermined time interval (also referred to herein as the traversal deadline) can be derived from configuration data and/or an estimate of the physical pace of the tag through the readers' RF fields of view. In this way, the tag data processing can be coupled to the interrogation scheduler function, thereby providing a tag data-to-scheduling mechanism that can improve the performance of the overall system to achieve greater accuracy, lower latency, and greater power efficiency, as well as the elimination of unnecessary and/or redundant interrogation operations.

Figure 6:
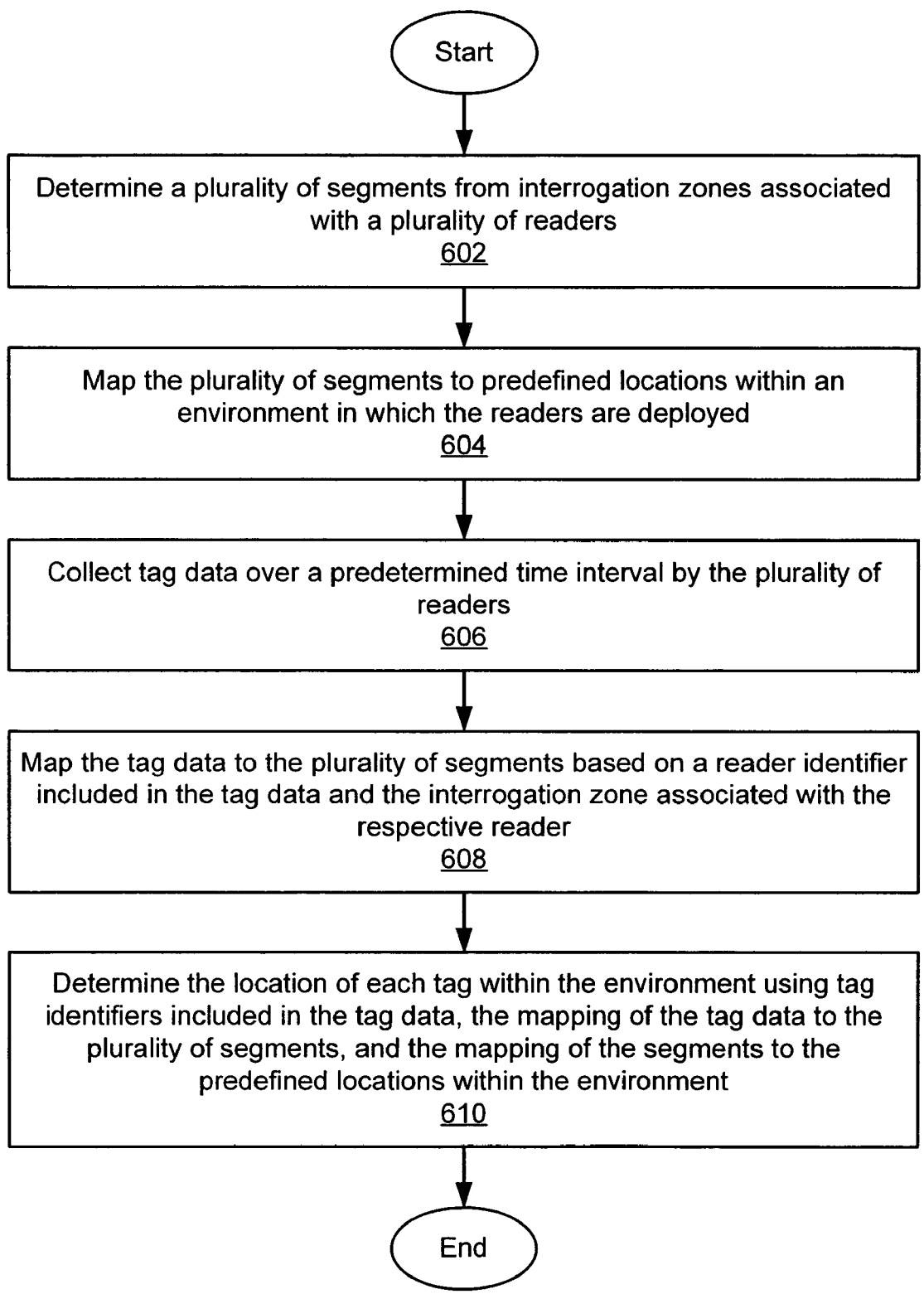
FIG. 6 is a flow diagram of a first method of performing RFID tag location virtualization processing performed by the mid-level processor of FIGS. 4a-4c.

A first method of performing tag location virtualization processing within an RFID environment by a system including at least one mid-level processor, a plurality of readers, and a plurality of tags is illustrated by reference to FIG. 6. It is understood that each reader within the system has an associated interrogation zone. It is further understood that each reader includes an RF interrogator and an RF receiver residing in separate units or integrated into a single device, the combination of which is operative to identify the location of a tag. The composite size and shape of each reader's interrogation zone may therefore be determined by the transmit range of the interrogator or the receive range of the receiver, which may vary according to the tag type. As depicted in step 602, a plurality of segments is determined from the interrogation zones associated with the plurality of readers, in which each segment corresponds to either an intersection of two or more interrogation zones or a single non-intersecting interrogation zone. Next, the plurality of segments is mapped to predefined locations within the RFID environment, as depicted in step 604. Tag data is then collected by the plurality of readers, as depicted in step 606, over a predetermined time interval. The tag data collected by each reader from each tag within its interrogation zone includes a first identifier identifying the tag and a second identifier identifying the reader. Next, the tag data is mapped to the plurality of segments, as depicted in step 608, based on the reader identifier included in the tag data and the interrogation zone associated with the identified reader. The location of each tag within the RFID environment is then determined, as depicted in step 610, using the tag identifier included in the tag data, the mapping of the tag data to the plurality of segments, and the mapping of the segments to the predefined locations within the environment.

Figure 28A:
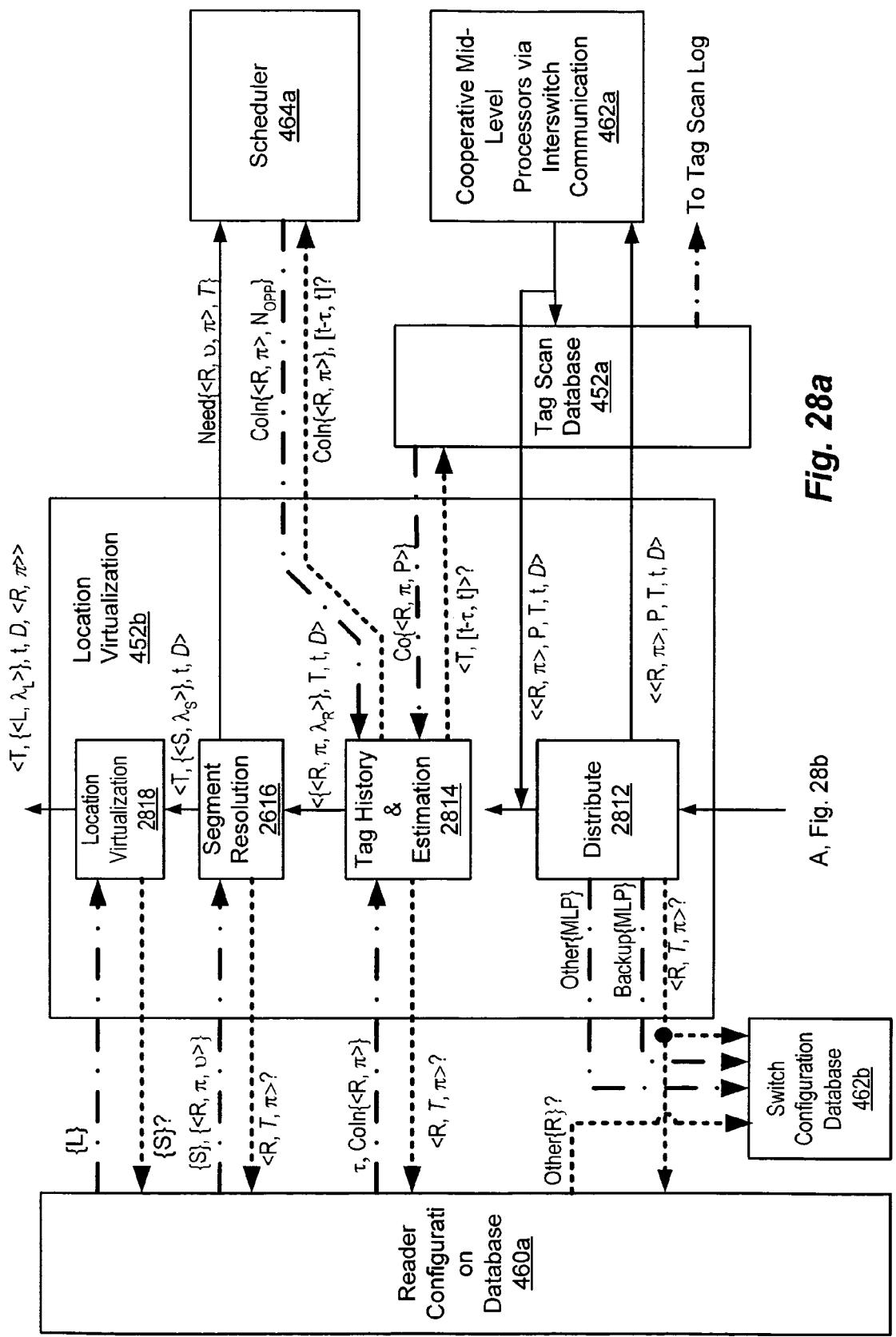
FIGS. 28a-28b is a flow diagram of a second method of performing RFID tag location virtualization processing performed by the mid-level processor of FIGS. 4a-4c.

A second method of performing tag location virtualization processing within an RFID environment by a system including at least one mid-level processor, a plurality of readers, and a plurality of tags is illustrated by reference to FIGS. 28a-28b. This second method is executed by the mid-level processor 402 (see FIGS. 4a-4c) for each tag interrogation event received from a reader or relayed from a cooperating mid-level processor, i.e., a mid-level processor supporting a reader that is a co-interrogator with readers supported by this mid-level processor 402.

The smoothing function (see block 452c of FIG. 28b) may be implemented in the reader or the cooperating mid-level processor, and may use simple metrics over short time intervals to limit repeated, redundant read events from readers over suitably short time intervals, and to reliably generate the tag presence bit. T is a configuration parameter associated with each reader that is the maximum traversal time of all potential location resolutions in which the reader is included. Co<R, π, P> is the set of current (over a time window) co-read events for this tag interrogation event. CoIn<R, π, P> is the set of of co-interrogating logical readers, given any member of that set, and including that member. Cooperating mid-level processors designated as OtherRFX are those managing logical readers indicated in the All{R} set for this interrogation event, as is any mid-level processor designated as BackupRFX assigned as a backup for the reader sourcing this interrogation event. Need{R} is the minimum set of readers (and associated reader parameters, π, e.g., power level, filter information (to target a specific T) managed by this mid-level processor necessary to refine otherwise loose or ambiguous segment resolution. It is computed by subtracting the current and co-interrogating logical readers from the All{R} set for this interrogation event. υ is a configuration parameter associated with each reader for each potential location resolution. It is the upper bound latency for a read to be scheduled to refine a location resolution. <R, π> is a logical reader for an interrogation event. It is a reader ID in combination with the reader parameters in use for that interrogation, e.g., transmit power level, receiver sensitivity, and antenna orientation/polarization. A location benchmark tag is a tag affixed to a physical location (stationary or mobile) within the site or facility in which the readers are deployed. Reading benchmark tags allows the RFID reader array to calibrate itself to the physical environment. $\lambda_R$, $\lambda_S$, and $\lambda_L$ are the resulting likelihood estimates [0 . . . 1] for one or more readers, segments, and locations, respectively, in the context of a tag interrogation event. Instead of computing and propagating the numerical value of the estimate, the location virtualization function 452b (see FIG. 28a) may implement a fixed or configurable threshold that passes a Boolean presence, P, to conserve computation.

Figure 28B:
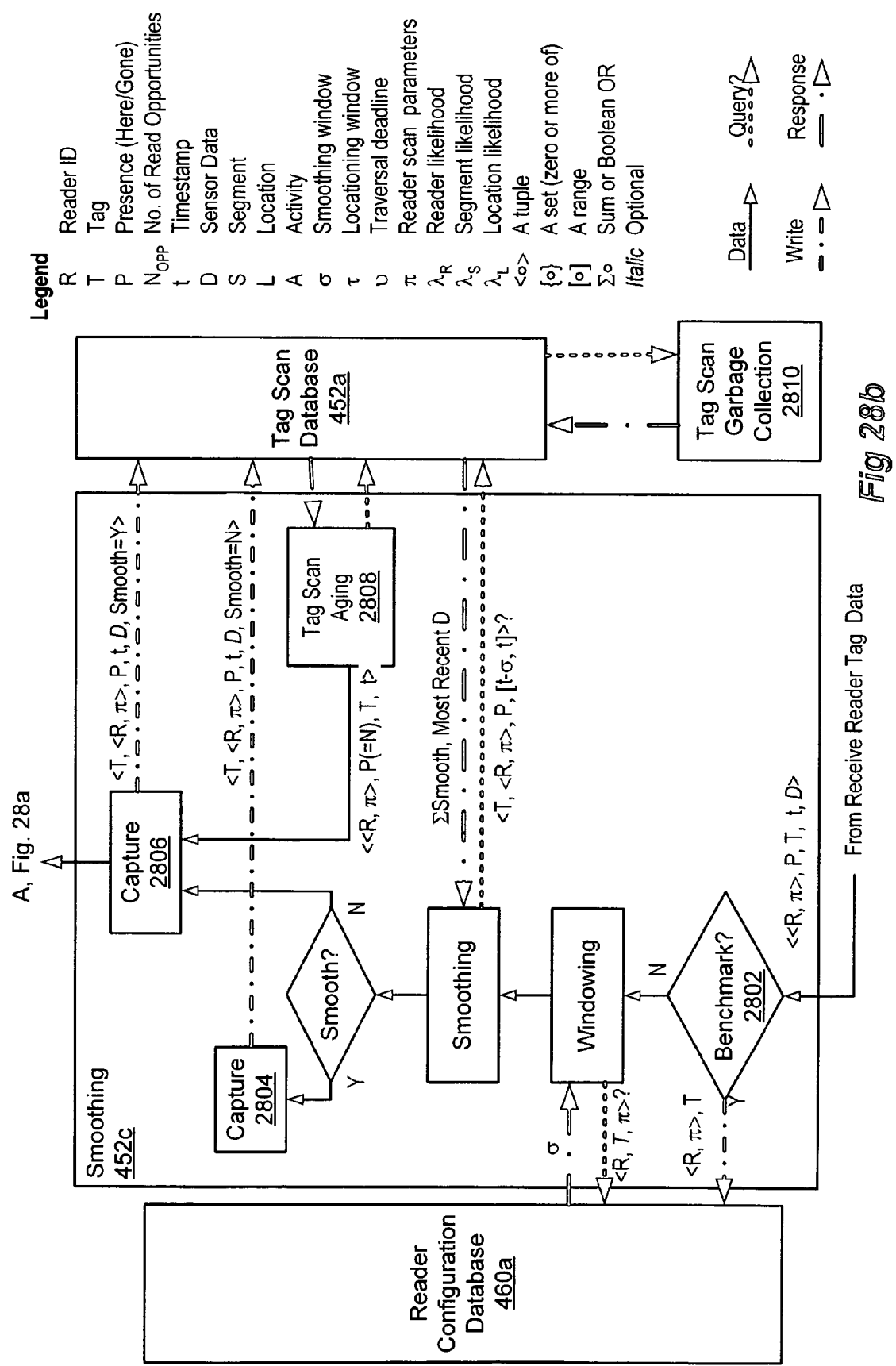

As shown in FIG. 28b, data collected from interrogations of location benchmark tags are diverted (see block 2802 of FIG. 28b) to the configuration database 460a included in the reader configuration component 460 (see FIG. 4b), and incorporated into the co-interrogation, co-interference, segment-mapping, and physical location elements included therein. The data smoothing function 452c (see FIG. 28b) performed by the scan data receive and smoothing sub-component within the tag data processing component 452 (see FIG. 4a) captures every reader-sourced interrogation in the tag scan database (see blocks 2804, 2806 of FIG. 28b). However, the data smoothing function 452c will only pass repetitive interrogation data (e.g., same logical reader, same tag, same optional sensor data) to the location virtualization function 452b (see FIG. 28a) at a maximum rate of 1/σ, in which "σ" is a logical-reader-specific, configurable smoothing interval. The above-described function for organizing and reclaiming memory used for obsolete tag data storage is implemented to source negated, timed-out tag data for previously reader-sourced interrogations. This timed-out tag data are also captured in the tag scan database (see block 2808 of FIG. 28b), and are processed by the location virtualization function 452b (see FIG. 28a). The function for organizing and reclaiming memory also implements a "garbage collection" function (see block 2810 of FIG. 28b) that over a time interval at least twice the maximum locationing window or smoothing intervals, examines database entries and deletes those entries that are older than that interval. As described above, the location virtualization function 452b (see FIG. 28a) operates by retrieving related tag interrogation information from the tag scan database over a window interval τ, resolving data collected from one or more interrogations to one or more segments, and then mapping those segments to locations within the environment. By mapping the tag data to segments and then mapping the segments to locations, the dynamic nature of the RF environment is coupled to defined physical locations within the site or facility in which the readers are deployed.

As described above, the tag interrogations from co-interrogating readers can be collated to infer segments in which the tag is currently located. It is noted that the co-interrogating readers may be distributed across a plurality of mid-level processors 402 (see FIGS. 4a-4c). To collate the tag scan observations, the tag data received from the smoothing function 452c (see FIG. 28b) in a mid-level processor 402 are distributed (see blocks 2812, 462a of FIG. 28a) to the mid-level processor's co-interrogating mid-level processors. The mid-level processor co-interrogation matrix, which encodes the mapping of each mid-level processor to its set of co-interrogating mid-level processors, is stored in the switch configuration database 462b (see FIG. 28a).

The tag data from the co-interrogating readers are collated, and readers that have concurrently observed the tag are determined. The window of time to determine concurrency is called the locationing or observation window. The locationing window is a function of the interrogation zone of the reader and the pace of the tag. This window is configurable per logical-reader (and optionally per tag type), and determined by, e.g., the pace of the tags in the location, the tag type (active, passive, TID, etc.), and the operating profile of the logical reader (transmit power, receive sensitivity, etc.). For example, a reader operating at full power may have a locationing window for a passive tag of about 1 second. The same reader operating at full power may have a locationing window for an active tag of about 5 seconds.

The Tag History and Estimation block 2814 determines and estimates the most likely set of readers that have observed the tag in the locationing window. In one embodiment, this block 2814 uses information from the tag scan database 452a (see FIG. 28a) for the history of tag interrogations, the reader configuration database 460a (see FIG. 28a) for the set of co-interrogating readers, and the reader coordination component 464 (see FIG. 4c) for the history of read requests for the co-interrogating readers, to derive the set of logical readers that have concurrently observed the tag.

The concurrent reader observations are then resolved to segments in the segment resolution block 2816. The location virtualization block 2818 maps the segments to locations. The observation data generated by the location virtualization function 452b (see FIG. 28a) and sent to the tag information services component 454 (see FIG. 4a) includes the tag ID, timestamp, and one or more of the following: the list of resolved locations, the list of segments, the logical reader identifier whose tag interrogation triggered this output, the duration of stay of the tag at the resolved locations, the tag trajectory, and the tag containerization information.

Figure 7:
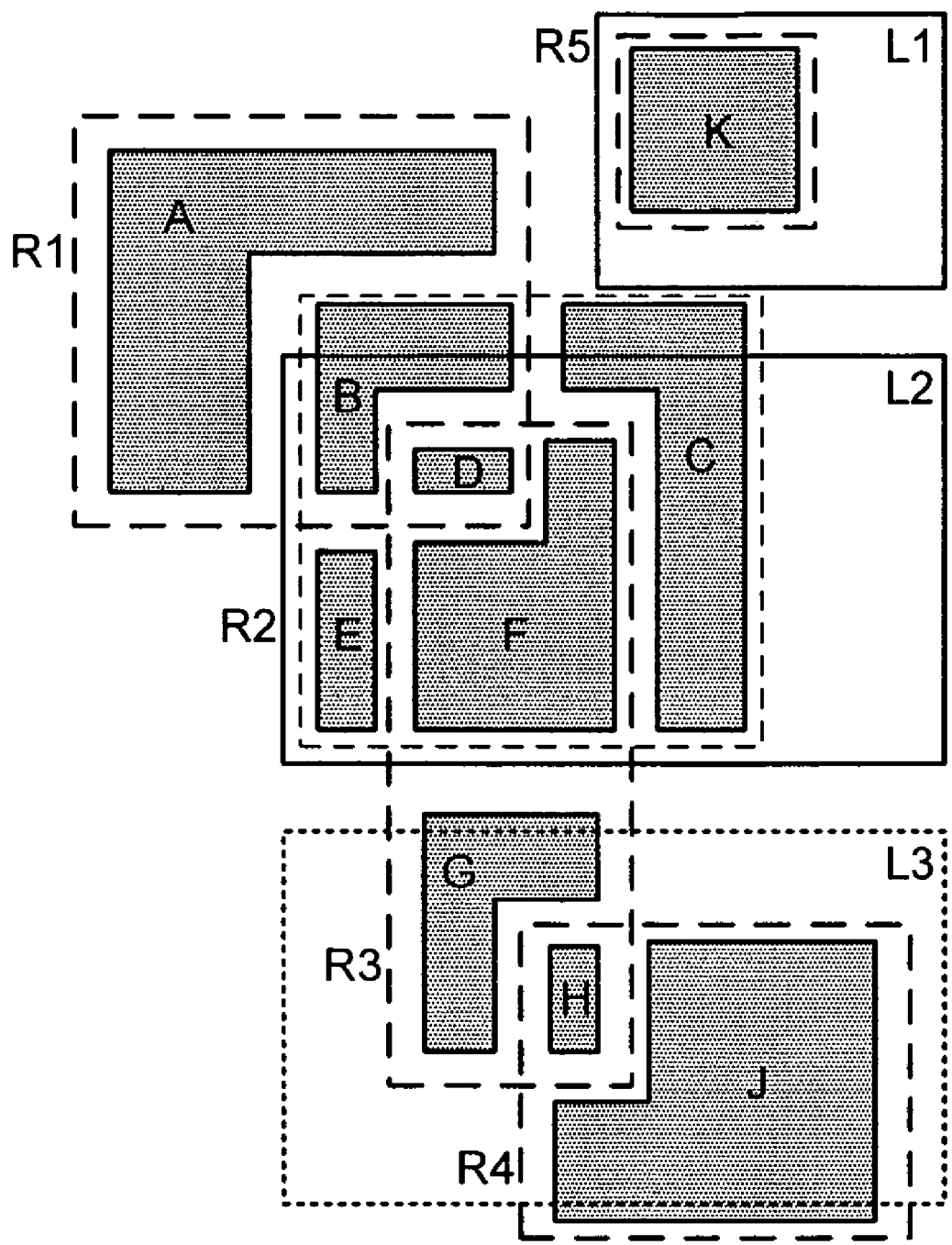
FIG. 7 is a diagram illustrating an example of RFID tag location virtualization processing.

The tag location virtualization processing method described above will be better understood with reference to the following illustrative example and FIGS. 7-9. In this example, a plurality of segments A-H, J-K are defined by the interrogations zones associated with a plurality of readers R1-R5. Specifically, segment A corresponds to a non-intersecting portion of the interrogation zone of reader R1, segment B corresponds to the intersection of the interrogation zones of readers R1-R2, segment C corresponds to a first non-intersecting portion of the interrogation zone of reader R2, segment D corresponds to the intersection of the interrogation zones of readers R1-R3, segment E corresponds to a second non-intersecting portion of the interrogation zone of reader R2, segment F corresponds to the intersection of the interrogation zones of readers R2-R3, segment G corresponds to a non-intersecting portion of the interrogation zone of reader R3, segment H corresponds to the intersection of the interrogation zones of readers R3-R4, segment J corresponds to the non-intersecting portion of the interrogation zone of reader R4, and segment K corresponds to the non-intersecting interrogation zone of reader R5. FIG. 7 also depicts a plurality of predefined non-intersecting locations L1-L3 within an RFID environment. It should be understood that in alternative embodiments, one or more of the locations within the RFID environment may be predefined such that they intersect or completely contain other predefined locations within the environment. In this example, the locations L1-L2 are predefined as having hard boundaries, and the location L3 is predefined as having soft boundaries.

FIG. 8 depicts a co-interrogation matrix constructed from the interrogation zones of the readers R1-R5 and the segments A-H, J-K of FIG. 7, indicating the readers that share one or more segments. As shown in FIG. 8, the readers R1 and R2 share at least one segment, as indicated by the numeral "1" at the intersection of row R1 and column R2. As further shown in FIG. 8, the readers R1 and R4 do not share a segment, as indicated by the numeral "0" at the intersection of row R1 and column R4. In an alternative embodiment, a co-interrogation matrix may be constructed representing the co-interrogation between multiple mid-level processors instead of readers. In this matrix, if at least one reader owned or backed-up by a mid-level processor co-interrogates with at least one reader owned or backed-up by another mid-level processor, then the corresponding row/column of the matrix is set to "1".

FIG. 9 depicts an illustrative segment resolution matrix, which may be employed to encode tag presence for the plurality of readers R1-R5. As shown in FIG. 9, segments A, B, and D are within the interrogation zone associated with reader R1, as indicated by the numeral "1" in rows A, B, and D under column R1. As similarly indicated in FIG. 9, segments B, C, D, E, and F are within the interrogation zone of reader R2, segments D, F, G, and H are within the interrogation zone of reader R3, segments H and J are within the interrogation zone of reader R4, and segment K is within the interrogation zone of reader R5. In this example, the plurality of segments A-H, J-K are mapped to the plurality of predefined locations L1-L3 as follows.

$$L1 = K \quad (1)$$

$$L2 = \sim(B+C) \cdot (D+E+F) \quad (2)$$

$$L3 = G+H+J \quad (3)$$

As described above, the location L2 has hard boundaries, and therefore any tags detected within the segments B and C (which overlap the upper hard boundary of location L2) must be completely within the boundaries of the location L2 to be designated by the tag location virtualization processing method as being within location L2. This requirement is expressed in equation (2) above as "$\sim(B+C)$".

As further described above, the mid-level processor 402 (see FIGS. 4a-4c) is operative to perform tag location virtualization processing and container virtualization processing to estimate the locations of tags within an RFID environment, and to determine tag group associations within the environment, respectively. More specifically, the reader configuration component 460 included in the mid-level processor 402 (see FIGS. 4a-4c) is operative to send commands to the plurality of readers 10.1-10.q, thereby causing the transmitter components of the readers to transmit RF signals to interrogate one or more tags within their respective interrogation zones, and to receive RF signals comprising tag data from the tag(s) in response to the transmitted RF signals. The results of these RF operations are then sent by each reader to the mid-level processor 402. For example, such results can include RF analysis reports, and tag access and observations reports. The reader configuration component 460 processes the RF analysis reports, while the tag data processing component 452 within the mid-level processor 402 processes the tag access and observation reports. For example, the data in each tag access and observation report can include one or more of the following information for each interrogated tag: a tag identifier, sensor data, a timestamp, RSSI, the frequency channel when the tag was read, the number of times the tag was read, and information stored in tag memory. The tag data processing component 452 processes the tag observations, and infers information such as the locations of selected tags, the direction of tag flow, and tag group associations from this processed tag data.

In the presently disclosed embodiment, the mid-level processor 402 effectively operates as a gateway between the plurality of readers 10.1-10.q and the client applications. For example, each client application can specify a set of locations within the RFID environment, and subscribe to one or more events potentially occurring within these locations. The set of locations may be defined in the context of a floor plan of a site or facility, which is equipped with readers located at appropriate locations so that the areas of interest to the client applications have the required RF coverage. For example, one or more readers may be employed to cover each location within the site or facility in which the readers are deployed. The tag data processing component 452 publishes the events subscribed to by the client applications to the respective applications as they occur.

In one embodiment, each reader has a limited area of RF coverage associated therewith. The RF coverage area associated with a reader corresponds to points within the site or facility where the reader can successfully power up a passive tag and decode the tag's backscatter. The RF coverage range of a reader can vary with changes in the RF interference within the RFID environment. If the RF interference does not change substantially over time, then the RF coverage of a reader at a specified point within the site or facility can be regarded as being time-invariant. For example, in an unchanging RF interference environment, if a reader interrogates a stationary tag within that reader's RF coverage area multiple times, then the characteristics of the tag's responses to the multiple interrogations (or lack of response) remain the same. It is noted that the RF interference within an environment can change due to a change in distance between a reader and a tag, changes in the angle of incidence of a transmitted RF signal on a tag, the presence of external interference sources, changes in reader settings (e.g., sensitivity and transmit power level), and RF transmissions of other readers within the site or facility.

In a multi-path RF environment, i.e., an environment in which a reader can interrogate a tag by transmitting/receiving RF signals to/from the tag through different multi-path profiles, there may be little correlation between the RF power received by a reader from two points within a site or facility in which the reader is deployed. This lack of correlation in the received RF power can be beneficial in RFID environments where the tag and/or the reader are mobile. For example, in the event the tag moves from point X to point Y within the site or facility, the path fade characteristics of RF signals transmitted from the reader to the tag may change, thereby causing changes in the amount of RF energy incident on the tag. Accordingly, there may be instances when the tag located at point X does not respond to an interrogation of that tag by the reader, but does respond to a subsequent interrogation by the reader after changing locations from point X to point Y.

As described above, the tag location virtualization sub-component included in the tag data processing component 452 (see FIG. 4a) is operative to estimate the locations of tags within a site or facility by mapping tag data collected by one or more readers to actual physical locations within the RFID environment. The tag location virtualization sub-component may employ the known Bayes' theorem from probability theory to infer the tag locations. For example, the information in a tag observation report sent by a reader disposed at a fixed location in the site or facility to the mid-level processor may be expressed as $$<T,R,t>, \qquad (4)$$

in which "T" is the tag identifier, "R" is the reader identifier, and "t" is the timestamp of the most recent interrogation contributing to the location virtualization processing. The likelihood that the tag is at point x in the site may therefore be expressed as $$P(T \text{ at } x | <T,R,t>) = P(<T,R,t> | T \text{ at } x) * P(T \text{ at } x) / P(<T,R, t>), \qquad (5)$$

i.e., the probability of tag T being at point x given $<T,R,t>$ is equal to the probability of the reader observing tag T given that tag T is at point x times the probability of tag T being at point x divided by the probability of the reader observing tag T.

Because the reader in fact sent the tag observation report $<T,R,t>$ to the mid-level processor, it can be concluded that the reader actually observed the tag T within the site. Accordingly, $$P(<T,R,t>)=1, \qquad (6)$$

and equation (7) above may be expressed as $$P(T \text{ at } x | <T,R,t>) = P(<T,R,t> | T \text{ at } x) * P(T \text{ at } x), \qquad (7)$$

in which "P(T at x)" is the prior likelihood estimate of the tag T at point x, and "P($<T,R,t>$|T at x)" is the likelihood of the tag T being observed by the reader when the tag was at point x. In one embodiment, multiple reader observations are combined and aggregated to compute the likelihood of a tag in each location in the site or facility. The tag data processing component 452 then infers the tag to be in a particular location or set of locations having the maximum likelihood.

The configuration elements employed by the tag data processing component 452 include the physical layout of the site or facility including a connected reader set (CRS), as described below, and a mapping of segments to locations corresponding to the physical layout; reader parameters including an identification of the set of readers providing tag data to the tag data processing component 452, a data smoothing window (i.e., the rate limit interval for filtering redundant tag observations), and an observation window (the logical reader observations that fall into the observation window are considered concurrent observations and are used to resolve segments); identifiers for location benchmark tags, i.e., a list of tags (or tag filter masks) that act as location benchmark tags in the site or facility; and, a co-interrogation matrix (see, e.g., FIG. 8). It is understood that such configuration elements are stored in the configuration database within the reader configuration component 460 (see FIG. 4b) included in the mid-level processor 402.

It is noted that the terms "logical readers" and "logical readpoints" are employed herein interchangeably. As defined herein, a logical readpoint is a schedulable entity in the reader scheduler sub-component on the reader coordination component 464 (FIG. 4c). Each logical readpoint represents a physical readpoint operating in accordance with a particular operating profile. Parameters such as power level, sensitivity level, air protocol, and antenna direction determine the operating profile. For example, a logical readpoint may be expressed as $$<\text{physical-readpoint, power level}>, \qquad (8)$$

which indicates that this logical readpoint represents a physical readpoint operating at a specific power level.

The overlap/non-overlap of the RF coverage areas of a plurality of logical readers can be used to generate a set of connected graphs, in which each logical reader is a node in a respective one of the graphs. Further, there is an edge between a node i and a node j if the coverage area of a logical reader i overlaps the coverage area of a logical reader j. A connected reader set (CRS) is defined herein as a set of nodes having a path comprising one or more edges between them. For example, a site or facility can have one or more CRSs. By definition, CRSs are not connected to one another, and therefore a logical reader or node can be a part of only one CRS.

In one embodiment, the data structure of a CRS includes the following elements:
(1) an identifier of the CRS,
(2) a set of logical readers that are part of the CRS,
(3) a set of segments formed by the logical readers, and
(4) N rows, in which each row j comprises the following:
 (a) an L bit binary or ternary (i.e., 0, 1, or X) vector, V(j): 1 bit per logical reader, in which "L" is the cardinality of a logical reader set. This is referred to herein as the observation vector. It is noted that $N \leq 2^L$.
 (b) a vector of S numbers, Likelihood(s, j): 1 number per segment, in which "S" is the cardinality of the segment set, and "Likelihood(s, j)" represents the likelihood of a tag being in segment index s when the observation vector is V(j).

Figure 16:
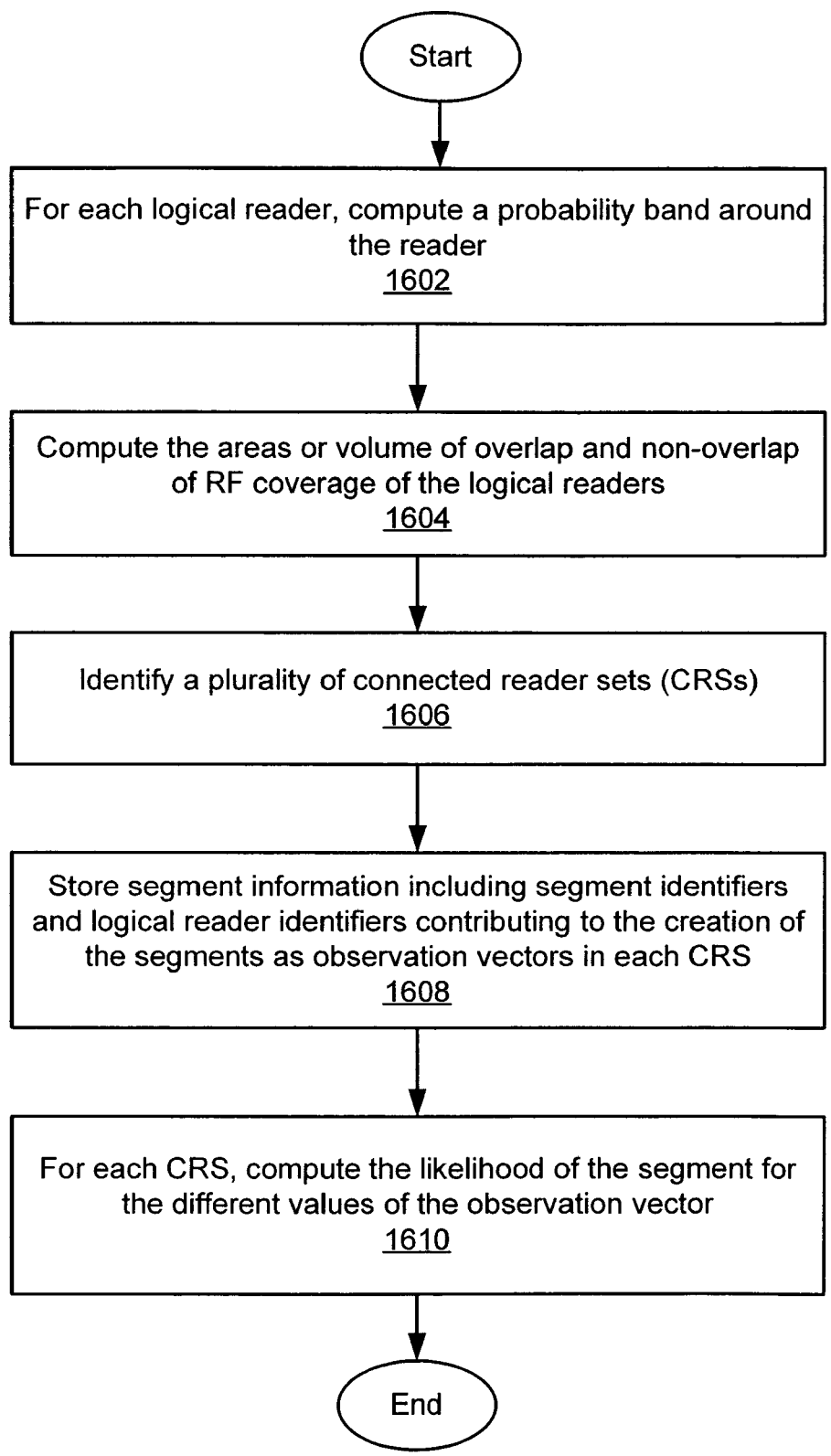
FIG. 16 is a flow diagram of a method of computing the segment likelihood for each observation vector of a connected reader set (CRS) according to the present invention.

A method of computing the segment likelihood for each observation vector of a CRS is illustrated by reference to FIG. 16. As depicted in step 1602, for each logical reader deployed in a site or facility, a probability band around the reader is computed. In effect, the probability band plots a region around the reader that contains points satisfying the criteria $$P(<T,R,t> | T \text{ at } x) \geq \text{PROB\_THRESH}, \qquad (9)$$

in which "PROB_THRESH" is a threshold value. In one embodiment, the probability band corresponds to the RF coverage of the logical reader. Because the coverage of two or more logical readers can overlap, the areas (if 2 dimensional) or volume (if 3 dimensional) of overlap and non-overlap are computed, as depicted in step 1604. As described above, each uniquely identifiable overlapping region is referred to herein as a segment, which is assigned a unique identifier. Next, the CRSs are identified, as depicted in step 1606, and segment information including the segment identifiers and identifiers of the logical readers contributing to the creation of the segments are stored as observation vectors in each CRS, as depicted in step 1608. For each CRS, the likelihood of the segment is computed for the different values of the observation vector, as depicted in step 1610. In one embodiment, the computation of the likelihood for the segment in step 1610 is performed by executing the following procedure:

(1) computeAllRowsAllSegments( ): In this procedure, the values of the likelihood vector are computed for $2^L$ rows and for all segments. It is noted that the size of the CRS increases as the numbers of logical readers and segments increase. The increased size of the CRS can affect the configuration time, i.e., the time required for downloading the CRSs to the tag data processing component 452, and the processing requirements of the tag data processing component 452 in the event the location virtualization processing includes scanning the CRSs for every tag observation. The following sub-procedures can be employed to reduce the size of the CRS:

(a) mergesegments( ): In this first sub-procedure, all non-essential segments are merged into a larger segment. Essential segments are defined herein as segments that assist in resolving distinct locations. For example, for a case in which there are six segments S1-S6 and two locations L1-L2, segments S1-S3 may map to location L1 and segments S4-S6 may map to location L2. In this case, segments S1-S3 can be merged to form $S_A$, and segments S4-S6 can be merged to form $S_B$. In each row j of the CRS, the likelihood of the merged segments is. computed as a sum of the likelihood of the merging segments, e.g., $$\text{Likelihood}(S_A, j) = \Sigma \text{Likelihood}(S_i, j), 1 \leq i \leq 3. \tag{10}$$

(b) pruneandMergeRows( ): In this second sub-procedure, all non-relevant rows are effectively pruned from the CRS. Relevant rows are defined herein as rows having non-negligible likelihood values for the essential segments. It is noted that if the likelihoods of the essential segments in two different rows are equivalent, then it may be possible to merge the two rows. Such merging (if possible) can be done by combining the two binary observation vectors, and creating a single ternary vector. For example, if row j having observation vector 01010 and row k having observation vector 00010 have equivalent segment likelihoods, then the two rows can be merged into one row having a ternary observation vector OXO10.

After the CRSs are generated, a determination is made as to which CRSs to provide to the tag data processing component within each mid-level processor included in the RFID system. In one embodiment, each tag data processing component i within the system has a corresponding set of logical readers LR(i), and these logical readers LR(i) co-interrogate with another set of logical readers cointLR(i), which may correspond to a different mid-level processor. The tag data processing component is therefore provided with the CRSs including the overlap information for the combined set LR(i)+cointLR(i). In the presently disclosed embodiment, the method of FIG. 16 is performed whenever there is a configuration change that results in a change in the CRSs. For example, the configuration change may relate to system startup, the addition/deletion/moving of a reader, antenna, and/or logical reader, or any other suitable configuration change.

An algorithmic description using pseudo-code of an exemplary procedure for generating a comprehensive CRS follows.

```
Loop through each binary bit vector V (of L bits)
   combination from 0 to 2^L - 1 rows; each bit j in the vector, if
   set, represents a tag observation by the reader j; if not set,
   it represents that the tag was not observed by the reader j.
   Row number = K.
      Loop through each logical reader L; the bit
      corresponding to L in the vector V is stored in a
      variable bitSet.
         Loop through each segment S in
         VicinitySegments(L).
            Check if the logical reader L is one of
            the readers that created this segment S.
               If Yes,
                  Proportion = Area of segment
                  S/Σ(Area of segments in
                  VicinitySegments(L) formed by L)
                  If bitSet =0,
                     Likelihood(S,K) +=
                     Proportion*(1-PROB_THRESH);
                  Else If bitSet=1,
                     Likelihood(S,K) +=
                     Proportion*PROB_THRESH;
               If No,
                  Proportion = Area of segment
                  S/Σ(Area of segments in
                  VicinitySegments(L) not formed by L)
                  If bitSet=0,
                     Likelihood(S,K) +=
                     Proportion*PROB_THRESH;
                  Else If bitSet=1,
                     Likelihood(S,K) +=
                     Proportion*(1-PROB_THRESH);
         End Segment loop
      End Logical reader loop
End Row loop
```

In one embodiment, VicinitySegments(L) for each and every logical reader L in the CRS comprises of all the segments in the CRS. In another embodiment, VicinitySegments(L) for a logical reader L is a set of segments that overlap with an area that is a function of the coverage area of L, e.g., two times the coverage area. In still another embodiment, VicinitySegments(L) is a set of segments that overlap with a fixed sized region around the physical location of the logical reader L. In one embodiment, VicinitySegments(L) is the set of segments that overlap with the region covered by the probability band P around the reader, e.g., P=20%.

As described above, the information in a tag observation report sent by a reader to the mid-level processor may be expressed as <T,R,t>, in which "T" is the tag identifier, "R" is the reader identifier, and "t" is the timestamp of the most recent interrogation contributing to the location virtualization processing. The scan data receive and smoothing sub-component included in the tag data processing component 452 (see FIG. 4*a*) is operative to filter redundant observations provided to the mid-level processor 402 by a reader. Over the data smoothing window, the tag data processing component 452 allows a single occurrence of a respective tag observation, and filters out any redundant observations of the same tag. In one embodiment, the smoothing window is a function of the logical reader, e.g., the smoothing window for a logical reader can be directly proportional to the transmit power settings of the reader.

Tag location virtualization processing is performed as follows. During such location virtualization processing, the following data structures are maintained:

(1) ReaderObservations(T): This data structure is maintained for each tag T. When the first observation of the tag T is received by the tag data processing component 452 (see FIG. 4a), the data structure ReaderObservations(T) is initialized to {0...}. This data structure maintains the logical reader identifier, and the timestamp. It is noted that older entries in the data structure can get periodically aged out.

(2) Prior Likelihood Estimates (P(s(i))) of a tag T in each segment s(i): This is the estimate of the prior likelihood that the tag T is in segment s. If the tag is equally likely to be in any of the segments defined within the site or facility, then the likelihood value is equal for all of the segments. The tag data processing component 452 (see FIG. 4a) is operative to track the tag's flow through the site, and to create and update the likelihood estimates of a tag in each segment based on measurements. The tag data processing component 452 is further operative to track a family of tags, e.g., tags sharing the same path through the site or sharing a prefix. Keeping track of the prior likelihood estimates improves the precision and performance of location virtualization processing.

Optimizations using threshold-based decisions can improve the performance of the location virtualization processing. Such processing receives tag observation inputs in the form <T,R,t>, indicating that tag T was observed by logical reader R at time t. The optimized processing includes reader maximum likelihood estimation (Reader MLE) processing, which estimates the maximum likelihood subset of logical readers that have observed a tag. As described above, the observability of a tag by a set of readers can vary with time if either the tag or the reader is mobile. Reader MLE processing is operative to filter off spurious captures of tag data by a reader so that such observations do not skew the location inference performed during the segment maximum likelihood estimation (Segment MLE) portion of location virtualization processing. Reader MLE processing is performed when a new observation arrives at the location virtualization sub-component from the scan data receive and smoothing sub-component. As described above, such an observation can arrive in the form of a tuple <T,R,t>, in which "R" is the logical reader ID, "T" is the tag ID, and "t" is the timestamp of the observation. The output of the scan data receive and smoothing sub-component is stored in the tag scan database included in the tag data processing component 452. The tag scan database stores recent histories of the observations of the tags. For each tag, the tag scan database within the tag data processing component 452 maintains the <R, t> tuple of the observation in the above-described data structure referred to herein as ReaderObservations(T).

An algorithmic description using pseudo-code of an exemplary procedure for performing Reader MLE processing follows.

Initialize the bit vector ReaderVector(T) to {0...}; the size of this vector is equal to the cardinality of the logical reader set handled by the tag data processing sub-component.

Add <R,t> to the ReaderObservations(T).

τ=lookupObservationWindow(R).

If the latest observation is the first observation by the reader R (and is the only observation for the tag in the window[t-τ, t]), then skip MLE processing for this reader, and set the bit corresponding to R to 1 in the ReaderVector(T); mark that read as the first read of the tag by the reader and use that to mark the beginning of the monitoring period for that reader R.

For each reader R' which has seen the tag in the window [t-τ,t],
X=LatestTime (beginning of monitoring period for R', t-τ).
Number of times R' has observed the tag in the window T=ObsCount(R',T,x). This is the number of entries for R' in ReaderObservations(T) in the window [x,t].
ReadReq(R',x)=# of reads by R' in the time interval [x,t]. = This is obtained via a query to the reader coordination sub-component 464.
Compute Likelihood(R',T,τ)= ObsCount(R',T,τ)/ReadReq(R',x).
meanReaderLikelihood=Mean Likelihood across all R' having Likelihood(R',τ)>0.
For each R' having Likelihood(R',T,τ)>0,
If Likelihood(R',T,τ)>meanReaderLikelihood/2, set the bit for R' in the ReaderVector(T).

It is noted that ReaderVector(T) is generated for each new observation of tag T provided by the scan data receive and smoothing sub-component.

Segment MLE processing is operative to estimate the maximum likelihood segment location of the tag. This estimation is done based on ReaderVector(T) and the CRS. An algorithmic description using pseudo-code of an exemplary procedure for performing Segment MLE processing follows.

Retrieve the LikelihoodEstimate (LE) for the segments in play for tag T. Segments in play for a tag are defined herein as segments whose LikelihoodEstimates were high enough to be considered during the last execution of the Segment MLE block for tag T. The value of LikelihoodEstimates decay down as a function of the time elapsed with no observations for T. One embodiment is use a ageTimeout, which when expired without any observations for T, the LikelihoodEstimates for the segments in play decay at a rate of decayRate.

Retrieve the PriorLikelihoodEstimate(T,s(i))=P(s(i)) of the tag T in each segment s(i). This is the estimate of the prior likelihood that a tag is in segment s.

Based on ReaderVector(T), determine the CRSs to consider.

For each R' in ReaderVector(T),
CRSSet+=CRS(R'); in which CRS(R') is the CRS including the logical reader R'.
For each CRS(i) in CRSSet
Find the row in the segment matrix that matches the ReaderVector(T). Let the row number be X.
Let $L_x(s(i))$ be the likelihood of segment s(i) in row X.
Update the LE for the segments in play, using $$LE(s(i))=(1-\alpha)*LE(s(i))+\alpha*L_x(s(i))P(s(i))\ 0<\alpha<1.0. \quad (11)$$

Update the LE for the segments not in play but which have a $L_x(s(i))>0$, using $$LE(s(i))=\alpha*L_x(s(i))P(s(i))\ 0<\alpha\leq1.0. \quad (12)$$

Compute the meanSegmentLikelihood.
Add s(i) to Segments in play if $$LE(s(i))>\text{meanSegmentLikelihood}/2. \quad (13)$$

InferredSegmentSet={Segments in play}

At the completion of Segment MLE processing, the InferredSegmentSet is mapped to the locations in the site or facility. Such mapping is referred to herein as Location MLE processing. Tag location outputs in the form <T,{L},t> are then provided from the tag data processing component 452 (see FIG. 4a) to the tag information services component 454 (see FIG. 4a) for subsequent storage in the tag location database within the tag information services component 454 (see FIG. 4a), and processing by the respective services components.

Alternatively, optimizations involving no threshold-based decisions are employed to improve the performance of location virtualization processing. As described above, such processing receives tag observation inputs in the form <T,R,t>, indicating that tag T was observed by logical reader R at time t. An algorithmic description using pseudo-code of Reader MLE processing for this alternative embodiment follows.

Initialize the bit vector ReaderVector(T) to {0 ... }; the size of this vector is equal to the cardinality of the logical reader set handled by the tag data processing component.

Add <R,t> to the ReaderObservations(T).

$\tau$=lookupObservationWindow(R).

For each reader R', compute

ObsCount(T,R',t,$\tau$)=# of times R' has observed tag T in the window [t−T,$\tau$]. This is the number of entries for R' in ReaderObservations(T) in the window [t−$\tau$,t].

ReadReq(R',t,$\tau$)=# of reads performed by reader R' in the window [t−$\tau$,t]. This is obtained via a query to the reader configuration component 460.

Likelihood L(R',t,$\tau$)=
ObsCount(T,R',t,$\tau$)/ReadReq(R',t,$\tau$).

If L(R',t,$\tau$)>0,
 set the bit corresponding to reader R' to 1 in the ReaderVector(T).

An algorithmic description using pseudo-code of Segment MLE processing for this alternative embodiment follows.

Set NewSegmentLikelihoodSample SL(s) for all segments to 0; CRSSet=NULL;

Retrieve the PriorLikelihoodEstimate(T,s(i))=P(s(i)) of the tag T in each segment s(i). This is the estimate of the prior likelihood that a tag is in segment s.

Based on ReaderVector(T), determine the CRSs to consider.

```
For each R' in ObservedVector(T),
    CRSSet += CRS(R'); in which CRS(R') is the CRS
       including the logical reader R'.
For each CRS(i) in CRSSet
    For each row j in CRS(i)
       readerBitVector(j) = Observation bit vector in
    row j
       For each segment s in CRS(i)
          For each bit k in readerBitVector(j)
             RdrId = logicaReaderID(k)
             bitVal = readerBitVector(j,k)
             SL(s) += L(RdrId,t,$\tau$) * bitVal * P(s)
          End for readerBitVector
       End for Segment
    End for Row
End for CRS
```

An algorithmic description using pseudo-code of Location MLE processing for this alternative embodiment follows.

Set NewLocationLikelihoodSample LL(l) for all locations to 0.

For soft locations, we add the SL(s) for all segments s in location l.

For each soft location l
segmentSet(l)=Set of segments that belong to location l.
For each segment s in segmentSet(l) LL(l)+=SL(s).

Tag location and likelihood outputs in the form <T,{l,LL (l)}, t> are then provided from the tag data processing component 452 (see FIG. 4a) to the tag information services component 454 (see FIG. 4a) for subsequent storage in the tag location database within the tag information services component 454 (see FIG. 4a), and processing by the respective services components.

It is noted that in some applications of the presently disclosed system, the tag observation rate may be significantly greater than the tag flux in the site or facility in which the readers are deployed. In such applications, the tag data processing component 452 (see FIG. 4a) within the mid-level processor 402 can be configured to keep track of a limited history of location virtualization results for each tag. For example, the tag data processing component 452 can be configured to provide the results of location virtualization processing to the tag location database included in the tag information services component at a rate R, $$R=\text{MIN}(\text{tag flux, RATE\_LIMIT}(T)), \quad (14)$$

in which "RATE_LIMIT(T)" is a predetermined rate for each tag. In a further embodiment, the tag data processing component 452 can be configured to provide tag location outputs to the tag location database in the form <T,{L},t, dos>, in which "dos" corresponds to a value relating to the duration of stay for a tag T in location L.

As described above, a steerable beam antenna can be used to determine the direction of movement of a tag or a group of tags by discriminating the signal level as the direction of the antenna beam or the beam pattern is changed. In an alternative embodiment, a power profiling technique can be used to determine the direction of movement of a tag(s) within a site or facility in which a plurality of readers are deployed.

Figure 17B:
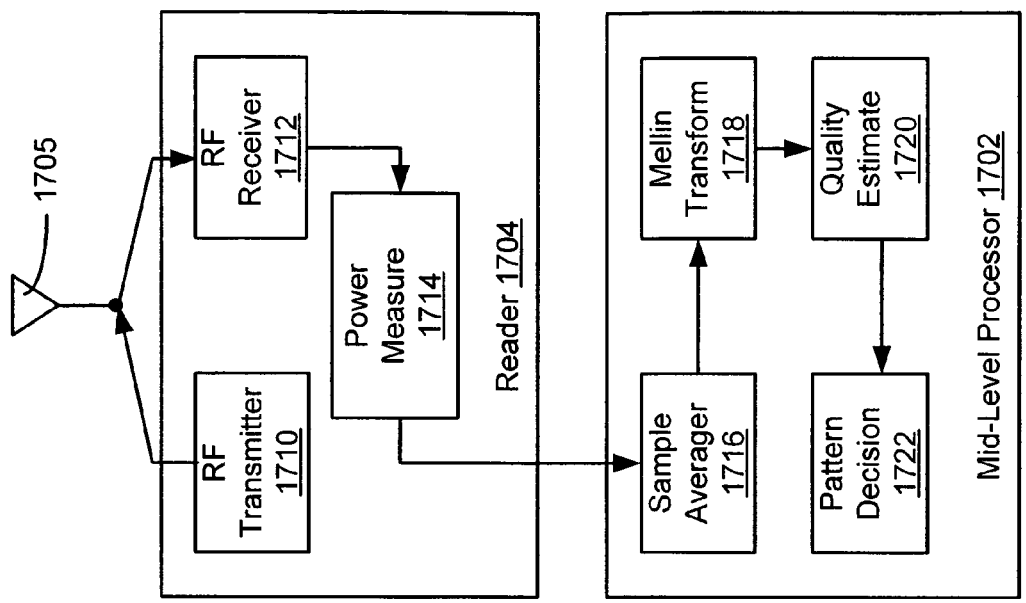
FIG. 17b is a block diagram of an RFID reader and antenna, and a mid-level processor operative to perform a power profiling technique for determining the direction of movement of one or more tags according to the present invention.
Figure 17A:
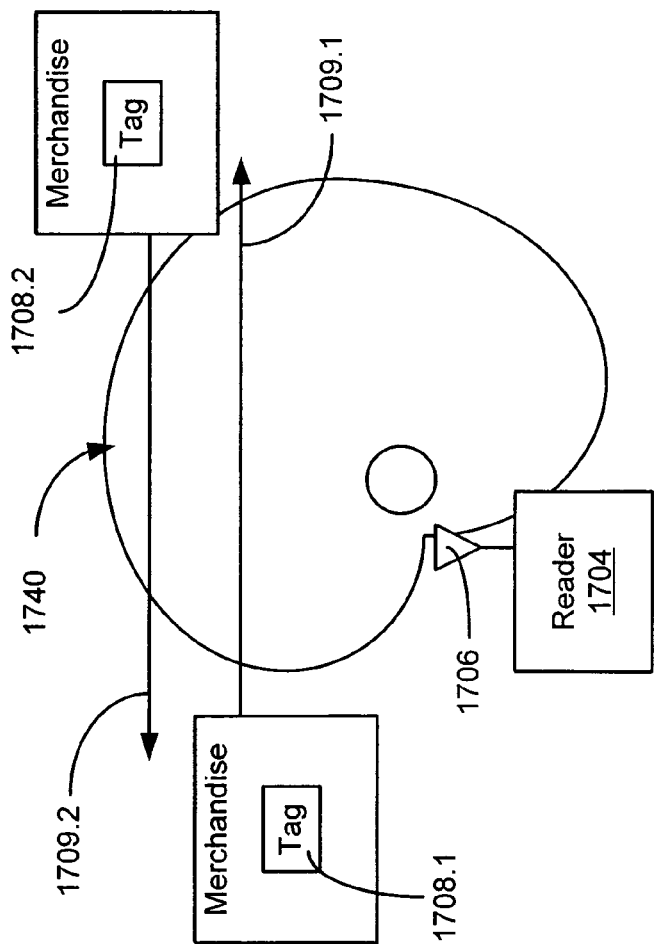
FIG. 17a is a block diagram of an RFID reader operable to interrogate a plurality of items having respective tags attached thereto, in which a power profiling technique is employed to determine the direction of movement of the tags according to the present invention.

FIG. 17a depicts a reader 1704 including an antenna 1706 operable to interrogate a plurality of items having respective tags 1708.1-1708.2 attached thereto. In the illustrated embodiment, each of the tags 1708.1-1708.2 is a mobile tag. For example, the mobile tags 1708.1-1708.2 can have directions of movement 1709.1-1709.2, respectively, associated therewith, which are arranged to pass through an RF field of view 1740 of the reader 1704. It should be understood that the reader 1704 can be implemented as a single RFID reader device, or a set of devices including a power source, a transmit data source, an RF transmitter, and an RF receiver that cooperate to perform the functions of an RFID reader where the transmitter and receiver reside in separate units or are integrated into a single device. The reader 1704 is configured to determine the direction of motion of the tags 1708.1-1708.2 passing through its field of view 1740. As shown in FIG. 17a, the field of view 1740 of the reader 1704 is skewed with respect to the directions of motion 1709.1-1709.2 of the respective tags 1708.1-1708.2, i.e., the antenna pattern is not symmetric with respect to a line that is perpendicular to the lines 1709.1-1709.2 of tag motion. This can be accomplished by turning the antenna or by distorting the field of the antenna by design or with external reflecting surfaces.

FIG. 17b depicts an illustrative embodiment of the reader 1704, a reader antenna 1705, and a mid-level controller/processor 1702 operative to receive and process tag data including power measurements collected and provided thereto by the reader 1704. As shown in FIG. 17b, the reader 1704 includes an RF transmitter 1710, an RF receiver 1712, and a unit 1714 operative to measure the power associated with an RF signal received from a tag in response to being interrogated by the reader 1704. The mid-level processor 1702 is operative to perform one or more of the following tag motion processing functions: power sample averaging 1716, Mellin transformations 1718, signal quality estimations 1720, and pattern decision making 1722. As known in the art, a Mellin transform is an integral transform, which is typically viewed as the multiplicative version of the two-sided Laplace transform. The Mellin transform can be implemented in various forms such as a fast Mellin transform. For example, the above-listed tag motion processing functions may be performed by the tag data processing component 452 (see FIG. 4a) included in the mid-level processor 402.

In an illustrative mode of operation, the reader 1704 sequentially interrogates each of the tags 1708.1-1708.2 two or more times via the RF transmitter 1710 while the tag is in the reader's field of view 1740. The receiver 1712 associated with the reader 1704 receives RF signals from the tags 1708.1-1708.2 in response to the interrogations. The power measure unit 1714 associated with the reader 1704 measures the power corresponding to the received RF signals for each interrogation. For example, the power measure unit 1714 may comprise a receive signal strength indicator (RSSI) or any other suitable power measuring device. The mid-level processor 1702 compares the received power levels corresponding to the respective interrogations to infer relative signal strength. Other techniques of inferring signal strength include changing the transmit power of the RF transmitter 1710 or the sensitivity of the RF receiver 1712 to determine thresholds at which the tag is no longer observable by the reader 1704. For a simple asymmetric antenna pattern that is stronger on one side of a line perpendicular to the directions of tag movement 1709.1-1709.2 (the normal line) than the other side of the line, the directions of tag movement can be determined by decreasing or increasing the signal level through the sequence of interrogations. For more complex antenna patterns, the directions of tag movement can be determined by subjecting power measurement samples to pattern matching. It is noted that the Mellin transform can be employed to perform pattern matching on power measurement samples derived from tags moving at different rates through the field of view 1740.

The power measure unit 1714 (see FIG. 17b) measures the power of the RF signal received from a tag by the RF receiver 1712, and provides the power measurements to the Sample Averager 1716, which takes multiple samples of the power measurements and averages them together. It is noted that each power measurement sample can be taken at a different carrier frequency to average out the effects of multi-path reflections. It is further noted that instead of averaging, any other suitable mathematical operation can be performed on the power measurement samples. In the event averaging operations are performed on the power samples, the result is a set of super-samples, each of which represents an average of two or more of the power samples. This set of super-samples is optionally provided to the Mellin transform 1718 for adjusting the time scale of the sample sequence to allow patterns occurring over different time scales to be compared. Next, the sample sequence is provided to the quality estimate function 1720, which provides a measure of the quality of the sample data by measuring the variance or any other suitable quality metric. The sample sequence is then provided to the pattern decision function 1722, which determines which characteristic pattern the measured result matches best.

Figure 18A:
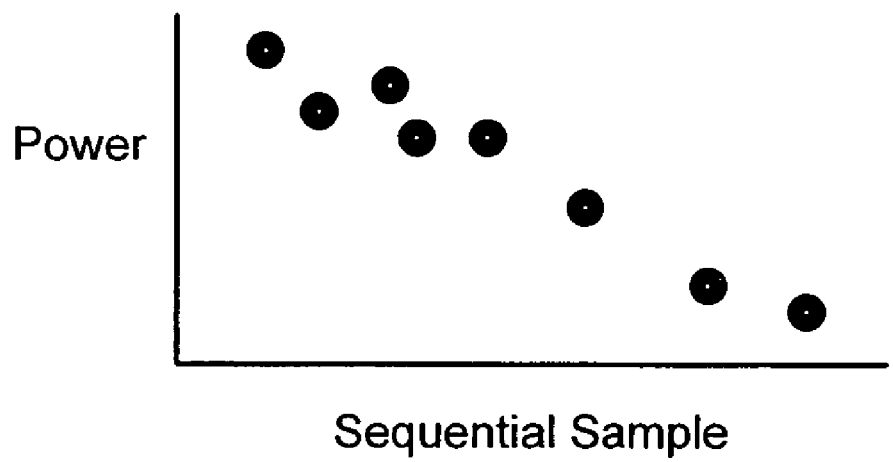
Figure 18B:
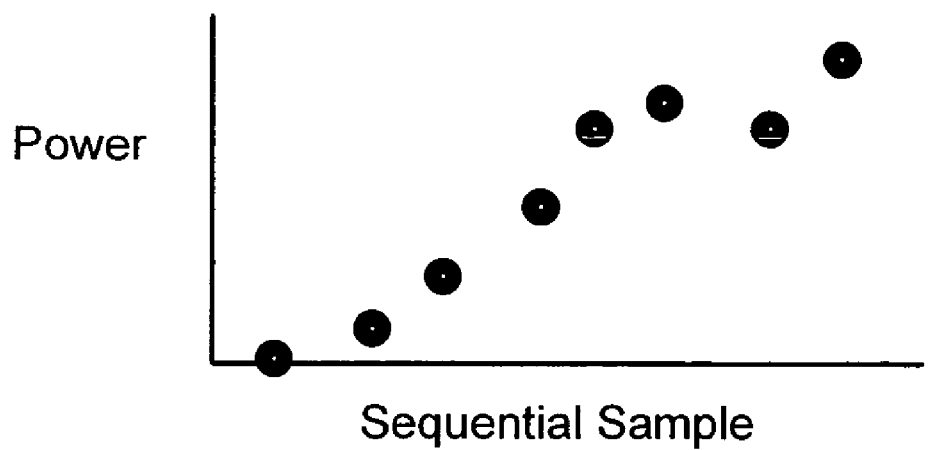

FIGS. 18a-18b depict power profiles associated with the RF signal responses received by the reader 1704 from the tags 1708.1-1708.2, respectively. As shown in FIG. 18a, the power associated with the measurement samples corresponding to the tag 1708.1 is reduced with each sequential sample as the tag 1708.1 moves along the line 1709.1 across the reader's field of view. Because the power is reduced with each sequential sample, it can be concluded that the tag 1708.1 is moving to the left across the reader field of view 1740, as depicted in FIG. 17a. As further shown in FIG. 18b, the power associated with the measurement samples corresponding to the tag 1708.2 is increased with each sequential sample as the tag 1708.2 moves along the line 1709.2 across the reader's field of view. Because the power is increased with each sequential sample, it can be concluded that the tag 1708.2 is moving to the right across the reader field of view 1740, as depicted in FIG. 17a.

Figure 19B:
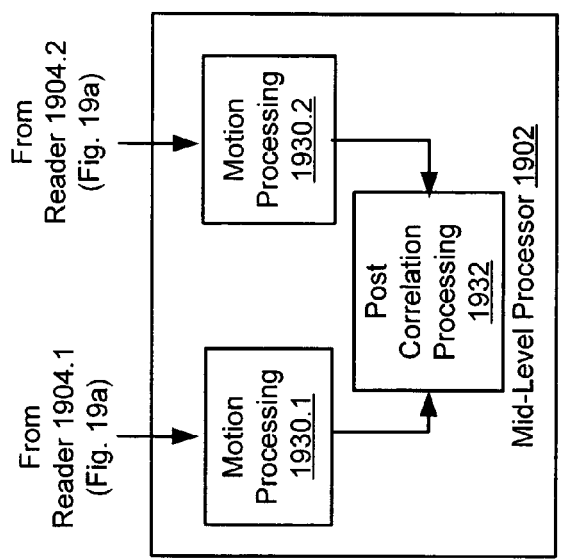
Figure 19A:
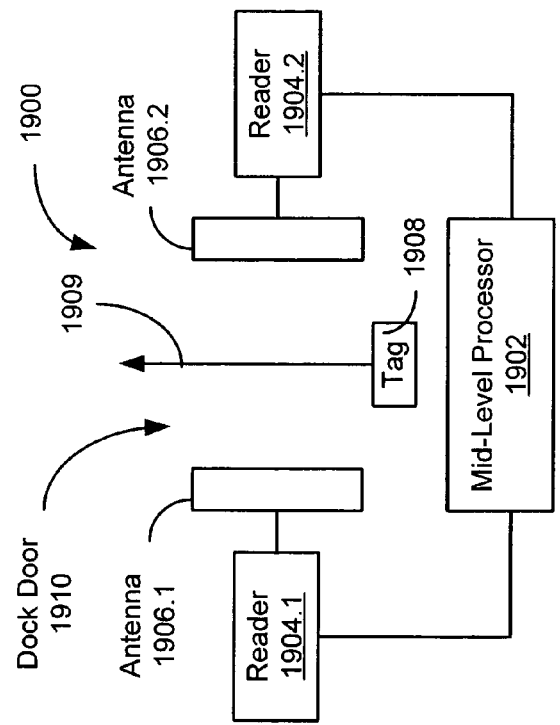
FIG. 19a is a block diagram of a plurality of RFID readers operable to interrogate a mobile tagged item using a power profiling technique according to the present invention.

FIG. 19a depicts a plurality of readers 1904.1-1904.2 including antennas 1906.1-1906.2, respectively, operable to interrogate a mobile tagged item 1908 passing through a dock door 1910. The tag 1908 has a direction of movement 1909 associated therewith that is arranged to pass through the RF fields of view of the respective readers 1904.1-1904.2. The plurality of readers 1904.1-1904.2 may be employed to perform power measurements on the tag 1908, which can be combined to improve the overall quality of the measurements.

FIG. 19b depicts a first technique of combining power measurements provided by the respective readers 1904.1-1904.2 (see FIG. 19a). As shown in FIG. 19b, the power measurements from the readers 1904.1-1904.2 are provided to tag motion processing units 1930.1-1930.2, respectively. It should be understood that each of the tag motion processing units 1930.1-1930.2 has substantially the same functionality as the mid-level processor 1702, as depicted in FIG. 17b. Outputs of the respective tag motion processing units 1930.1-1930.2 are then combined to determine a best answer based on quality or confidence weightings for each of the outputs. For example, the outputs of the respective tag motion processing units 1930.1-1930.2 can be combined in a post correlation processing unit 1932 within a mid-level controller/processor 1902 (see FIG. 19a). The post correlation processing unit 1932 is operative to correlate the outputs of the tag motion processors 1930.1-1930.2, thereby providing an indication of the degree of agreement between the tag motion processor outputs.

Figure 19C:
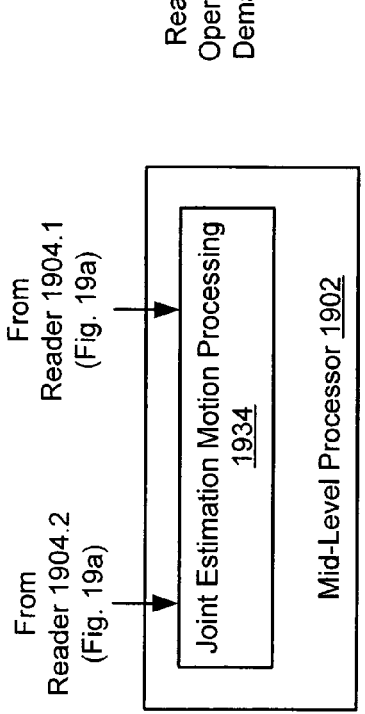

FIG. 19c depicts a second technique of combining power measurements provided by the respective readers 1904.1-1904.2 (see FIG. 19a). In this second technique, a joint operation is performed on the power measurements, which may comprise averaged power data or any other suitably processed power data. In one embodiment, the power measurements from the respective readers 1904.1-1904.2 are provided to a joint estimation motion processing unit 1934 included in the mid-level processor 1902 for determining the direction of movement of the tag 1908 through the field of view of the readers 1904.1-1904.2.

As described above, the observability of a tag by a set of readers in the presently disclosed system can vary with time if either the tag or the reader is mobile. The following discussion relates to the operation of the tag data processing component 452 (see FIG. 4a) on tag data collected by one or more mobile readers from one or more location benchmark tags disposed at fixed locations within a site or facility in which the readers are deployed. The configuration elements employed by the tag data processing component 452 during such tag processing include a logical reader profile for each mobile reader, information corresponding to each location benchmark tag, information corresponding to segments formed by overlapping and/or non-overlapping RF coverage areas of the mobile readers (referred to herein as mobile reader segments), and a map configuration for tag location virtualization. It is understood that the above-listed configuration elements are stored in the configuration database within the reader configuration component 460 included in the mid-level processor 402 (see FIG. 4b).

Specifically, for each mobile reader in the site, the following profile information is maintained in the configuration database:

(1) A reader identifier.

(2) A reference locationing coordinate system on a vehicle providing mobility to the reader including an origin and X, Y, Z axes.

(3) Reader configuration information including the number of antennas, the antenna locations on the vehicle with respect to a selected origin point on the vehicle, the antenna orientation (e.g., azimuth, elevation, twist), whether the antenna is mounted on moving parts, e.g., tines or forks of a forklift, and the location/orientation of the antenna on the moving part, and the antenna and reader capabilities including the range of power, the sensitivity, the air protocol capabilities, the directional control, etc.

Further, for each location benchmark tag in the site, the following information is maintained in the configuration database:

(1) A tag identifier.

(2) The physical location of the tag.

(3) The segment identifier. The physical location where the tag is located maps to this segment.

(4) The list (observableLRPList) of fixed reader logical reader profiles (LRPs) that should be able to observe the tag.

This list is determined based on configuration information such as the location of the reader, and the operating parameters of the logical reader profile such as power, direction, sensitivity, etc. The observableLRPList may be adjusted over time based on consistent observations of the tag by the logical readers, or consistent lack of observations of the tag by the logical readers.

Figure 21:
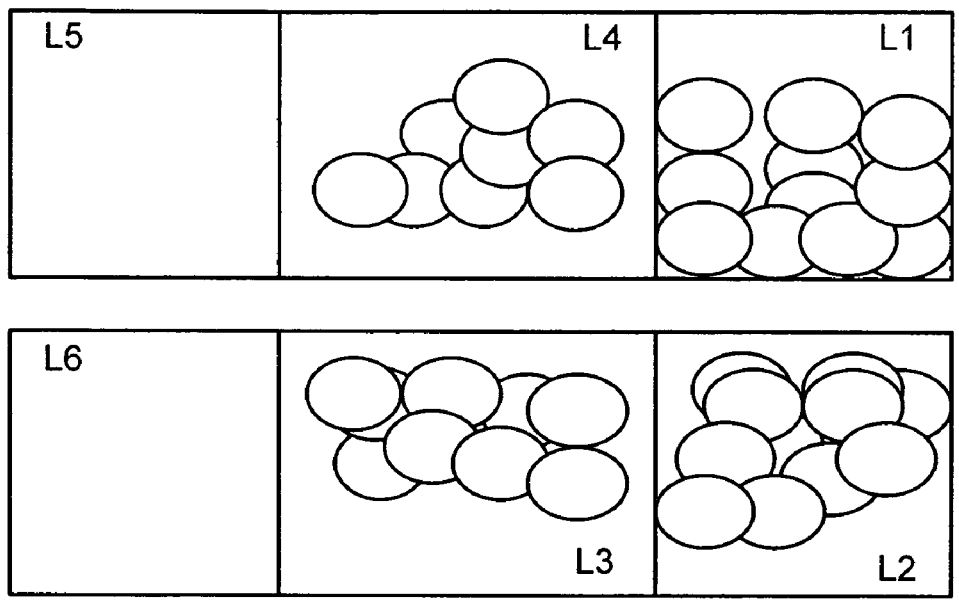
FIG. 21 is an illustration of a plurality of locations within a site or facility in which multiple RFID readers are deployed.

As described above, segments are formed by the overlapping and/or non-overlapping RF coverage areas of readers disposed at fixed locations within the site. In regions of the site that are not within the RF coverage areas of the fixed readers, one or more pseudo-segments can be created, one per location in the uncovered regions. FIG. 21 depicts an illustrative example of a site including a plurality of locations L1-L6. Locations L1-L4 are within the RF coverage areas of one or more fixed readers, and locations L5-L6 are not within the RF coverage areas of any of the fixed readers. Pseudo-segments can therefore be created corresponding to locations L5-L6, respectively, and each pseudo-segment can be assigned a unique identifier.

A list (MRConfiguredLRPlist) is maintained in the configuration database of the logical reader profiles (LRPs) configured on each mobile reader. Like the fixed readers, a determination is made as to which LRPs to create for each antenna included in the mobile reader. For example, each LRP may be expressed as a tuple $$<\text{reader ID, antenna ID, power level,} \quad (15)$$

antenna position, antenna orientation>.

Figure 22:
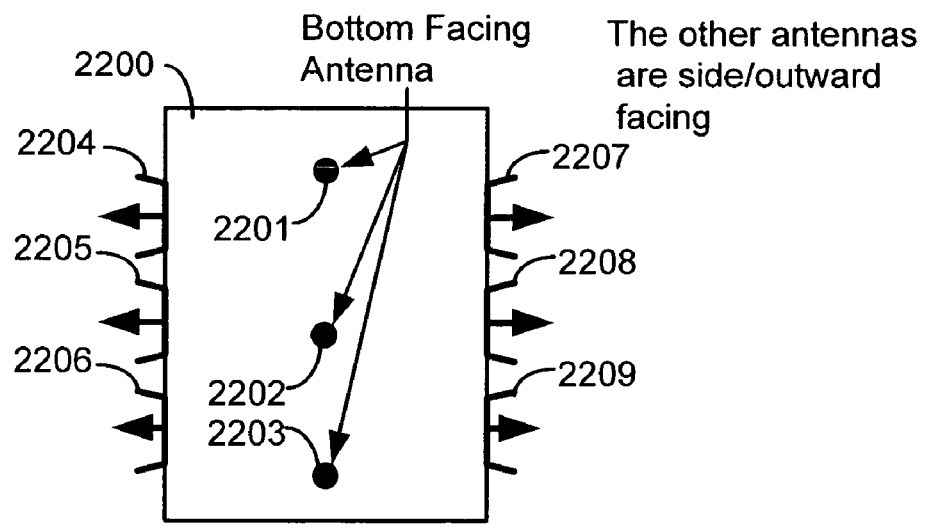
FIG. 22 is an illustration of a plurality of antenna locations and orientations on a vehicle carrying a mobile RFID reader.

Information is also maintained in the configuration database relating to the mobile reader segments, which are the segments formed by the mobile reader LRPs listed in the above-described MRConfiguredLRPList. FIG. 22 depicts an illustrative example of reader antenna locations and orientations on a vehicle 2200 carrying a mobile reader. As shown in FIG. 22, there are nine reader antennae 2201-2209 on the vehicle 2200. The antennae 2201-2203 are directed downward from the bottom of the vehicle 2200, and the antennae 2204-2209 are directed outward from the sides of the vehicle 2200. In this example, the mobile reader has twelve logical reader profiles (LRPs) R1-R12 assigned thereto. Further, each of the antennae 2201-2203 corresponds to two respective LRPs, and each of the antennae 2204-2209 corresponds to one respective LRP.

Figure 23:
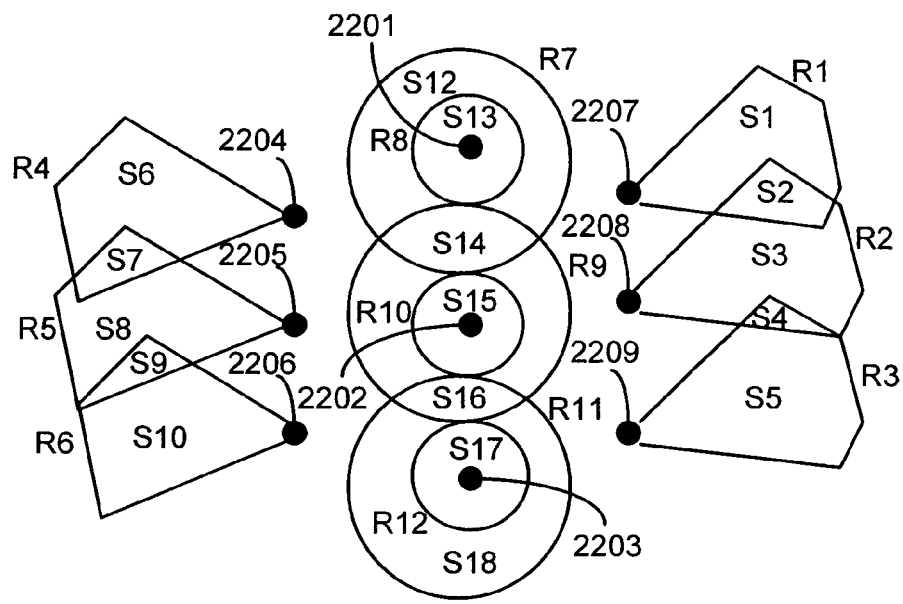
FIG. 23 is a diagram illustrating a plurality of segments formed by overlapping and non-overlapping regions of RF coverage corresponding to the mobile RFID reader antennas of FIG. 22.

FIG. 23 depicts the coverage regions corresponding to the logical reader profiles R1-R12. As shown in FIG. 23, the antenna 2201 corresponds to LRPs R7-R8, the antenna 2202 corresponds to LRPs R9-R10, the antenna 2203 corresponds to LRPs R11-R12, the antenna 2204 corresponds to LRP R4, the antenna 2205 corresponds to LRP R5, the antenna 2206 corresponds to LRP R6, the antenna 2207 corresponds to LRP R1, the antenna 2208 corresponds to LRP R2, and the antenna 2209 corresponds to LRP R3. As further shown in FIG. 23, a plurality of segments S1-S18 is formed by the overlapping and non-overlapping regions of the LRPs R1-R12. It is noted that mobile reader connected reader sets (MR-CRS) can be generated that map one or more concurrent MR-LRP observations to corresponding mobile reader segment likelihoods. The data structure of the MR-CRS is like that of the fixed reader CRS, as described above.

Based on the range of operating parameters (e.g., power, sensitivity, direction) for each reader and associated antenna, and the mobility of the antenna with respect to the vehicle on which it is mounted, there can be one or more logical readers configured at each antenna. It is noted that there may be situations in which only one or a small number of logical readers need to be configured at a respective antenna. In one embodiment, the criteria for selecting a mobile reader logical reader profile MR-LRP include satisfying internal and external RF coverage requirements, and providing locationing demarcation. For example, the internal coverage requirement can be defined in terms of a volume of space inside the vehicle. Further, the external coverage requirement can be defined in terms of a volume of space surrounding each location benchmark tag. The concept of providing locationing demarcation corresponds to the capability of the RF coverage areas associated with the MR-LRP, or the segments formed by the LRPs, to demarcate location boundaries.

The selection of logical reader profiles for a mobile reader will be better understood with reference to the following illustrative example. In this example, it is assumed that there are a small number of antennae configured to satisfy the internal coverage requirements. Based on the volume associated with the coverage space requirements, the MR-LRPs for those antennas are selected. Next, the following actions are taken for each location benchmark tag in the site: for each allowable orientation of the vehicle relative to that benchmark tag location, and for each allowable antenna orientation/displacement relative to that benchmark tag location, map the coverage corresponding to the MR-LRPs onto the location perspectives of the configuration data, analyze the coverage and location requirements based on this mapping, and pick the minimum set of MR-LRPs that satisfy the coverage requirements. The coverage requirements are employed to determine whether the aggregate of the LRP coverage of the mobile and fixed readers is sufficient to satisfy the coverage and location demarcation requirements. The location requirements are employed to determine the minimal set of mobile and fixed reader LRPs required to delineate locations using a combination of mobile and fixed reader segments. The list of logical reader profiles (LRPs) configured on each mobile reader (MRConfiguredLRPlist) is then generated by taking the union of the MR-LRPs required at each location benchmark tag, and the MR-LRPs required to satisfy the internal coverage requirements.

Both fixed and mobile readers can be employed to perform location benchmark tag-based coverage analysis in the site or facility in which the readers are deployed. For example, after selecting the MR-LRPs, thereby making a mobile reader operational, the reader sends tag data collected from the tags to the tag data processing component 452 included in the mid-level processor 402 (see FIG. 4a). It is noted that the mobile reader can collect tag data from both location benchmark tags and non-benchmark tags. The tag data processing component 452 maintains historical data of the location benchmark tags observed by the MR-LRPs configured on the mobile reader. In one embodiment, the tag data processing component 452 maintains a list of location benchmark tags that should be observed by the mobile reader based on the paths followed by the reader through the site. The tag data processing component 452 can therefore detect when the MR-LRPs configured on the mobile reader collectively and consistently fail to observe a particular location benchmark tag. The coverage of the location benchmark tags is updated by the tag data processing component 452 upon receiving observations from the MR-LRPs, and aged out after not receiving an observation for an extended period of time.

As described above, each reader has an associated interrogation zone within which the reader can successfully perform tag interrogations. In one embodiment, each location benchmark tag has a zone or physical space associated therewith within which a reader can successfully interrogate the benchmark tag. This zone is based on the RF parameters of the reader including the antenna pattern, but it surrounds the tag instead of surrounding the reader. Further, this zone can be stratified or continuous relative to the probability of successful interrogation versus range and direction. The pattern of the reader antenna is accounted for in the zone shape, which is indicative of the ability of a mobile reader to find the location benchmark tag as it passes near the tag. The location benchmark tags are fixed in position, and therefore the relationship between the tags and the predefined business locations within the site are established during system deployment and unchanging as the reader moves.

The tag data processing component 452 (see FIG. 4a) is configured with a list of fixed reader logical reader profiles (observableLRPList) for each location benchmark tag that includes the identities of the logical readers that should be able to observe that benchmark tag. Upon receiving the location benchmark tag observations, the tag data processing component 452 keeps track of the actual coverage of each LRP. In one embodiment, if a location benchmark tag is not consistently observed by an LRP included in that benchmark tag's observableLRPList, then the tag data processor generates an event to indicate incorrect coverage, a coverage hole, or an improperly functioning logical reader. The observableLRPList for the location benchmark tag may then be updated, or the configuration parameters of the LRP in question may be adjusted, to allow the logical reader to start successfully observing the benchmark tag.

The map configuration for tag location virtualization (referred to herein as the locationing map configuration) corresponds to the convolution of the mobile reader segments to the fixed reader segments at each benchmark tag location for different orientations/locations of the vehicle and different configurations/locations of the reader antennae. The locationing map configuration also stores the location benchmark tag observations made by the MR-LRPs when operating at these vehicle orientations/locations and antennae configurations/locations. In one embodiment, the location configuration information for each mobile reader ID includes the following:

(1) LocationCfgID—an identifier for this location configuration.

(2) The physical location of the mobile reader (i.e., the coordinates of the reader within the site or facility).

(3) The orientation of the vehicle.

(4) The displacement of the antennae relative to the vehicle, whether the antennae are placed on moving part(s) of the vehicle, and/or whether the direction can be controlled on the antenna.

(5) The mapping of the location benchmark tag to the mobile reader segment. At this location configuration (i.e., at this physical vehicle orientation/location and antenna orientation/location), a list is maintained of the mobile reader segments in which each location benchmark tag is located. In one embodiment, the mapping of only the location benchmark tags that are close to the physical location of the mobile reader are maintained, and the benchmark tags that are far away from the physical location of the mobile reader are not mapped to any mobile reader segments.

(6) The mapping of mobile reader segments to the fixed reader segments. This is a mapping of a mobile reader segment to one or more fixed reader segments that overlap with the mobile reader segment at that location and orientation of the mobile reader and at the respective antennae orientations/locations. The mapping also includes the proportion of the mobile reader segment space in each of the fixed reader segment space to which the mobile reader segment maps.

It is noted that there can be multiple location configurations created and stored for each mobile reader, each identifiable by a unique identifier (LocationCfgID).

Figure 24:
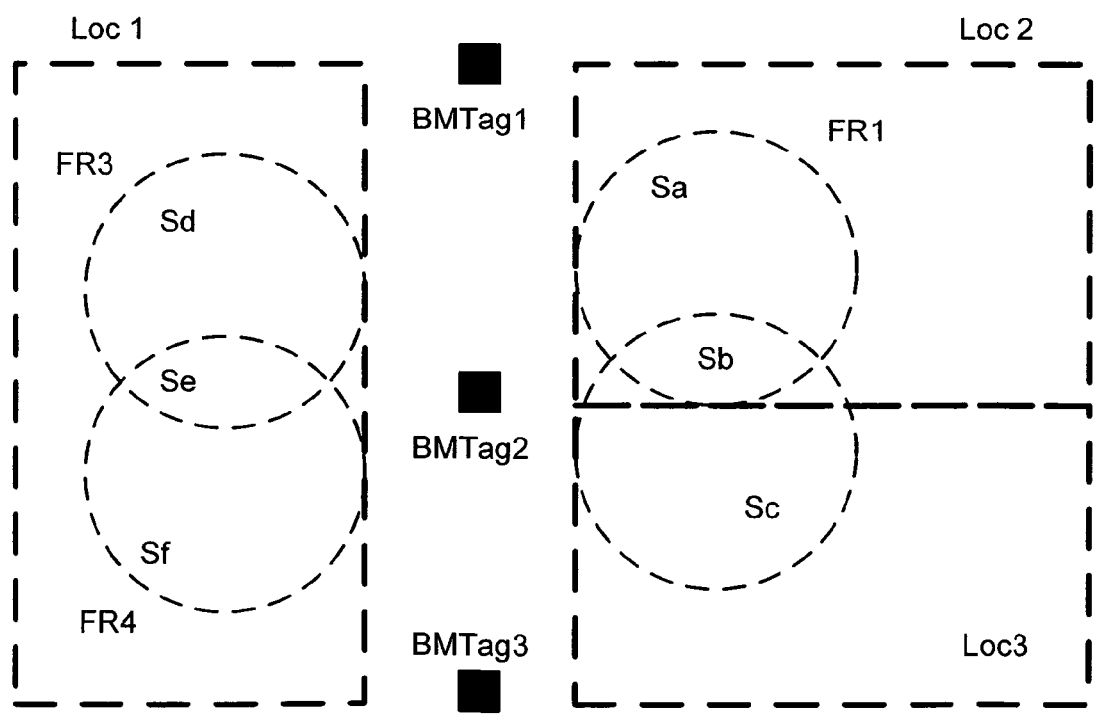
FIG. 24 is a diagram illustrating a plurality of segments formed by overlapping and non-overlapping regions of RF coverage corresponding to a plurality of RFID readers disposed at fixed locations.
Figure 25:
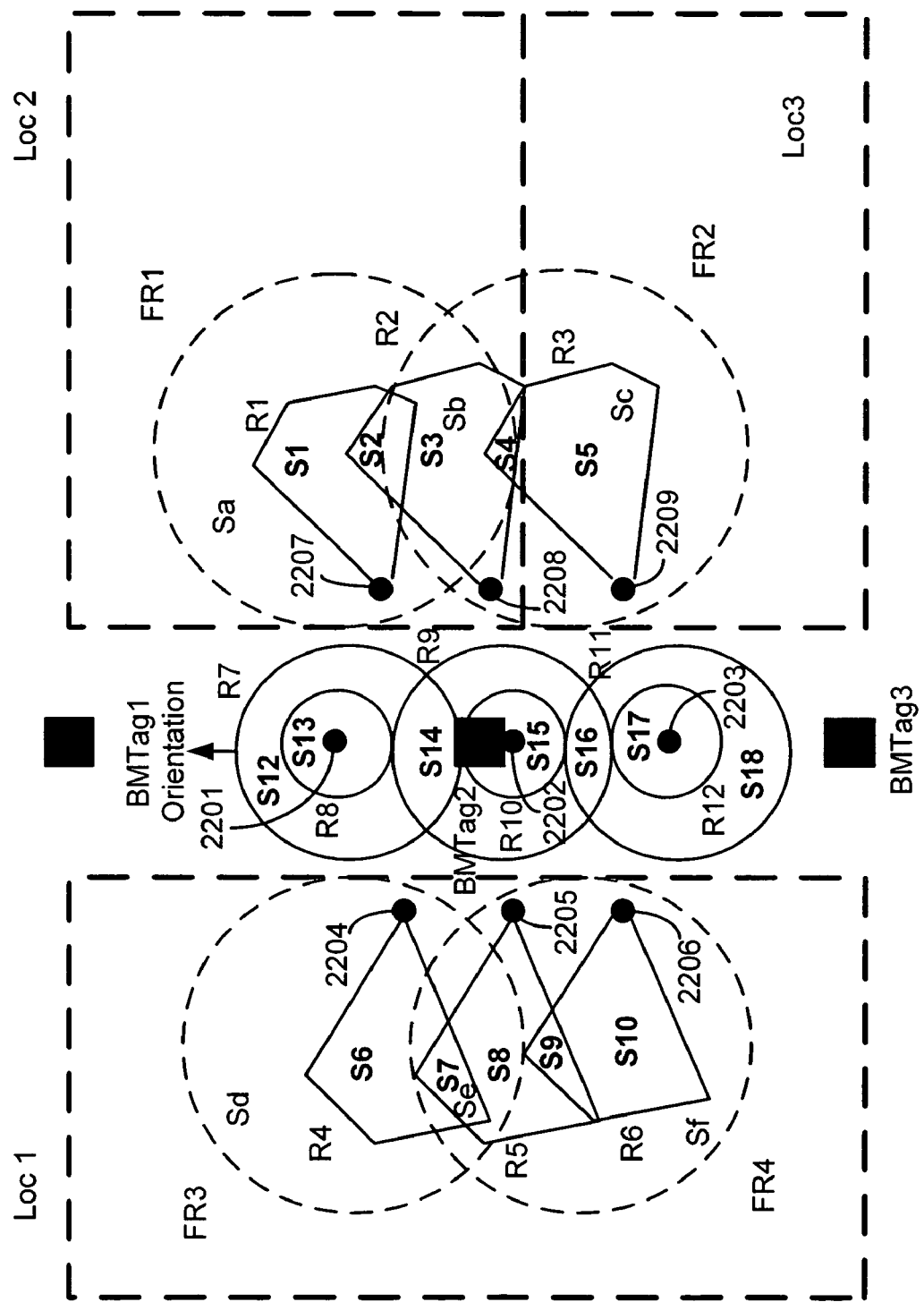
FIG. 25 is a diagram illustrating a mapping of the plurality of segments of FIG. 23 corresponding to the mobile RFID reader of FIG. 22 to the segments of FIG. 24 corresponding to the fixed RFID readers.

FIG. 24 depicts a plurality of segments Sa, Sb, Sc, Sd, Se, Sf formed by the overlapping and non-overlapping regions of RF coverage corresponding to a plurality of fixed readers FR1-FR4. FIG. 25 depicts a convolution of the mobile reader segments S1-S18 on the fixed reader segments Sa, Sb, Sc, Sd, Se, Sf when the vehicle carrying the mobile reader is at location benchmark tag 2 (BMTag 2) and oriented toward location benchmark tag 1 (BMTag 1). The mapping of the mobile reader segments to the fixed reader segments is indicated in TABLE I below.

TABLE I

| Mobile Reader Segment | Fixed Reader Segment (proportion) |
| --- | --- |
| S1 and S2 | Sa (100%) |
| S3 | Sa (90%), Sb (10%) |
| S4 | Sb (100%) |
| S5 | Sc (100%) |
| S6 | Sd (100%) |
| S7 | Se (100%) |
| S8 | Se (80%), Sf (20%) |
| S9 and S10 | Sf (100%) |
| S12-S18 | S-default (100%) |

The reader parameters employed by the tag data processing component 452 (see FIG. 4a) to perform tag location virtualization on tag data collected by mobile readers include the following:

(1) A data smoothing window, i.e., the rate limit interval for filtering redundant observations.

(2) A nominal observation window. The logical reader observations that fall into this time window are considered concurrent observations and are used to resolve segments. The observation window is computed for a nominal velocity (v) of the mobile reader vehicle, and is proportional to the size of the coverage of the MR-LRP.

It is noted that the parameters for each mobile reader LRP may be expressed as a tuple <MR-LRP, tag-prefix>.

The second method described above for performing tag location virtualization processing (see FIGS. 28a-28b) may be employed to process tag data collected by mobile readers, taking into account the following considerations. First, the mobile reader maximum likelihood estimation (MReader MLE) processing is essentially the same as that described above for fixed Reader MLE processing. As the name suggests, the MReader MLE processing is only performed on an MR-LRP's observations of a tag. The output of this processing is a list of MR-LRPs and their likelihoods for that tag. In one embodiment, the observation window used in MReader MLE processing can be dynamically computed for the MR-LRP. Based on the computed current velocity (v') of the mobile reader, the observation window used for the tag may be expressed as $$((v/v')*\text{Nominal Observation Window}). \quad (16)$$

The mobile reader segment maximum likelihood estimation (MR-Segment MLE) processing is also essentially the same as that described above for fixed reader Segment MLE processing. However, the data structures used for MR-Segment MLE processing are MR-CRS. The output of this processing is a list of MR-Segments and their likelihoods for the tag.

If the tag observed is a benchmark tag, then the output of the MR-Segment MLE processing is subjected to mobile reader location configuration and velocity (MR-LCV) estimation processing. In one embodiment, such MR-LCV estimation processing is implemented using the reader configuration database 460a (see FIG. 28a). MR-LCV estimation processing is responsible for estimating the location configuration and the velocity of the mobile reader. For each location benchmark tag and each mobile reader, the MR-LCV estimation processing maintains the current likelihood estimate of the tag being in each MR-segment. A likelihood estimate of an MR-segment gets aged out over time if there are no new tag observations that map to that segment. TABLE II below includes the information stored during MR-LCV estimation processing for a mobile reader ID MR1 that has 18 MR-segments.

TABLE II

Current benchmark tag's Segment Estimates for mobile reader MR1

| | BM Tag | | | | | |
|---|---|---|---|---|---|---|
| ID | S1 | S2 | S3 | S4 | S5 | ... S18 |
| T1 | 0 | 0 | 0.4 | 0.2 | 0.4 | ... 0 |
| T5 | 0.2 | 0.5 | 0 | 0 | 0.2 | ... 0.1 |
| T7 | 0 | 0 | 0 | 0.5 | 0.5 | ... 0 |

Each tag observation from the MR-Segment MLE processing triggers a new execution of the MR-LCV estimation processing for the mobile reader that owns the MR-LRP. During each execution, the segment estimate for the benchmark tag observed gets updated. The next step is to compute and update, for each location configuration, the likelihood of the mobile reader being in that location configuration, i.e., current benchmark tag's segment estimates for m={<T,{SegEst (T,S)}>. In one embodiment, the likelihood of mobile reader m being in a location configuration whose LocationCfgID=k is computed as follows.

(1) Configuration information: List of location benchmark tags visible and the corresponding MR-segment ID in k={<T (k), MR-S(T(k))>}.

(2) Initialize Likelihood L(k)=0;

(3) N(k)=cardinality of {<T(k), MR-S(T(k))>} set (4) For each tag t in T(k), (a) MR-S(t)=MR-Segment for t from the configuration information (b) L(k)+=(SegEst(t,MR-S(t))/N(k))

In one embodiment, the velocity estimation is based on the rate of change in the set of benchmark tags visible at the MR-segments. The physical location of the benchmark tags are known as part of the configuration, and therefore the distances between the benchmark tags can be computed. Further, the location of each MR-segment is known on the mobile reader, and therefore the distances between the MR-segments can be computed.

Next, the fixed reader segment, i.e., the segment determined with reference to the fixed readers, is estimated for the observed tag. The MR-Segments and their likelihoods are mapped to the corresponding fixed reader segments and their likelihoods. As described above, the mapping of the MR-Segments to the fixed reader segments depends on the location configuration of the mobile reader. The MR-LCV estimation processing outputs a list of <{LocationCfgID, L(LocationCfgID)}>, which is a list of potential location configurations of the mobile reader and their corresponding likelihoods.

All of the location configurations listed in the output of the MR-LCV estimation processing are then considered. For each LocationCfgID in the list, the contribution of the MR-Segment's likelihood toward a fixed reader segment can be computed as follows.

MR-Segment's likelihood*L(LocationCfgID)*(Proportion of the overlap of MR-Segment with the fixed reader segment in the location configuration corresponding to LocationCfgID) (17)

For example, let an MR-Segment S1's likelihood be equal to 0.5 (normalized to 1). Further, let there be one LocationCfgID L1 having a likelihood of 1. In addition, in that location configuration L1, let S1 map to fixed reader segments Sa(20%) and Sb(80%). This example will result in distributing S1's likelihood as 0.1 to Sa and 0.4 to Sb. The final likelihood of each fixed reader segment is the aggregate of the likelihood proportions from each MR-Segment computed over all of the location configurations.

RF Monitoring

It should be appreciated that the configuration data listed in the configuration database included in the reader configuration component 460 (see FIG. 4b) can vary over time with changes in the RFID environment in which the system operates, and the system components including their physical locations and operational characteristics. In one embodiment, the mid-level processor 402 automatically monitors and adapts its operation to this changing environment by monitoring the RF performance of the system via the RF monitoring sub-component included in the reader configuration component 460 (see FIG. 4b).

Specifically, the RF monitoring sub-component is operative to capture RF monitoring data from the readers 10.1-10.q and/or dedicated RF monitors within the system. The captured RF data may be narrow-band or broad-band, and may include received signal strength data for active readers and non-reader interferers and time domain delay measurements, which may be used to estimate distances and directions to the active readers and non-reader interferers. The RF monitoring sub-component is further operative to de-modulate the captured RF data in a single-channel or multi-channel manner for monitoring the operation of the reader-tag air protocol.

In the presently disclosed system, the RF monitoring data captured by the RF monitoring sub-component is cross-correlated with the expected RF, protocol, and data behavior, as determined by the reader configuration information and the active reader interrogation schedule. Deviations from the expected behaviors create configuration data updates for the configuration database, which can be reported to the system operator (Operator) via the administration interface 456 (see FIG. 4*b*). For example, such deviations may be the result of malfunctioning readers, malfunctioning tags, incidental interference from either reader or non-reader sources, deliberate interference, jamming, or physical tampering by intruders or other nefarious parties, and/or improper configuration of the system or readers. Such problems may require administrative intervention to correct.

The presently disclosed system is operative via the mid-level processor 402 (see FIGS. 4*a*-4*c*) to perform functions for monitoring and characterizing the reader-to-reader interference within a site or facility in which the readers are deployed. To that end, the mid-level processor directs one of the readers within the system to perform RF transmitter functions, while directing at least one other reader within the system to operate as an RF receiver for receiving RF signals generated by the transmitting reader. It is understood that the reader performing RF receiver functions may include an RF receiver that includes an RF receiver component and an RF monitoring component for determining at least one characteristic such as a power level associated with a received RF signal.

In one embodiment, each of the readers is like the reader 220 (see FIG. 2*b*), which is operative to perform RF transmit and receive functions both independently and simultaneously. It is noted that the reader operating as an RF receiver (the co-monitoring receiver) has very low RF leakage out of its transmit circuits (i.e., the transmit data processor 224, the transmitter protocol sequencer 226, the tunable RF transmitter reference 228, and the RF transmitter 236; see FIG. 2*b*), which are disabled while the system performs the self-monitoring receive functions. The level of such RF leakage is lower than that of the RF signal received by the co-monitoring receiver from the transmitting reader. The mid-level processor then directs the co-monitoring receiver to measure the received power level on the same channel as, or on a channel adjacent to, the channel to which the transmitting reader is tuned, thereby obtaining an indication of the level of reader-to-reader interference. For example, such measurement operations can be performed by the co-monitoring receiver using the receive data processor 234 (see FIG. 2*b*). In addition, such monitoring and characterizing of RF interference may be performed "off-line" during a calibration cycle, or during a selected cycle of normal system operation.

Figure 14A:
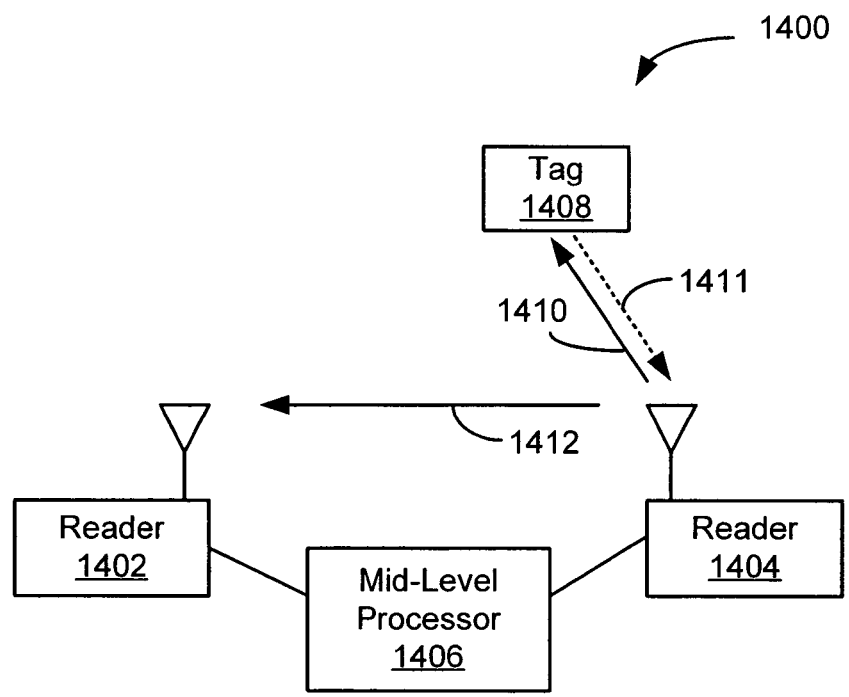
FIG. 14a-14b are block diagrams of RFID systems arranged to monitor and characterize reader-to-reader interference according to the present invention.

FIG. 14*a* depicts an RFID system 1400 configured to perform self-monitoring functions for monitoring and characterizing reader-to-reader interference, in accordance with the present invention. In the illustrated embodiment, the system 1400 includes a plurality of readers 1402, 1404, a mid-level controller/processor 1406 communicably coupled to the readers 1402, 1404, and at least one tag 1408. The mid-level processor 1406 is operative to direct the receiver component of the reader 1402 (the co-monitoring receiver) to perform receive functions, and to direct the transmitter component of the reader 1404 to perform transmit functions. For example, the RF signal transmissions of the reader 1404 may occur during a singulation process performed between the reader 1404 and the tag 1408, as illustrated by signal transmissions 1410-1411. The co-monitoring receiver 1402 is operative to measure the impact of an interfering signal transmission 1412 of the transmitting reader 1404 upon itself. Because the mid-level processor 1406 stores information relating to the frequencies of transmission of the plurality of readers within the system, the processing component 1406 can determine the frequency of the signal transmission 1412, and identify the reader 1404 as the source of the interference 1412 based on this frequency determination. It is noted that the mid-level processor 1406 can employ time causality relationships to improve the confidence of its determination of the reader 1404 as the source of the interference 1412. In an alternative embodiment, the co-monitoring receiver 1402 is operative to detect a low-level signal on an interfering signal transmission that identifies the reader generating the interference, and to demodulate the identifying signal for determining the interference source.

Figure 15A:
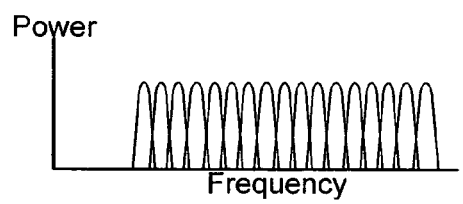
FIG. 15a is a diagram of multiple signal transmissions covering a band of frequencies generated by a first RFID reader included in the system of FIGS. 14a-14b.

In one embodiment, the co-monitoring receiver 1402 determines the level of the interference 1412 by measuring the received power level associated with the interference 1412 on the channel to which the transmitter component of the reader 1404 is tuned. In an alternative embodiment, the co-monitoring receiver 1402 takes wideband samples of the interference 1412, and performs a fast Fourier transform (FFT) to transform the time domain samples to the frequency domain, thereby determining the interference level without having to tune to the precise channel on which the reader 1404 is transmitting. It is noted that during normal interrogation operations, the transmitter component of the reader 1404 can perform frequency hopping operations, or switch frequencies in accordance with non-hopping regulatory operations, to generate multiple signal transmissions covering a band of frequencies (see, e.g., FIG. 15*a*).

Because the transmitter component of the reader 1404 does not include an ideal filter, a level of signal energy is typically generated outside the intended channel of transmission. Further, because the co-monitoring receiver component of the reader 1402 also does not include an ideal filter, it typically receives a portion of the energy present outside the channel to which it is tuned. When the interference 1412 is on the channel adjacent to the one to which the co-monitoring receiver component of the reader 1402 is tuned, the receiver component of the reader 1402 receives a combination of the energy remaining in the receiver's channel after passing through the transmitter's filter, and the energy remaining on the channel adjacent to the one to which the receiver component of the reader 1402 is tuned after passing through the receiver's filter. It is noted that the combination of these signal energies can interfere with RF signals received by the receiver component of the reader 1402 from a tag when that reader performs normal tag interrogation operations.

When the transmitter component of the reader 1404 transmits a signal on a channel adjacent to the one to which the co-monitoring receiver component of the reader 1402 is tuned, the power measured by the reader 1402 corresponds to the level of adjacent channel interference. When the transmitter component of the reader 1404 transmits signals on channels that are displaced by a number L of channels from the channel to which the receiver component of the reader 1402 is tuned, the power measured by the reader 1402 corresponds to what is referred to herein as the level of L-adjacent channel interference. For example, the L-adjacent channel interference may be expressed as $$L = |M - N|, \qquad (18)$$

in which "M" corresponds to the transmit channel number, and "N" corresponds to the receive channel number.

Figure 15B:
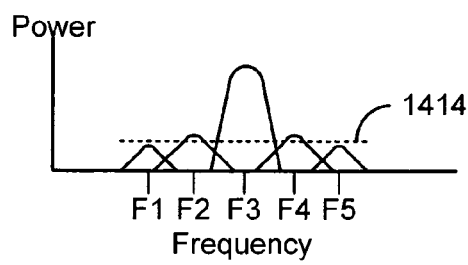
FIG. 15b is a diagram illustrating signal power corresponding to a band of frequencies measured by a second RFID reader included in the system of FIGS. 14a-14b.

In one embodiment, the co-monitoring receiver component of the reader 1402 can remain tuned to a particular channel, and the in-channel power and adjacent channel power it receives from the transmitter component of the reader 1404 can be measured to determine whether or not the reader-to-reader interference level is such that the receiver component of the reader 1402 can perform normal tag interrogation operations at the same time as the reader 1404. FIG. 15*b* illustrates the in-channel power corresponding to frequency channel F3, and the adjacent channel power corresponding to frequency channels F1, F2, F4, and F5, as measured in the reader 1402. As shown in FIG. 15*b*, to determine whether or not the readers 1402, 1404 can operate at the same time on channels F1-F5, a threshold power level 1414 is set, and a determination is made as to whether the power levels measured in the reader 1402 on those channels F1-F5 crosses the threshold level 1414. For the case illustrated in FIG. 15*b*, the threshold level 1414 is crossed when the reader 1404 is operating on channels F2, F3, or F4, but is not crossed when the reader 1404 is operating on channels below F2 or above F4 (see FIG. 15*b*). It may therefore be concluded that the readers 1402, 1404 can operate at the same time when the channel number L (see equation (5) above) is greater than 1, e.g., when the reader 1402 operates on channel F3 (N=3) and the reader 1404 operates on channel F5 (M=5) or channel F1 (M=1).

It should be appreciated that the above-described interference monitoring operations may be performed using any other suitable metric in addition to or instead of a fixed or variable threshold level. For example, the threshold level 1414 described above can be based on a signal level or a signal-to-interference level. The interference monitoring operations may also be performed using any suitable comparison operation and in accordance with any suitable algorithm. In addition, it is appreciated that if the characteristics of the non-ideal filters included in the reader 1404 and the co-monitoring receiver component of the reader 1402 are known, then a measurement of the power level on an intended channel of signal transmission/reception can be used to estimate the signal energy levels present outside that channel. These estimated signal energy levels can then be used in determining whether or not the reader 1402 can perform normal tag interrogation operations at the same time as the reader 1404, as described above.

In one embodiment, the determination of whether or not the reader-to-reader interference level is such that the readers 1402, 1404 can operate at the same time is limited to a relatively small portion of the available frequency band (e.g., the frequencies F1-F5; see FIG. 15*b*) due to multi-path reflections, which can cause the received power levels between the readers to change as a function of frequency. For this reason, when performing reader-to-reader interference measurements within a predetermined band of frequencies, the co-monitoring receiver component of the reader 1402 (see FIG. 14*a*) is successively tuned to multiple channels suitably spaced across the band. The reader 1402 then measures the in-channel and adjacent channel power levels within sub-bands surrounding the respective channels to which it is tuned. By measuring the power levels within each of these frequency sub-bands while the reader 1404 operates on the same channel as the receiver component of the reader 1402 or on channels adjacent thereto, the co-monitoring receiver component of the reader 1402 can determine whether or not the resulting reader-to-reader interference would prevent the readers 1402, 1404 from operating at the same time within these frequency sub-bands.

Figure 14B:
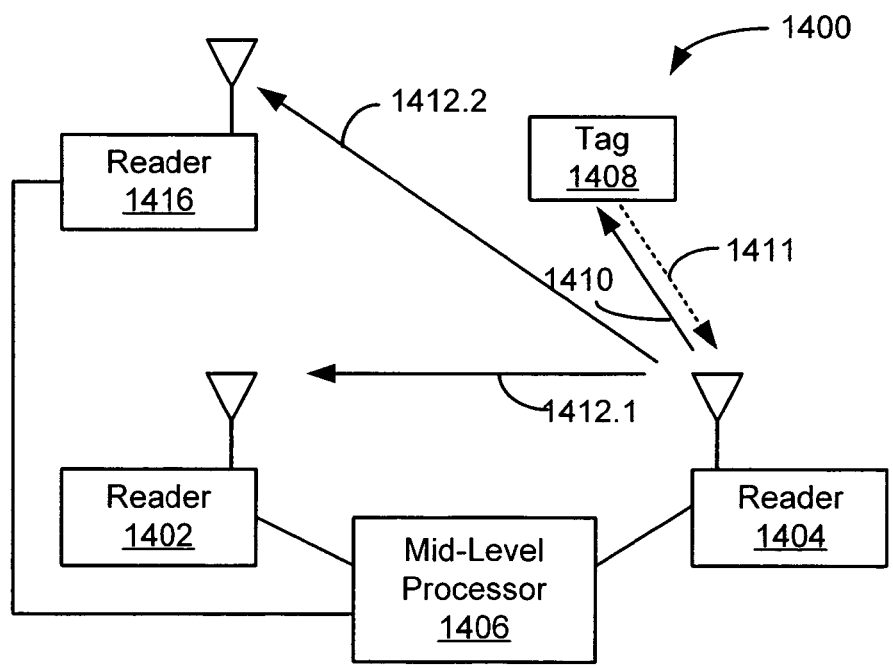

In an alternative embodiment, multiple co-monitoring receivers may be employed to measure the level of reader-to-reader interference generated by a single transmitter within a site or facility. FIG. 14*b* depicts the system 1400 including a plurality of readers 1402, 1404, 1416, the mid-level processor 1406 communicably coupled to the readers 1402, 1404, 1416, and a tag 1408. In this embodiment, both of the readers 1402, 1416 include co-monitoring receiver components. Specifically, the co-monitoring receiver component of the reader 1416 receives an interfering signal transmission 1412.2 from the transmitter component of the reader 1404 at the same time as the co-monitoring receiver component of the reader 1402 receives an interfering signal transmission 1412.1 from the transmitter component of the reader 1404. It should be appreciated that one, two, or any suitable number of readers within the system may be employed as co-monitoring devices for determining reader-to-reader interference. In the illustrated embodiment, both of the co-monitoring receiver components of the readers 1402, 1416 operate to monitor and characterize the reader-to-reader interference simultaneously. For example, one of the readers 1402, 1416 may monitor/characterize the interference corresponding to one portion of the frequency band, while the other reader monitors/characterizes the interference corresponding to another portion of the frequency band.

In addition, the presently disclosed system can employ the mid-level processor 402 (see FIGS. 4*a*-4*c*) to determine whether one or more readers within the system is operating properly based on operational monitoring of the readers. Such operational monitoring of the readers, which is referred to herein as RF health monitoring, can be performed in a manner similar to that used to perform reader-to-reader interference measurements, as described above. The mid-level processor 1406 (see FIG. 14*b*) directs the transmitter component of the reader 1404 to transmit on a channel on which no other reader within the system is currently transmitting. Next, the mid-level processor 1406 directs the co-monitoring receiver components of the readers 1402, 1416 to receive samples of the power levels associated with the signal transmissions 1412.1-1412.2, respectively, on the same channel to which the transmitter component of the reader 1404 is tuned. The readers 1402, 1416 then provide information relating to the received power level samples to the mid-level processor 1406, which generates at least one power profile corresponding to the angles of signal reception at the respective readers 1402, 1416. Next, the mid-level processor 1406 uses these power profiles to generate a baseline power profile. Accordingly, each time the co-monitoring receiver components of the readers 1402, 1416 perform RF health monitoring of the transmitter component of the reader 1404, the mid-level processor 1406 can detect and examine deviations of the generated power profile from the baseline power profile to determine whether or not the transmitter component of the reader 1404 is operating properly.

In one embodiment, the system performs such RF health monitoring techniques over selected sub-bands of the overall frequency band to account for variations caused by multi-path reflections. In addition, the system can employ RF health monitoring techniques to detect asymmetric operation of one or more of the communications links within the system. For example, the mid-level processor 1406 can perform RF health monitoring for selected links between the transmitter component of the reader 1404 and the co-monitoring receiver components of the readers 1402, 1416, subsequently direct the transmitter component of the reader 1402 or 1416 to transmit RF signals and direct the co-monitoring receiver components of the readers 1402, 1404 or 1404, 1416 to receive RF signals, and perform RF health monitoring functions along the selected links while transmitting in the opposite direction. The detection of asymmetric operation of one or more communications links may be indicative of a system operational failure or other equipment problem. The mid-level processor 1406 can also perform wideband analysis of the signal transmissions between the readers 1402, 1404, 1416 to detect potential distortions in the frequency domain.

In addition, it was described that the mid-level processor included in the RFID system can control the readers within the system based on environmental or other external interference. For example, such external interference may be caused by cordless telephones, wireless door alarms, or other wireless devices within the RFID environment. The system may be operative to sense, measure, and characterize such external interference, and the mid-level processor may be operative to use these external interference characterizations to optimize its scheduling of reader interrogation operations. For example, in the event the mid-level processor determines that the operation of a transmitter component of one of the readers may collide in time or frequency with external transmissions on a particular channel, the mid-level processor can schedule the tag interrogations performed by that reader to occur when that particular channel is expected to be free of such external interference. It is noted that when performing external interference measurements on a particular channel, the mid-level processor disables all of the transmitter components that would otherwise be transmitting on or near that channel, based on the number of channels of isolation deemed necessary to prevent an interrogating signal or a tag response signal from affecting the measurement. The mid-level processor directs all of the receiver components of the readers participating in the external interference measurement (the co-monitoring receivers) to perform receive functions.

In one embodiment, the co-monitoring receivers measure the external interference using a distributed narrowband instantaneous spectral analysis technique. Specifically, each of the co-monitoring receivers within an area of physical proximity operates to receive RF transmissions on a different frequency channel such that all channels within a selected sub-band of channels are monitored simultaneously. The co-monitoring receivers then sample the received power level for a predetermined interval of time T at a rate equal to at least R samples/sec, and the power level samples are time-stamped. It is noted that the sampling rate R need only be at a level sufficient to satisfy the requirements of Nyquist sampling, and that the duration of the time interval T should be long enough to capture the dynamics of the external interference. Next, the co-monitoring receivers provide information relating to the power level samples to the mid-level processor, which compiles multiple narrowband observations over the time interval T to ascertain the time-frequency characteristics of one or more external interferers within the band. For example, in the event there is a single external interferer performing frequency hopping operations, the multiple narrowband observations may be employed to determine the hop dwell, pattern, and/or periodicity of the external interference within the selected sub-band. The time-frequency characteristics of the external interferer can then be used to optimize the scheduling of the reader interrogation operations.

It is noted that each co-monitoring receiver can receive a different power level from each external interfering source due to independent propagation characteristics within the RFID environment. For this reason, the power level measurements corresponding to each reader are normalized. The normalized power levels are then used to determine the extent of the interference received by each reader, and to qualify the analysis of the power level samples provided by each reader. It is further noted that the sampling rate R of the received power levels is high enough to allow the power levels to be measured over a specified time interval, and that the characterizations of the external interference and the sampled power levels over that specified time interval may be performed using narrowband receivers.

The mid-level processor may also direct one or more of the co-monitoring receiver components to operate on more than one channel. For example, if each co-monitoring receiver performs external interference monitoring on three different channels, then the number of co-monitoring receivers within the system can be reduced by one third. In this case, the sampling frequency R for each receiver would be three times the level needed for a receiver monitoring a single channel. The channels monitored by the receivers may also overlap to improve signal resolution.

Moreover, the co-monitoring receivers may measure the external interference using a wideband instantaneous spectral analysis technique. By this technique, the receive data processor within each co-monitoring receiver (see the receive data processor 234 of FIG. 2*b*) is operative to perform high speed sampling, thereby taking complex samples of the received power level at a rate exceeding the Nyquist sampling rate for the sub-band that receiver is currently monitoring. Next, the mid-level processor performs a transform such as an FFT on the samples, and the corresponding frequency characterization is completed for the time duration of the samples. It is noted that the sampling and transforming operations are repeated at a rate faster than the transient behavior of the external interferer to allow any changes in interference over time to be detected.

Additionally, the co-monitoring receivers may measure the external interference using a distributed wideband instantaneous spectral analysis technique. Via this technique, the mid-level processor directs the co-monitoring receivers to take time staggered instantaneous spectral analysis measurements on a respective channel such that the capture, processing, and transmittal of the results corresponding to each receiver fills a predetermined capture interval T. Each co-monitoring receiver provides time domain and frequency domain information to the mid-level processor, which combines the results to generate the complete frequency-time characterizations. In the event there are multiple external interferers, each co-monitoring receiver may receive a different power level from each interfering source due to the independent propagation characteristics within the RFID system.

In one embodiment, power measurements corresponding to a specific receiver are normalized to the power levels that the receiver component of the reader is receiving. Different power levels can be factored out of the measurements by such normalization to facilitate analysis of the occupancy of a frequency band over time. It is noted that the mid-level processor may control the operation of a plurality of co-monitoring receivers so that some of the receivers provide more time domain information while other receivers provide more frequency domain information.

The mid-level processor included in the RFID system can also control the readers within the system based on signal dependent interference associated with each reader. Signal dependent interference is generally caused by RF signals reflecting off various objects within the RFID environment. Such RF signal reflections can produce sidebands of the incident transmit signal at frequencies the same as or near the frequencies used by the tags to respond to reader interrogations. A characteristic of signal dependent interference is that it generally tracks the transmit frequency. The mid-level processor may characterize the signal dependent interference associated with a selected reader, and assign an appropriate sub-carrier for the reader to use when performing tag interrogation operations, thereby assuring that the backscatter from the interrogated tag is at a sub-carrier frequency different from the interfering signal.

The signal dependent interference associated with each reader within the system may be determined with one transmitter component of a reader transmitting in a predetermined sub-band at a time. The transmitting reader transmits a burst of continuous wave (CW) without interrogating any tags, and at least one co-monitoring receiver measures the received signal power level. In the event the co-monitoring receiver includes a variable sub-carrier receive filter, the mid-level processor directs the receiver to vary the characteristics of this filter to allow the received power level to be measured across multiple sub-carriers, thereby determining the presence of periodic backscatter modulation. The co-monitoring receiver then provides the received power level measurements to the mid-level processor, which uses this information to plan the sub-carrier assignments for the readers within the system. For example, the mid-level processor can direct the co-monitoring receiver to measure the received power level at multiple transmit frequencies, or as the transmitting reader hops autonomously to various frequencies within the band. Because signal dependent interference generally tracks the transmit frequency, the presence of signal dependent interference can be detected by obtaining repeatable power level measurements across the multiple transmit frequencies.

Interrogation Scheduling

The interrogation scheduler sub-component included in the reader coordination component 464 is operative to compute the reader time and frequency multiplexing and scheduling solutions that satisfy the above-listed constraint sets, and the reader operation demands generated by location virtualization processing and/or the reception of external trigger events. For readers capable of performing RF transmit and receive functions independently (for the purpose of performing bi-static, multi-static, or RF monitoring operations), the RF transmit and receive schedules are computed independently. Interrogation scheduling can be optimized to minimize the latency of reader demands by taking advantage of prior interrogations and location virtualization computations to accelerate interrogations over populations of known tags, by minimizing RF spectrum and power usage, by coordinating with reader frequency-hopping patterns, by maximizing forward-looking schedule flexibility, and by minimizing computation and memory consumption. The interrogation schedule can also be re-computed as the constraints and reader operation demands accrue and change. In one embodiment, the interrogation schedule is computed as far into the future as possible subject to computation and memory consumption limitations.

The schedule/operate reader array sub-component included in the reader coordination component 464 receives the interrogation schedule from the scheduler sub-component, and distributes the schedule to the plurality of readers 10.1-10.q. The distribution of the interrogation schedule may be proactive (e.g., when the readers are capable of accepting a list of commands to be executed at specific times in the future) and/or interactive (e.g., when the readers are only capable of accepting immediate commands). The commands that the mid-level processor 402 may use to control the readers 10.1-10.q include start/stop a single or repetitive interrogation, schedule a single or repetitive interrogation at a future time, schedule a single or repetitive interrogation on/except-on a trigger, and schedule a single or repetitive interrogation on/except-on/terminate-on a trigger. It is noted that the commands may include interrogation parameters, and may also target specific tags, tag ranges, or data sets.

It is noted that reader-to-reader interference can be further avoided by making suitable time and frequency channel assignments to the plurality of readers 10.1-10.q. It is noted that for the purposes of the reader coordination component 464 (see FIG. 4c), a reader corresponds to a logical reader. The schedulable entity in the reader coordination block is a logical reader. Specifically, within an RFID environment, an RFID system can include a plurality of mid-level processors such as the mid-level processors 302.1-302.4 (see FIGS. 3a-3b), each of which can control one or more of the readers 10.1-10.q. Further, the reader coordination component included in each of the mid-level processors 302.1-302.4 can coordinate not only the readers under its own control, but also up to the entire set of readers deployed within the RFID environment, including the readers under the control of the other mid-level processors.

In the event the RFID environment includes a single site or facility, the readers 10.1-10.q typically share a common set of available frequencies. It is noted that the site or facility may be large enough or may be internally partitioned to include more than one RF domain, in which case the RFID system can perform reader coordination independently on non-interfering subsets of readers populating the respective RF domains. The frequency for each of the readers 10.1-10.q is selected using a collective decision making process, which may be performed using a centralized or distributed computation. If the collective decision making process is performed using a centralized computation, then one of the mid-level processors 402 is designated as a master processing component. Next, during each time slot, the following process steps are performed:

(1) Each of the mid-level processors selects a set of readers, and for each reader the associated frequency channel(s) using a reader selection algorithm, as described below.

(2) Each of the mid-level processors sends information relating to the selected readers to the designated master processing component.

(3) The master processing component determines a reader-frequency allocation for the site or facility using a frequency selection algorithm, as described below.

(4) The master processing component sends information relating to the reader-frequency allocation to the other mid-level processors.

(5) Each of the mid-level processors provides the reader-frequency allocation information to the readers within its respective RF domains of control.

The distributed computation is like the centralized computation described above with the exception that instead of sending information relating to the selected readers to a designated master mid-level processor for subsequent determination of the reader-frequency allocations, each of the mid-level processors sends information relating to a selected reader to every other mid-level processor, and each mid-level processor determines a suitable reader-frequency allocation. Each of the mid-level processors then provides the respective reader-frequency allocation information to the readers within its respective RF domain of control.

In one embodiment, each mid-level processor is operative to execute the following reader and frequency selection algorithms when making reader-frequency allocations. In each of these algorithms, the following terminology is employed:

(1) $D_i(t)$—The duty cycle demand for reader i. Based on the duty cycle requirements, the corresponding ON/OFF times for the reader can be determined. The demand cycle for the reader is determined based on the number of tags under the purview of the reader, the mobility of the tags under the purview of the reader, and the bit error rate (BER) in the RF domain of this reader. The demand cycle is dynamic in nature, depending on new events occurring within the RF domain. For example, the events could be new tags on the floor of a site or facility, changes in the RF environment, etc. The interrogation scheduler sub-component adapts to such new demands on the floor and adjusts the interrogation scheduling decisions accordingly.

(2) $X_i(t)$—The ON time for reader I, specifically, the time when the reader is transmitting on a non-null frequency. The unit of measurement of the ON time is a number of time slots.

(3) $Y_i(t)$—The OFF time for reader I, specifically, the time interval between two successive ON times. The unit of measurement of the OFF time is a number of time slots.

(4) $S_i(t)$—a first interrogation scheduler parameter. For time slot t, $S_i(t)$ is the earliest time that the ON time for a reader(i) can begin without violating the duty cycle requirements.

(5) $E_i(t)$—a second scheduler parameter. For time slot t, $E_i(t)$ is the latest time that the ON time for a reader(i) can begin without violating the duty cycle requirements.

(6) $\delta_i(t)$—a third scheduler parameter. $\delta_i(t)$ is the optimal time spacing for a reader(i)'s ON times at time t. This optimal spacing is a function of $X_i(t)$ and $Y_i(t)$, i.e., $$\delta_i(t)=f(X_i(t),Y_i(t)). \quad (19)$$

In the reader selection algorithm, the current time is denoted by T. In addition, $\{F_{free}\}=\{F\}$, in which "$\{F_{free}\}$" is the set of free frequencies, and $\{R\}$ is the set of inactive readers. Initially, T=0, $S_i(0)$=0, and $E_i(0)=S_i(0)+\delta_i(0)$. Using the terminology described above, an algorithmic description using pseudo-code of an exemplary procedure for performing reader selection proceeds as follows.

For each reader i, determine $\delta_i(t)$; if there is a change, update $E_i(t)$.

Determine whether any frequencies have been freed up. For each active reader, if $S_i(t)$<T, move the reader to the set of inactive readers, and add the frequency that the reader was operating at to the set of free frequencies $\{F_{free}\}$.

Determine the set U of inactive readers for which $S_i(t) \leq T$, i.e., U={i | $S_i(t) \leq T$, $1 \leq i \leq R$}.

Let $E_{min}$=minimum value of $E_i(t)$ over $i \in U$.

U' is the set of readers for which, $E_i(t)=E_{min}$, and $i \in U$.

Perform the frequency selection algorithm, as described below. The frequency selection algorithm is an iterative maximal matching algorithm between U' and $\{F_{free}\}$. At the end of the frequency selection algorithm, a subset of readers in U' is matched to corresponding frequencies. Further, the selected frequencies are removed from the set of free frequencies, and the selected reader's scheduler parameters are updated.

Update $\{F_{free}\}$.

Update the selected reader's scheduler parameters, specifically, $S_i(t)=E_i(t)$ and $E_i(t)=E_i(t)+\delta_i(t)$.

T←T+1.

An algorithmic description using pseudo-code of an exemplary procedure for performing frequency selection is expressed as follows (initially, the iteration count I=0).

(1) Frequency selection by Reader—Each Reader $R_r$ selects frequency $F_f$ such that $NEF(R_r,F_f)=MAX(NEF(R_r,F_i))$, $1 \leq i \leq F$, in which "NEF" is a Non-Exclusivity-Factor. The Non-Exclusivity-Factor (NEF) of an R-F selection $R_r,F_f$, i.e., $NEF(R_r,F_f)$, is defined herein as the number of allowable non-interfering R-F combinations that can co-exist with $R_r,F_f$. In the event there are multiple choices with maximal weights, a tie-breaking mechanism is used, e.g., the lowest index, random, or any other suitable tie-breaking mechanism. Each reader Ri sends a request to its selected frequency $F_j$. In the event there no selection was made by a reader, no requests are sent by the reader.

(2) Reader selection by Frequency—Each frequency $F_f$ may get multiple requests from different readers. The contention is resolved by the frequency selecting one reader $R_r$ such that $NEF(R_r,F_f)=MAX(NEF(R_i,F_f))$, $1 \leq i \leq$ RequestingReadersFor$F_f$. Each frequency that got request(s) therefore ends up selecting one reader.

(3) Remove $\{R_r,F_f\}$.

(4) I←I+1.

(5) If I<MAX_ITER go to step (1).

Using the above-described algorithms and techniques, each of the mid-level processors within the RFID system can assign frequency channels and time slots for the readers within its RF domain of control, thereby providing a mechanism of distributing RF resources such that the time/frequency plane is efficiently packed. In the time domain, time is segmented into a plurality of minimum common time granules, which allow the distribution of RF resources to occur in equal chunks such that all allowable use of RF resources is a multiple of a predetermined time granule. Prior to the occurrence of each time granule, the usage allocation for a particular reader is communicated to that reader via a transmission on the reader backbone. The minimum time granule can be variable based on the network requirements, and may correspond to the greatest common factor of the shortest transmission or the minimum reaction time required for each reader. It is not necessary for the minimum time granule to be the same for each reader or frequency channel. In one embodiment, however, the minimum time granule is fixed across the multiple readers. In this case, the frequency/time pattern can be illustrated as a grid of squares, as described below.

It is noted that the following interference conditions can occur when different frequencies are used in the same time slot:

(1) Reader-to-reader co-interference—Prevents multiple readers from occupying the same frequency channel in the time slot within an RF domain. Such reader-to-reader co-interference may require the readers to employ a separation of frequency channels that is greater than one at short distances, depending on the respective reader's receive filter and dynamic range characteristics. Reader-to-reader interference may be overcome at modest separation distances between readers, thereby allowing the use of adjacent frequency channels.

(2) Reader-to-tag interference—Signals from two or more co-interrogating readers impinge on a tag or tags within the interrogation zones of the readers. Such reader-to-tag interference can render the tags incapable of correctly interpreting any of the reader signals. Reader-to-tag interference can be overcome or at least mitigated by a modest separation distance between the readers.

The distribution of RF resources among a plurality of readers will be better understood with reference to the following first illustrative example and TABLE III below. In this first example, an RFID system includes eight readers R1-R8, each reader having the same demand requirements and equal priority. In addition, there are four frequency channels F1-F4, which may be statically assigned, i.e., there is no frequency hopping requirement. The eight readers R1-R8 are disposed along a line at a predetermined spacing. Further, the readers in each of the pairs R1-R2, R3-R4, R5-R6, and R7-R8 are adjacent to one another, while the readers in each of the pairs R1,R3, R2,R4, R3,R5, R4,R6, and R6,R8 are spatially separated from one another by one reader. In this example, the minimum time granule is fixed across the readers R1-R8, and therefore the frequency/time pattern for the readers can be illustrated as a grid of squares, as depicted in TABLE III.

TABLE III

| Channel | Time | | | |
|---|---|---|---|---|
| | t1 | t2 | t3 | t4 |
| F1 | R1 | R2 | R1 | R2 |
| F2 | R3 | R4 | R3 | R4 |
| F3 | R5 | R6 | R5 | R6 |
| F4 | R7 | R8 | R7 | R8 |

As shown in TABLE III, each of the readers R1-R8 can transmit an RF signal every other time slot, and therefore each reader has a one-half duty cycle. For example, reader R1 can transmit an RF signal during time slots t1 and t3 on channel F1, and reader R2 can transmit an RF signal during time slots t2 and t4 on channel F1. It is noted that readers R3-R4, R5-R6, and R7-R8 operate in a similar manner on channels F2, F3, and F4, respectively. In addition, in a single time slot, the readers transmitting in adjacent frequency channels are spatially separated from one another by one reader. For example, in time slots t1 and t3, readers R1 and R3 transmitting in the adjacent frequency channels F1-F2 are spatially separated by reader R2, readers R3 and R5 transmitting in the adjacent frequency channels F2-F3 are spatially separated by reader R4, and readers R5 and R7 transmitting in the adjacent frequency channels F3-F4 are spatially separated by reader R6. It is noted that readers R2, R4, R6, and R8 transmitting during the time slots t2 and t4 operate in a similar manner.

In the presently disclosed embodiment, the readers are assigned frequency channels in each time slot as time progresses. This assignment is based upon a priority assignment, which in turn is based upon all of the existing constraint inputs. The readers having the highest priority in each time slot are assigned the next channel that does not violate its respective constraints. Further, the gaps in channel assignment in a single time slot are assigned to the next priority readers. In the event there are more readers than frequency channels, at least some of the readers will have a duty cycle of less than one.

In this way, the determination of which readers will transmit during any one time slot is made dynamically based on the most current information and constraints. It is noted that reader operations may span multiple time slots and scheduling time granules. It is further noted that if the reader's physical configuration permits rapid frequency changes, then the frequency channel of the reader can be regarded as a free parameter between time slot assignments. Otherwise, the frequency transitions for that reader will be constrained accordingly.

The distribution of RF resources among the plurality of readers R1-R8 is further illustrated in the following second example, in which reader R1 has the highest priority. As shown in TABLE IV below, the duty cycle of reader R1 is equal to 1 on frequency channel F1. Further, the other readers R2-R8 are distributed with equal priority over the remaining frequency channels F2-F4, resulting in a duty cycle of 3/7 for each reader. In addition, the frequency channel/time slot assignments are made assuming that the readers transmitting in adjacent channels are spatially separated from one another by one reader.

TABLE IV

| Channel | Time | | | | | | |
|---|---|---|---|---|---|---|---|
| | t1 | t2 | t3 | t4 | t5 | t6 | t7 |
| F1 | R1 | R1 | R1 | R1 | R1 | R1 | R1 |
| F2 | R3 | R4 | R8 | R7 | R6 | R5 | R6 |
| F3 | R5 | R2 | R3 | R4 | R8 | R7 | R2 |
| F4 | R7 | R6 | R5 | R2 | R3 | R4 | R8 |

In this second example, the complexity of the frequency channel/time assignment is reduced since all constraints result in one or a relatively small number of possible outputs. If the priority of the next reader in line for assignment is higher than that of any of the other readers, and if the frequency channel spacing constraints can be met, then that reader is assigned the next time slot.

In one embodiment, control packets containing time slot assignment information for a particular reader may also carry information relating to anticipated time slot assignments for the reader. However, communication of the multiple time slot assignment information may reduce the bandwidth and latency requirements of the network infrastructure. It is noted that such reader control packets may further include other control information such as the transmit power, bit rate, and other protocol information regarding singulation and/or specific tag targets.

The frequency channel/time slot assignments described above may be employed to generate a frequency/time schedule comprising a sequence of reader/frequency matches over time. The frequency/time schedule can determine, for each time slot, the frequency at which each reader will transmit (or not transmit, if the reader is not scheduled to transmit during that time slot). In RF domains in which the number of frequency channels is less than the number of readers, some of the readers will be scheduled not to transmit during some time slots. It is noted that a reader frequency allocation during any given time slot may be dependent upon a number of factors including the demands of the client applications, the reader group requirements, the RF power emission limits, the power supply usage, the RF interference, the transmit power levels of the other readers, and the relative priorities of the various readers.

In addition, it was described that the frequency selection algorithm uses the co-interference information of the reader-frequency pair in its selection criteria. In another illustrative example, an RFID system includes five readers R1-R5 operating on three frequency channels F1-F3. The readers R1-R5 are disposed along a line at a predetermined spacing, e.g., if the distance between the readers R1-R2 is equal to D, then the distance between the readers R1 and R3 is equal to 2D, the distance between the readers R1 and R4 is equal to 3D, and so on. Further, the frequency channels F1-F3 are configured such that if the readers are separated by a distance of at least 2D, then there is no interference between the adjacent channels F1-F2 and F2-F3. Moreover, if the readers are separated by a distance of at least D, then there is no interference between the channels F1 and F3.

The co-interference matrix for the readers R1-R5 in this example is depicted in TABLE V below. As shown in the first row of TABLE V, in the event reader R1 is scheduled to transmit on frequency channel F1 during a respective time slot, reader R2 can be scheduled to transmit on frequency channel F3, and readers R3-R5 can be scheduled to transmit on frequency channel F2 or F3, so as not to interfere with the transmissions of the reader R1. Further, as shown in the second row of TABLE V, in the event reader R1 is scheduled to transmit on frequency channel F2 during a respective time slot, reader R2 is scheduled not to transmit, and the readers R3-R5 are scheduled to transmit on frequency channels F1 or F3 so as not to interfere with the transmissions of the reader R1, and so on.

particular reader after passing a first device, the interrogation scheduler can prepare that reader to transmit at an appropriate time after the tag is detected by the first device. In this way, readers can be prepared in advance for performing subsequent transmissions based on perceived patterns of tag movements through the site or facility.

TABLE V

| R-F | R1F1 | R1F2 | R1F3 | R2F1 | R2F2 | R2F3 | R3F1 | R3F2 | R3F3 | R4F1 | R4F2 | R4F3 | R5F1 | R5F2 | R5F3 | NEF |
|-----|------|------|------|------|------|------|------|------|------|------|------|------|------|------|------|-----|
| R1F1 | 0 | 0 | 0 | 0 | 0 | 1 | 0 | 1 | 1 | 0 | 1 | 1 | 0 | 1 | 1 | 7 |
| R1F2 | 0 | 0 | 0 | 0 | 0 | 0 | 1 | 0 | 1 | 1 | 0 | 1 | 1 | 0 | 1 | 6 |
| R1F3 | 0 | 0 | 0 | 1 | 0 | 0 | 1 | 1 | 0 | 1 | 1 | 0 | 1 | 1 | 0 | 7 |
| R2F1 | 0 | 0 | 1 | 0 | 0 | 0 | 0 | 0 | 1 | 0 | 1 | 1 | 0 | 1 | 1 | 6 |
| R2F2 | 0 | 0 | 0 | 0 | 0 | 0 | 0 | 0 | 0 | 1 | 0 | 1 | 1 | 0 | 1 | 4 |
| R2F3 | 1 | 0 | 0 | 0 | 0 | 0 | 1 | 0 | 0 | 1 | 1 | 0 | 1 | 1 | 0 | 6 |
| R3F1 | 0 | 1 | 1 | 0 | 0 | 1 | 0 | 0 | 0 | 0 | 1 | 0 | 1 | 1 | 1 | 6 |
| R3F2 | 1 | 0 | 1 | 0 | 0 | 0 | 0 | 0 | 0 | 0 | 0 | 1 | 0 | 1 | 0 | 4 |
| R3F3 | 1 | 1 | 0 | 1 | 0 | 0 | 0 | 0 | 1 | 0 | 0 | 1 | 1 | 0 | 0 | 6 |
| R4F1 | 0 | 1 | 1 | 0 | 1 | 1 | 0 | 0 | 1 | 0 | 0 | 0 | 0 | 0 | 1 | 6 |
| R4F2 | 1 | 0 | 1 | 1 | 0 | 1 | 0 | 0 | 0 | 0 | 0 | 0 | 0 | 0 | 0 | 4 |
| R4F3 | 1 | 1 | 0 | 1 | 1 | 0 | 1 | 0 | 0 | 0 | 0 | 0 | 1 | 0 | 0 | 6 |
| R5F1 | 0 | 1 | 1 | 0 | 1 | 1 | 0 | 1 | 1 | 0 | 0 | 1 | 0 | 0 | 0 | 7 |
| R5F2 | 1 | 0 | 1 | 1 | 0 | 1 | 1 | 0 | 1 | 0 | 0 | 0 | 0 | 0 | 0 | 6 |
| R5F3 | 1 | 1 | 0 | 1 | 1 | 0 | 1 | 1 | 0 | 1 | 0 | 0 | 0 | 0 | 0 | 7 |

In an RFID system in which a reader's frequency of transmission cannot be directly controlled, successive frequency channel selections for a particular reader can be anticipated based on the number of reader transmissions and the particular frequency hopping algorithm employed. In the event two or more readers are expected to interfere with each other based on the anticipated frequency selections, the interrogation scheduler sub-component (included in the reader coordination component 460; see FIG. 4b) can select one of the readers for transmission, and delay the transmissions of the other readers until the transmission of the selected reader is completed, thereby preventing potentially colliding reader transmissions. During the next available time slot, the next transmission required of the original group of transmissions that would otherwise have collided may go out on that same frequency.

It is noted that the operation of the interrogation scheduler sub-component can be further refined when readers effectively operate as their own radars, thereby reducing the RF interference baseline and increasing the overall system capacity. In a radar mode of operation, a reader operates on a low duty cycle relative to the tag flux in a particular location. Although reader co-interference can still occur, the mean value of the number of interference occurrences can be reduced. In this refinement of the scheduler operation, radar-type sampling rates and transmit power levels are initially low but sufficient to detect and respond to a tag entering the interrogation zone of a reader or co-interrogation zone of a set of readers, and then adapt (e.g., by increasing duty cycles and/or transmit power levels) as needed based on the results obtained from those samples. In one embodiment, sampling is coordinated with the other readers within the site or facility. Further, the sampling rate can be empirically determined by starting high and adjusting the rate lower until it is set correctly. The following additional refinements of the scheduler operation may also be employed:

(1) A list of the sequential-interrogator-use history can be maintained to trace the sequence in which the readers observe tags as they progress through a site or facility. For example, in the event it is determined that a tag is expected to pass a (2) Upon reader deployment, the sampling rates of the readers can be progressively reduced to preset minimum levels that can be independently set for each reader, a particular application that a reader is used for, or based on cooperative interrogation requirements across the readers or the current activity level a reader is seeing if it is enabled with tags already within its field of view. In this way, an initial reader deployment and any future changes in deployment can adapt to the current activity level, thereby increasing the RF capacity. It is noted that the transmit power may also be reduced to an application or reader-specific level.

(3) As new activity occurs within the site or facility, the sampling rate of the local reader can be made to increase, overshoot, and re-adapt to, e.g., at least twice the tag arrival rate or the maximum rate that the reader can perform interrogations to account for asynchronous timing. Initially, a higher sampling rate can be used, and then reduced in response to a detected tag arrival rate.

(4) The sampling rates of one or more of the readers on the sequential-interrogator-use history list can be increased in an anticipatory manner so that they can better react to the incoming tags, thereby providing increased reaction time and reducing the burden on the readers and the reader backbone.

It is noted that the sequential-interrogator-use history list is maintained based on the activity of the physical readers. Further, using the sequential-interrogator-use history list during interrogation scheduler operations provides a look-ahead capability for the multiple coordinated readers. For example, if a first reader interrogates a tag and a second reader subsequently interrogates the same tag, then it can be expected that the next tag interrogated by the first reader will subsequently be interrogated by the second reader. By adding the first and second readers to the sequential-interrogator-use history list, such subsequent use of the second reader can be easily determined and anticipated. In addition, via the reader coordination component (see element 464 in FIG. 4c), it can be determined heuristically that if, e.g., a tag takes 3 seconds to move from the first reader to the second reader, increased RF sampling by the second reader can be delayed by a corresponding amount of time, thereby preventing the second reader from unnecessarily transmitting and contributing to the interference level within the RF domain. Moreover, information relating to the reader location can be added to the sequential-interrogator-use history list to provide indications of tag flow through a site or facility.

It is further noted that the operation of multiple readers can also be multiplexed in time with transaction-scale synchronization so that the short term average transmission time is kept low for each reader, thereby reducing the risk of RF exposure to a human operator or an animal near a transmitting antenna. For example, six readers may be dispersed on a floor space, in which each reader is scheduled to interrogate tags for ten minutes every hour. Further, the six readers are time multiplexed such that each reader operates for only one minute of contiguous time every six minutes. As a result, in this example, the total interrogation time of each reader meets the application requirements, however the specific absorption rate (SAR) that the human operator may be exposed to within the six minute time frame is reduced by a factor of six. The time of six minutes is employed in this example since this is the amount of time that the U.S. Federal Communications Commission (FCC) typically uses in determining industrial maximum permissible exposure (MPE) recommendations. It is noted that, in the event the multiple readers can service the same set of tags, the interrogation load can be suitably distributed among the readers so that the RF exposure resulting from any one reader is reduced.

In addition, the above-described techniques may be employed to coordinate readers occupying the same RF space and connected through a wired or wireless reader backbone. In one embodiment, such coordinated readers may employ antennae with adaptive nulling capability to reject transmissions from the other readers or other RF power and data sources. The adaptive nulling capability is used to prevent the transmission of RF signals in directions that would interfere with RF signals being received by another reader. For example, the direction of the null can be determined by reader-to-reader interactions, e.g., the null of a transmitting reader can be swept across a span, and the resultant signal strength and error rate at the other readers can be measured and fed back to the mid-level processor 402 for further processing. The determination of the proper null positioning can be performed during system setup or operation.

It is noted that a reader can be identified as a source of interference by measuring the interference level, determining the time and frequency of the measured interference, and associating that information with the information relating to reader transmission time and frequency control, which is stored in the mid-level processor 402. Additionally, such an interference-generating reader can be identified by placing a command or code in a proprietary or reserved field in a message packet to be transmitted by the reader. Such proprietary commands or codes will be ignored by the tags. The proprietary or reserved fields in the message packets can be used to establish an orthogonal channel of communication to other types of readers.

In the presently disclosed embodiment, the mid-level processor 402 can employ deductive logic on tag responses received by the readers 10.1-10.q, which are coordinated at the transaction level to determine the direction of movement of tagged items or individuals. Such information relating to the direction of tag movement can be used to anticipate when the tags will move through the successive interrogation zones of the readers, and the readers can be successively enabled based on this information. Further, the coordinated readers can be redundantly placed throughout the RFID environment to improve system reliability. For example, in the event the mid-level processor 402 determines that a reader is not operating properly, the processing component can shift the interrogation load to a working reader located in the same general vicinity as the inoperative reader.

The array of coordinated RFID readers can also perform fine scale compensation of the transmit carrier frequency. Specifically, one of the readers can receive an RF signal from another reader, and determine the difference between the carrier frequency of that signal and its internal oscillator frequency. The difference in the frequencies can be determined by measuring the beat frequency or by any other suitable frequency discrimination technique. Each reader in the reader array may be capable of performing this measurement, and sending the measurement results to the mid-level processor 402 to determine what fine scale compensation should be employed to correct the carrier frequencies of the readers. By adjusting the transmit carrier frequencies of the readers in the RFID environment, reader-to-reader interference may be reduced and overall system performance may be improved.

Bit-scale-synchronized modulation of the multiple reader outputs, offset in carrier frequency, can also be used to increase the average power incident on a passive tag. For example, the transmit carrier frequencies may be chosen to maximize power transfer through non-linear input stages of the tags. Synchronizing to the bit-scale results in a summation of the total power of the separate reader outputs, which is generally sufficient to power those tags that are marginally or insufficiently powered. Further, the normal backscatter mechanism of the tags will scatter a higher power level. Moreover, AM modulation techniques may be employed because the summed signals, which are bit-synchronized, will cause a change in the summed power level on the bit scale in the same manner as the individual power levels change, and will therefore be demodulated as an AM waveform. For example, the transmit carrier frequencies may be related as prime number fractional offsets from a base frequency.

As described above, the tag data processing component 452 (see FIG. 4*a*) can be coupled to the interrogation scheduler in the reader coordination component 464 (see FIG. 4*c*) to provide a tag data-to-scheduling mechanism that can improve the performance of the RFID system to achieve greater accuracy, lower latency, and greater power efficiency, as well as the elimination of unnecessary and/or redundant interrogation operations. The interrogation scheduler function is performed within the scheduler sub-component of the reader coordination component 464 (see FIG. 4*c*) included in the mid-level processor 402. The configuration elements employed by the reader coordination component 464 include the following:

(1) Elements corresponding to a physical view of the site or facility in which the readers are deployed.
   (a) A listing of the mid-level processors included in the system. The information for each of the mid-level processors includes an identifier and IP addresses, and services deployed at the respective processing component such as database services, ALE, reader operations, etc.
   (b) A listing of the readers deployed in the site or facility. The information for each of the readers includes an identifier and IP addresses, reader model capabilities (e.g., whether or not power, receive sensitivity, etc., can be manipulated for the reader), reader model characteristics (e.g., allowable power levels, receive sensitivity levels), the interface protocol employed, the administrative state (up or down), the identities of the mid-level processor and the backup mid-level processor for the reader, a listing of physical-readpoints in the reader, a listing of logical-readpoints enabled in the reader, a listing of demands configured at the logical-readpoints, and a frequency table. The listing of demands configured at the logical-readpoints determines the desired operating profile. Each of the listed demands includes a description of the RF operation requirements, e.g., duration, periodicity, type of operation, priority, etc. For a frequency hopping reader, the frequency table includes the hop sequence information. For a fixed frequency reader, the frequency table includes the set of frequencies the reader can operate in.

(2) Elements corresponding to an RF view of the site or facility in which the readers are deployed.
  (a) A listing of frequencies that can be employed. For example, such a listing can include the union of the frequency-hops and/or discrete frequencies of all of the readers deployed in the site or facility.
  (b) A co-interference matrix (as described below).
  (c) TDM clusters (as described below).

It is understood that such configuration elements can be stored in the configuration database within the reader configuration component 460 (see FIG. 4b) included in the mid-level processor 402. There are multiple ways of configuring the reader coordination component 464. The configuration elements may be determined remotely and provided to the respective mid-level processors over a network. Alternatively, the reader coordination component 464 (see FIG. 4c) configures itself automatically.

At least one operating profile can be determined for each physical-readpoint enabled within the site or facility.

It is understood that each combination of operating profile and physical-readpoint creates a logical-readpoint. As defined herein, TDM clusters are a set of logical-readpoints that have a reader-to-tag interference problem. The operation of the logical-readpoints within a TDM cluster is time-division multiplexed (TDM).

As further defined herein, a co-interference matrix includes $(L*F)^2$ entries, in which L is a number of logical readpoints, and F is a number of frequencies. A logical readpoint $L_i$ operating at frequency $F_j$ is denoted herein in product form $L_iF_j$. In the presently disclosed embodiment, the co-interference matrix is filled as follows.

(1) $(L_iF_j, L_kF_l)=1$: if logical readpoint i operating at frequency j does not interfere with logical readpoint k operating at frequency l.

(2) $(L_iF_j, L_kF_l)=0$:
  (a) if logical readpoint i operating at frequency j interferes with logical readpoint k operating at frequency l.
  (b) if i=k, i.e., it is the same logical readpoint.

It is noted that a Non-Exclusivity-Factor (NEF) of an L-F selection $L_iF_j$, i.e., $NEF(L_iF_j)$, is defined herein as the number of allowable non-interfering L-F combinations that can co-exist with $L_iF_j$.

The co-interference matrix can be generated from an isolation matrix, which is defined herein as comprising $L*L$ entries, in which L is the number of logical-readpoints. Each entry $(L_i, L_k)$ represents the computed isolation (in the frequency domain) required between two logical-readpoints to assure that they do not interfere with each other. Such interference is referred to herein as reader-to-reader interference. The isolation value is a function of the distance between the logical-readpoints, the state of the logical-readpoints, the configuration of the site or facility, and the pool of available frequencies. In the presently disclosed embodiment, each co-interference matrix entry $(L_iF_j, L_kF_l)$ is computed based on the following logic:

$$(L_iF_j, L_kF_l)=1, \text{ if } |F_j-F_l| \geq \text{IsolationMatrix}(L_i, L_k). \quad (20)$$

It is noted that the co-interference matrix can have cluster restrictions built into it. For example, if logical-readpoints $L_i$, $L_k$ are part of the same cluster of logical-readpoints, then entries $(L_iF_j, L_kF_l)$ for all $F_j$ and $F_l$ are 0; likewise, entries $(L_kF_j, L_iF_l)$ for all $F_j$ and $F_l$ are 0.

As described above, the configuration elements employed by the reader coordination component 464 (see FIG. 4c) include a listing of demands configured at the logical-readpoints, which describe the RF operation requirements, e.g., duration, periodicity, type of operation, priority, etc., of the plurality of readers within the system. The reader coordination component 464 employs these configured demands when scheduling the operation of the readers. It is noted that some of the readers in the RFID system may not be configurable to accept a read command that includes a duration value. In this case, the reader coordination component 464 sends read commands including a duration value to readers that can accept this value, and sends read commands without a duration value to readers that do not accept this value. After sending the read command, the reader coordination component 464 waits for a readComplete signal from the respective reader to transition the demand from an ON state to an OFF state. In the event the reader coordination component 464 does not receive the readComplete signal within a predetermined readTimeout value, it transitions the demand from the ON state to the OFF state. In one embodiment, the readTimeout value is selected to be 1 second longer than the timeout value used by the reader communication and discovery sub-component (see FIG. 4b) for its command-response with the respective reader.

The reader coordination component 464 is operative to adhere to the following restrictions when generating the configured demands:

(1) The reads performed by the respective readers in the system may not be preempted. This is because such readers do not typically accept a stop read command. In addition, small duration values are typically employed for low priority demands. The minimum duration and period value is limited by the reader's processing rate.

(2) Instructing a reader to read multiple RFID air protocols (e.g., the ISO 18000-6 protocol, the EPCglobal $1^{st}$ and $2^{nd}$ generation protocols) in the same read cycle can result in poor performance. A separate demand is therefore generated for each air-protocol. This translates to each read cycle singulating for only one air-protocol.

(3) The pace input employed by the tag location virtualization sub-component within the tag data processing component 452 (see FIG. 4b) determines the transit time through the reader's field of view. In one embodiment, each logical readpoint is operative to perform two read operations for each tag. The transit time determines the periodicity (P) of the demand. Because the reader coordination component 464 (see FIG. 4c) adheres to real-time constraints, the periodicity (P) is normally fixed, and the duration (D) is adjusted depending upon the cluster, the air protocols, and the number of desired reads per logical readpoint.

(4) TDM clusters force time division multiplexing across the members of each cluster. The duration of each read cycle accounts for the cluster size.

(5) Saturation of high priority demands is to be avoided, i.e., $\text{sum}(D/P) \leq 1$, in which "D" is the duration and "P" is the periodicity. At least at the cluster level, such high priority demands are managed to assure that they are not oversubscribed. It is noted that in the event a cluster has a relatively large number of members, and/or there are a relatively large number of air protocols to be monitored, such oversubscription of demands may be allowable with a minimum duration (D) equal to 1 time slot. In one embodiment, however, the periodicity (P) is not increased to keep the demands from saturating because doing so can adversely affect real time system operation.

(6) A logical readpoint can correspond to more than one location. In the event a logical readpoint corresponds to multiple locations, demands can be aggregated so that there is one demand per priority and one demand per tag protocol.

(7) The reader coordination component 464 (see FIG. 4c) schedules the operation of the readers at the resolution of a time slot, and all of the demand parameters such as the duration (D) and the periodicity (P) are expressed in terms of time slots. In one embodiment, one time slot corresponds to 100 ms.

An algorithmic description using pseudo-code of an exemplary procedure for generating demands is expressed as follows. In this exemplary procedure, "LRP" or "lrp" is a logical-readpoint, "P" is the periodicity, and "D" is the duration of the demand. The periodicity (P) and the duration (D) are expressed in terms of time slots.

```
if LRP is part of one or more low-priority locations
    y = cumulative # of air protocols to be monitored in
these
        locations
    x = MAX(y, reader processing rate)
    Create a low-priority demand = <D = 1 slot, P = x slots>
for each air protocol.
    if is LRP part of one or more high-priority locations
        x = cumulative # of air protocols to be monitored in
these locations
        pace = fastest pace amongst those locations
        switch(pace) {
            fast:       P = 10 slots
            medium:     P = 20 slots
            slow:       P = 50 slots
            custom:     user specified in terms of number of slots or
units of time.
        }
        C = Set of clusters the lrp is part of.
        N = MAX [clusSize(C(i)): 1 ≤ i ≤ |C|]
        M = # of lrps in the reader that owns this lrp
        D = MAX [(P / (alpha * x * MAX(M, N) ), 1 slot]
        where, 1 ≤ alpha ≤ 2.
    end
```

As described above, the presently disclosed system may be configured to assure redundancy via at least one working mid-level processor and at least one corresponding backup mid-level processor. Thus, each of the plurality of readers in the system may be assigned a working mid-level processor and a backup mid-level processor corresponding thereto. The working mid-level processor is referred to herein as the "owner" of the reader. Upon a failure of the working mid-level processor, the readers owned by the failed processing component are transferred to their respective backup mid-level processor. When the system selects an owner and a backup mid-level processor for a reader newly added to the system, the total loading on each mid-level processor is taken into consideration to assure proper load balancing across the respective processing components.

The total loading on a mid-level processor may be determined based on the aggregate tag flux through the readers owned by the mid-level processor, the application services enabled at the mid-level processor (e.g., database, ALE, monitoring, etc.), and the co-interrogation factor of the mid-level processor. The co-interrogation factor is a measure of the amount of co-interrogation the mid-level processor performs on the readers it owns and the readers owned by other mid-level processors, which can account for increased I/O loading. Whenever a reader(s) is added or a mid-level processor is added/deleted to/from the system, a system verification is performed to determine whether there is an adequate number of mid-level processors within the system to handle the added reader(s) or the existing readers, as applicable. Whenever a new logical-readpoint is added to the system, the reader coordination component 464 (see FIG. 4c) executes a training procedure for the logical-readpoint. During the training procedure, commands corresponding to the operating profile of the logical-readpoint are sent to the appropriate reader. If the commands are executed successfully by the reader, then that logical-readpoint is eligible for scheduling.

In one embodiment, all of the readers and mid-level processors included in the RFID system are network time protocol (NTP) synchronized. As a result, all readers scheduled by the reader coordination component 464 (see FIG. 4c) start their RF operation at substantially the same time. This effectively eliminates interference due to overlapping read time slots. For example, all of the readers can have their clocks synchronized to a common NTP server. This aids in correctly correlating tag observations across multiple readers when performing direction inferences, etc., and in synchronizing listen-before-talk (LBT) operation in European telecommunications standards institute (ETSI) environments. All of the readers are required to listen for a predetermined period of time before they are allowed to transmit. If the readers are not synchronized with each other, then a drop in throughput can result.

As described above, the tag data distribution sub-components 354.1-354.4 included in the RFID system 300 (see FIGS. 3a-3b) provide a reliable network infrastructure between the respective mid-level processors 302.1-302.4 within the system. In the presently disclosed embodiment, each of the mid-level processors 302.1-302.4 corresponds to a respective node on the network infrastructure, and one of the respective nodes operates as a leader node responsible for driving the timing in the network. In one embodiment, during each time slot, the leader node sends a slotBegin message to all of the other mid-level processors, which begin their slot processing upon receipt of the slotBegin message. After tracking the one-time transit delay from the leader node to the other mid-level processors on the network, the leader node corrects the network latency variations so that all of the mid-level processors begin their time slots at substantially the same time. It is noted that the one-time transit delay from the respective mid-level processors to the readers corresponding thereto can be tracked, and the resulting network latency variations between the respective mid-level processor and its corresponding readers can be corrected. It is appreciated, however, that in some embodiments, such correction of network latency variations between a mid-level processor and its readers may be omitted in the event the readers are configured to operate according to absolute read start-times.

An algorithmic description using pseudo-code of an exemplary procedure for synchronizing multiple mid-level processors within an RFID system, thereby correcting network latency variations between the mid-level processors, is expressed as follows. A second algorithmic description using pseudo-code also follows of an exemplary procedure for correcting network latency variation between a respective mid-level processor and its corresponding readers. In these exemplary procedures, "RFX" or "Rfx" corresponds to a respective mid-level processor or switch.

1) Initialization at the leader node maxOTTlp=0
   OTTlp(Rfx_i)=0 for all RFXs—Low pass filter value of the OTT
   delta(Rfx_i)=0 for all RFXs TO=0

2) Every slot, leader node sends beginslot message to all of the other RFXs. slotBeginTime=time at the leader node.

3) set startPhaseOneTime(leader)=slotBeginTime+delta (leader)

4) At each node i (other than the leader)

Upon receipt of the beginSlot mesg, send a calibration message back to the leader.

startPhaseOneTime(Rfx_i)=(time of receipt of beginslot from leader)+delta(Rfx_i)

5) The leader node receives the calibration message from other RFXs.

Suppose, T1(Rfx_i)=time of receipt at the leader.

For each node i, leader node maintains a MWA(moving window avg) of the OTT samples, where OTT is computed as follows:

OTT(Rfx_i)=T1(Rfx_i)−slotBeginTime
OTTlp(Rfx_i)=alpha*OTT(Rfx_i)+(1−alpha)*OTTlp (Rfx_i)

5) Update the OTT delay monitoring variables
 a) maxOTTlp=max {OTTlp}//across all RFXs
 b) delta(Rfx_i)=maxOTTlp−OTTlp(Rfx_i)//note that delta(leader)=maxOTTlp 6) Each RFX node i then sends the read command to the readers that have been scheduled. For each reader j that the read command is sent after a delay of deltaReader(reader_j).

The value of deltaReader (reader_j) is determined using the following exemplary procedure:

1) Initialization at each RFX i
maxOTTRdrlp(Rfx_i)=0//max OTT to a reader this RFX owns
maxOTTRdrlp(network)=0//network wide maximum OTT value=
MAX{maxOTTRdrlp(Rfx_i)}
OTTRdrlp(reader_j)=0 for all readers
deltaReader (reader_j)=0 for all readers 2) Each RFX_i measures periodically the OTT to each reader j that it owns. It then maintains a MWA of the OTT samples for each reader j=OTTRdrlp(reader_j)

3) Update the OTT delay monitoring variables
 a) maxOTTRdrlp(Rfx_i)=max {OTTlp across all readers that Rfx_i owns}
 b) deltaReader(reader_j)=maxOTTRdrlp(network)−OTTRdrlp(reader_j)

4) Each RFX_i sends the maxOTTRdrlp(Rfx_i) value to other RFXs

5) At each RFX_i: maxOTTRdrlp(network)= MAX{maxOTTRdrlp(Rfx_i)}

As described above, the interrogation scheduler function is performed by the reader coordination component 464 included in the mid-level processor 402 (see FIG. 4*c*). In one embodiment, when performing scheduler operations, the RF domain within the site or facility in which the readers are deployed is regarded as comprising R logical-readpoints and a corresponding set of operating frequencies F. For example, the frequencies F can be a set of discrete frequencies or a set of frequency hop sequences. Further, time is divided into a series of time slots, and each logical-readpoint i can transmit at a particular frequency during each time slot. Moreover, a domain schedule is defined herein as the sequence of logical-readpoint frequency matches over time. The domain schedule is used to determine each time slot, and the frequency at which a logical-readpoint is allowed to transmit. It is noted that there may be time slots during which a logical-readpoint is scheduled to be turned OFF.

The following technique for performing interrogation scheduler operations may be executed during each time slot by each mid-level processor 402 that is the owner of one or more readers. The time slots are kept synchronized between the multiple mid-level processors by the time synchronization sub-component included in the reader configuration component 460 (see FIG. 4*b*) of the respective mid-level processor 402. In one embodiment, this scheduler technique is a combination of hierarchical earliest deadline first and maximum matching techniques. The scheduler technique provides real-time guarantees by assuring that the deadlines of high priority demands are not violated, and provides maximum RF throughput by assuring that a maximum number of frequencies gets utilized within the network.

In the interrogation scheduling hierarchy, the first level corresponds to intra-logical-readpoint scheduling. In one embodiment, at this first level, there is a <priority, EDF (earliest deadline first)> based scheduling among the demands for a respective logical readpoint. The output of this first level is at most one demand per logical-readpoint. For example, the output of this first level of scheduling can be represented as $$<L(i), D(i), f(i)>, \qquad (21)$$

in which "L(i)" is the logical-readpoint identifier, "D(i)" corresponds to the demand details, and "f(i)" is the frequency at which this logical-readpoint will be operating if selected.

The second level of the interrogation scheduling hierarchy corresponds to intra-cluster scheduling, in which each cluster comprises multiple logical-readpoints. It is noted that there can be more than one logical-readpoint in the cluster requesting the same frequency f. Using <priority, EDF> based scheduling among such colliding logical-readpoints, it can be assured that the output of this second level is at most one demand per cluster-frequency pair. As a result, there may be multiple requests from a cluster, but to different frequencies.

The third level of the interrogation scheduling hierarchy corresponds to maximum matching between the clusters and the frequencies. As described above, there can be multiple requests from a cluster for different frequencies. Likewise, there can be multiple requests for a frequency from different clusters of logical readpoints. A maximum matching technique can be used to match a cluster to a frequency. In one embodiment, such matches are made in a globally ranked order. For example, the ranking criterion can be based on a lexicographic comparison of <NEF, priority, deadline, pBit>.

Because all of the readers sharing the same RF domain are not necessarily controlled by a single mid-level processor, the above-described hierarchical interrogation scheduling technique can be implemented in a distributed manner across multiple mid-level processors within the RFID system. The distributed implementation of the hierarchical scheduling technique can be performed in two phases. Specifically, during each time slot, each mid-level processor can perform the following operational steps:

(1) Phase 1—Pre-selecting a logical-readpoint, and broadcasting its demandStateDist to the other peer mid-level processors. The demandStateDist corresponds to state information that each mid-level processor distributes to other mid-level processors in the system, as described below.

(2) Phase 2—Collecting/aggregating the demandStateDist from the peer mid-level processors, performing a maximum matching technique, and sending appropriate interrogation scheduling commands to the readers owned by the respective mid-level processors.

Algorithmic descriptions using pseudo-code of exemplary procedures for implementing Phases 1-2 of the above-described hierarchical interrogation scheduling technique are expressed as follows. In these exemplary procedures, "LRP" or "lrp" is a respective logical-readpoint, "RFX" or "Rf x" is a respective mid-level processor, and "TAP" is a respective tag data processing component.

Phase 1

1) LRP Preselection
   a. Initialize demandStateDist: numPreselect = 0; numActive = 0;
   b. Active demand processing: Loop through activeDemandList - these are demands that are currently active at the readers locally connected to myIndex RFX.
      i. dmd ← next demand in activeDemandList
      ii. isDemandOver(dmd) ?
         1. Yes: updateDemandState(dmd)
         2. No: dmd.priority = LOW ?
            a. Yes: dmd.pBit = 1; moveToInactive(dmd);
            b. No:
               i. numActiveDemands++;
               ii. f = getNextFreq(dmd.readPoint);
               iii. Add <dmd.lrp, f> to activeListDist;
   c. Sort inactiveDemandList in the non-decreasing order of the earliest starting times of the inactive demands.
   d. Inactive Demand Processing: Loop through inactiveDemandList - these are demands that are currently inactive at the readers locally connected to myIndex RFX.
      i. dmd ← next demand in inactiveDemandList
      ii. pBit(dmd) = 1?
         1. Yes: Skip this demand.
         2. No: considerDemandForScheduling(dmd)?
            a. Yes: preselectBitVector(dmd.lrp) = 1?
               i. Yes:
                  1. oldDmd ← currently preselected demand for lrp.
                  2. cmpAndReplaceDmd (oldDmd, dmd);
               ii. No:
                  1. f = getNextFreq(dmd.readPoint);
                  2. Add <f, dmd> to preselectListDist;
                  3. set preselectBitVector(dmd.lrp) = 1;
                  4. numPreselectDemands++;
            b. No: Skip the demand;
2) Broadcast the demandStateDist = (activeListDist, preselectListDist) to peer RFXs.

Phase 2

1) Collect and aggregate the demandStateDist from peer RFXs.
2) Maximum Matching
   a. Initialize the mmState: numClusReq = 0; matchPoolSize = 0;
   b. maxMatchPool Generation: Loop through the demands in the aggregated preselectListDist
      i. dmd ← next demand in preselectListDist
      ii. f = freq(dmd); c = clusterId(dmd); n = numClusReq(f);
      iii. c ∈ clusReq(f) ?
         1. Yes:
            a. Old ← demand currently selected for the cluster-frequency pair;
            b. cmpAndReplaceMatchEntry(Old, dmd)
         2. No: Add dmd to the matchPool. numClusReq(f)++;
   c. Sort the matchPool based on the lexicographic comparison of the <NEF, priority, deadline/pBit>; if there is a tie, use the RFX index and demand ID as the tie-break in that order.
   d. Frequency isolation based pruning: In this step, we first automatically select the active demands, and prune the entries in the matchPool that cannot co-exist wit the currently active demands. Next, we go through the remaining entries in the sorted matchPool, each time selecting the entry at the top of the sorted list, and pruning the matchPool entries that cannot co-exist with the selected entry.
      i. Due to currently active demands: Loop through the demands in the aggregated activeListDist -continued 1. dmd ← next demand in activeListDist
    2. f = freq(dmd); lrp = lrp(dmd);
    3. nefIdx = NEF index of (lrp, f) in the co-interference matrix
    4. pruneEntriesMatchPool(nefIdx);
  ii. Selection of inactive demands from the matchPool:
    1. While not Done
      a. Loop through the demands in the matchPool
      b. dmd ← next demand in matchPool
      c. f = freq(dmd); lrp = lrp(dmd);
      d. nefIdx = NEF index of (lrp, f) in the co-interference matrix
      e. pruneEntriesMatchPool(nefIdx);
      f. If lrp ∈ lrpSet of myIndex RFX, moveToActive(dmd).
      g. If matchPool = empty or numIter > MAX_ITER, Done = TRUE;
3) Send commands (start RF or stop RF) to locally connected readers.
  a. For the lrps in the activeDemandList, the RFX myIndex sends a start RF command.
  b. For the lrps in the inactiveDemandList, the RFX myIndex may optionally send a stop RF command. If the implementation does not employ an explicit stop RF command, then the duration of the RF ownership for each start RF command is either implicitly apriori fixed duration (e.g., 1 time slot), or whenever the reader sends back a readComplete signal to the TAP.

Algorithmic descriptions using pseudo-code of various functions employed in the above-described exemplary procedures for implementing Phases 1-2 of the hierarchical interrogation scheduling technique are expressed as follows.

Functions

```
isDemandOver(dmd) {
1) If currTime > dmd.safeTimeOut, return Yes;
2) If dmd.readStatusCompleted, return Yes;
3) If operState(dmd.readPoint) = DOWN, return Yes;
4) If currOwnerTap(dmd.Rdr) != myIndex, return Yes;
5) If lrp.endTrigger(dmd.lrp) = TRUE, return Yes;
6) Else, return No;
}
considerDemandForScheduling(dmd) {
1) If (dmd.est > (currentTime + SLOTS_TO_CONSIDER) &&
   !requestForRead(dmd.readPoint)), return No;
2) If currOwnerTap(dmd.Rdr) != myIndex, return No;
3) If operState(dmd.readPoint) = DOWN, return No;
4) If readActivityStatus(dmd.readPoint) = BUSY, return No;
5) If areClustersActive(dmd.lrp) = Yes, return No;
6) If trainingSuccessful(dmd.lrp) = No, return No;
7) Else, return Yes;
}
requestFoRead(readPoint) {
These requests can come from the reader itself or from another
source like electric eye, motion detectors, etc.
}
updateDemandState(dmd) {
1) type(dmd) = aperiodic ?
   a. Yes: delete the demand
   b. No: update dmd.est and dmd.deadline;
      moveToInactive(dmd);
}
moveToInactive(dmd) {
1) Delete the dmd from activeDemandList;
2) Add the dmd to inactiveDemandList;
}
moveToActive(dmd) {
   1) Delete the dmd from inactiveDemandList;
   2) Add the dmd to activeDemandList;
}
isClusterActive(lrp) {
```

-continued

```
    1) For any cluster c ∈ clusSet(lrp), if
        clusterActivityBitVector(c) = 1, return TRUE;
    2) Else, return FALSE;
}
cmpAndReplaceDmd(old, new) {
    1) priority(old) = priority(new) ?
        a. Yes: priority(old) = HIGH ?
            i. Yes: deadline(old) ≦ deadline(new)?
                1. No: Replace old by new in the
                    preselectListDist;
            ii. No: pBit(old) = 0 and pBit(new) = 1 ?
                1. Yes: Replace old by new in the
                    preselectListDist;
        b. No: priority(old) = LOW ?
            i. Yes: Replace old by new in the
                preselectListDist;
}
cmpAndReplaceMatchEntry(old, new) {
    1. priority(old) = priority(new) ?
        a. Yes: priority(old) = HIGH ?
            i. Yes: deadline(old) ≦ deadline(new)?
                1. No: Replace old by new in the matchPool;
                2. Yes: deadline(old) = deadline(new) ?
                    a. Yes: Nef(old) ≦ Nef(new) ?
                        i. No: Replace old by new in the
                            matchPool;
                        ii. Yes: Nef(old) = Nef(new) ?
                            1. Yes: Use RFX id and the dmd
                                ID as the tie-breaker in
                                that order.
            ii. No: pBit(old) = 0 and pBit(new) = 1 ?
                1. Yes: Replace old by new in the matchPool.
                2. No: pBit(old) = pBit(new) ?
                    a. Yes: Nef(old) ≦ Nef(new) ?
                        i. No: Replace old by new in the
                            matchPool;
                        ii. Yes: Nef(old) = Nef(new) ?
                            1. Yes: Use RFX id and the dmd
                                ID as the tie-breaker in
                                that order.
}
pruneEntriesMatchPool(nefIdx) {
    1. coexistSet ← NEFMatrixRow(nefIdx);
    2. Prune entry E(L,f) in the matchPool, if E(L,f) is not a
        member of coexistSet;
}
```

The various data structures employed in the above-described exemplary procedures for implementing Phases 1-2 of the hierarchical interrogation scheduling technique are expressed as follows.

Scheduling Data Structures (1) numRFX: Number of RFXs (mid-level processors) in the network participating in the reader scheduling algorithm.

(2) myindex: ID of the RFX where the algorithm is being executed.

(3) lrpSet: Set of logical reader profiles (LRPs) provisioned at the RFX.

(4) numLRP: cardinality of the lrpSet.

(5) operState(i) : operational state of readpoint i.

(6) clusSet(i): The set of clusters lrp i is a member of.

A cluster is defined as a set of lrps that cannot concurrently be operated even at the maximum frequency isolation. These lrps have to be operated in a TDM (time-division multiplexed) manner. An lrp can be a member of multiple clusters.

(7) numClus(i): cardinality of clusSet(i)

(8) designatedCluster(i): One of the clusters in clusSet(i) that is the designated cluster for lrp i. This cluster ID is used when the lrp i enters the final maximum matching stage where cluster IDs are used instead of lrp IDs.

(9) totClus: Total number of clusters in the RF domain

(10) clusterActivityBitVector: Vector of width totClus bits. Bit k=1 implies that a lrp in cluster k is currently active.

(11) Demand structure:
  (a) type: periodic or aperiodic.
  (b) endTime: end time for the demand dmd.
  (c) est: earliest start time
  (d) period: For a periodic demand, it is the periodicity of the demand.
  (e) deadline: latest start time—the demand has to start by this time, else, the demand will not be fulfilled.
  (f) safeTimeOut: If a readCompleteStatus is not received for this demand from the reader by this timeout value, the RF is relinquished from the reader, and the demand is declared as over.
  (g) priority: priority
  (h) lrp: LRP at which this demand will be executed
  (i) pBit: pre-empt bit state.
  (j) Freq: This is the next frequency to be used by lrp (dmd)
  (k) clusid: This is the designated cluster for lrp (dmd)
  (l) rfx: This is the ID of the RFX where the demand was originated.
  (m) Id: ID of the demand.

(12) inActiveDemandList: List of inactive demands at the RFX.

(13) activeDemandList: List of currently active demands at the RFX.

(14) preselectBitVector: Vector of width numLRP bits. Bit k=1 implies that the logical readpoint k is preselected.

(15) demandStateDist: This is the state information that each RFX distributes to other RFXs. This state includes:
  (a) preselectListDist: List of demands that have been preselected at the RFX. This list gets distributed to the other peer RFXs.
  (b) numpreselect: cardinality of the preselectListDist set.
  (c) activeListDist: List of demands that are currently active at the RFX. This list gets distributed to the other peer RFXs.
  (d) numActive: cardinality of the activeListDist set.

(16) NEF (L,f): Non-exclusivity factor of the tuple <L, f>, where L=lrpID, and f=frequency. This is explained in the next section.

(17) maxMatchState: This is the state information maintained during each execution of the maximum matching algorithm.
  (a) clusReq (f): Set of clusters that are requesting for freq f.
  (b) numClusReq (f): Cardinality of the set clusReq(f)

The configurable parameter employed in the above-described exemplary procedures for implementing Phases 1-2 of the hierarchical interrogation scheduling technique is expressed as follows.

Parameter

SLOTS_TO_CONSIDER: This parameter defines the number of time slots into the future for which the algorithm considers demands in the current scheduling round.

Figure 20:
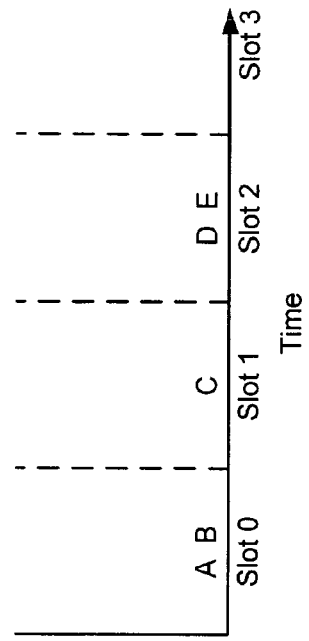
FIG. 20 is a diagram illustrating representative reader operation demands having estimated start times falling in different time slots.

The operation of the above-described exemplary procedure for implementing the hierarchical interrogation scheduling technique, which employs the configurable parameter SLOTS_TO_CONSIDER, will be better understood with reference to the following illustrative example and FIG. 20. FIG. 20 depicts a plurality of reader operation demands A-E having estimated start times (est) falling in different time slots. In this example, if the parameter SLOTS_TO_CONSIDER equals zero, then in slot i only the demands A and B are considered by the interrogation scheduling technique. If SLOTS_TO_CONSIDER equals 1, then in slot i only the demands A, B, and C are considered by the interrogation scheduling technique. If SLOTS_TO_CONSIDER=2, then in slot i all of the demands A-E are considered by the interrogation scheduling technique. Accordingly, the parameter SLOTS_TO_CONSIDER effectively provides a dial-knob to control visibility into the future for the interrogation scheduling algorithm.

In addition, the reader coordination sub-component 464 also determines the air-protocol specific parameters to be used during each inventory round. For example, for the EPC-Global Class 1 Gen 2 protocol, the reader coordination sub-component 464 determines parameters like session number, RF link (forward/reverse) attributes (e.g., rate, frequency, modulation), singulation parameters (e.g., Q, tag filters based on tag memory and/or state (e.g., inventoried state)) to be used by the reader. In an RFID environment comprising of plurality of readers interrogating a common set of tags, use of session numbers and time-division multiplexing of the RF usage amongst the readers, results in these tags getting inventoried by these readers in a concurrent yet collaborative manner. Also determined are the tag filter patterns to use during the air-protocol operations. Specifically, pre-acquisition tag filters are used to limit the number of tags that respond to the reader's air-protocol commands. This aids in improving the overall air-protocol performance of the system.

As described above, the reader 220 of FIG. 2b can respond substantially immediately to commands provided by a mid-level processor 402 for the purpose of reactive control. In a further embodiment, the presently disclosed system is operative to provide reactive RF management. Specifically, the mid-level processor 402 included in the RFID system is operative to enable macro-level coarse control of reader operations based on predefined workflows within a site or facility in which the readers are deployed. In one embodiment, the mid-level processor 402 effectively learns the predefined workflows over a period of time. In an alternative embodiment, a system user can provide information relating to the various predefined workflows directly to the mid-level processor. Reactive RF management is implemented by changing the RF demands of a reader based on one or more triggers. As described above, such triggers can relate to time, or correspond to analog events generated by proximity detectors (e.g., non-reader transducers such as electric eyes, pressure sensors, mechanical switches, etc.) or any other suitable event, e.g., tag observations in specified locations within the site or facility.

Each reader can have multiple operating profiles. Each operating profile is an attribute of a location, i.e., all of the readers in a particular location operate at the same profile. For example, each reader can have three operating profiles including an OFF mode, a radar mode, and an active mode. In the OFF mode, the reader is turned OFF. In the radar mode, the reader operates on a low duty cycle relative to the tag flux in the particular location. It is noted that appropriate radar demands can be provisioned at the respective readers. In the active mode, the reader is servicing the demands that have been provisioned at the reader. These demands operate to assure that the maximum tag flux demands of the location are satisfied.

Dynamic transitions from one operating profile to another are based on one or more triggers. In one embodiment, macro-level coarse control of reader operation is achieved via a control layer that conceptually resides above the fine-grained real-time scheduler layer implemented by the scheduler sub-component of the reader coordination component 464 (see FIG. 4c). This control layer determines the operating profile(s) of the readers owned by the mid-level processor. The demands corresponding to that profile are provided as input to the reader scheduler. The control logic may be implemented in the reader configuration component 460.

In one embodiment, each trigger has a form that can be expressed as $$\langle \text{Tag patterns, Time delay} \rangle, \qquad (22)$$

in which "Tag patterns" are the bit-field description of the tags traversing a path, and "Time delay" is the time required for those tags to go from a start-point location to an end-point location in the site or facility in which the readers are deployed. The default values of these trigger fields can be as follows.

(1) Tag patterns=* (i.e., wildcard)
(2) Time delay=a value that can determined from the pace and distance between the respective locations. It is noted that the default value of an operating profile is ACTIVE.

Based on the above, the following information is configured for the readers disposed in each location of the site:

(1) Operating profile (OFF/Radar/Active)
(2) The trigger for transitioning from OFF mode to Radar mode, and from Radar mode to OFF mode.
(3) The trigger for transitioning from Radar mode to Active mode, and from Active mode to Radar mode.
(4) The trigger for transitioning from OFF mode to Active mode, and from Active mode to OFF mode.

It is understood that a location need not have all of the three profiles OFF/Radar/Active enabled. Depending upon the number of profiles that are enabled at a location, the trigger count is adjusted accordingly. If no triggers are specified, then the default operating profile ACTIVE can be employed.

As described above, triggers can also correspond to tag observations occurring in specified locations within a site or facility. For example, an observation-based trigger can operate as follows. If one or more tags matching a particular tag filter characteristic are observed at location X, then change the reader operating profile from OFF to Active in location Y at a time T delayed by a predetermined time offset from the current time. In one embodiment, the readers deployed in location X and location Y are owned by the same mid-level processor 402. In another embodiment, the readers deployed in locations X and Y are owned by a plurality of mid-level processors. For example, a mid-level processor can monitor the RFID environment to observe one or more tags in location X, and upon observing activity of such tags in location X, provide an activity event message to the reader coordination component included therein (see, e.g., the reader coordination component 464 of FIG. 4c). It is understood that the reader coordination component 464 (see FIG. 4c) may be implemented in another mid-level processor, in which case the activity event message is sent to the other mid-level processor via the respective tag data distribution sub-components of the tag information services components 454 (see FIG. 4a). The reader coordination component 464 then takes the appropriate action of changing the reader operating profile for location Y. It is noted that the reader coordination component 464 requires information relating to the mapping of the logical readpoints to the respective locations. Such mapping information can be obtained by the reader coordination component 464 from the configuration database within the reader configuration component 460 (see FIG. 4b).

In addition, triggers can also correspond to tag observations occurring at specified times within the site or facility. For example, a time-based trigger can operate as follows. Remain in the Active reader operating profile for a predetermined period of time, and upon the expiration of the predetermined time period, change the reader operating profile from Active to Radar. Further, upon observing predefined tag activity in a specified location, change the reader operating profile from Radar back to Active, remain in the Active operating profile for the predetermined time period, and change the reader operating profile from Active to Radar again when the time period expires.

Configuration Management

The RFID system 300 (see FIGS. 3a-3b) includes the RFID readers 10.1-10.q, the mid-level processors 302.1-302.4, the host computers 14.1-14.r running client applications, and the host computer 370 providing software configuration tools for configuring the system. A software configuration management system may be provided to assure that the RFID system described herein is flexible enough to be employed in different RFID environments and with different applications, or to be operated in a manner desired or required by a particular user or organization. The configuration management system is operative to provide views of configuration data from three different perspectives, namely, a physical perspective, a coverage perspective, and a location perspective. These three different perspectives of the configuration data can be employed to generate abstract data representations that are amenable to graphical display and editing and are intuitive to a system user. Such abstract data representations can also be employed to facilitate any necessary conversions of the configuration data to forms appropriate for use by the respective client applications.

Figure 12:
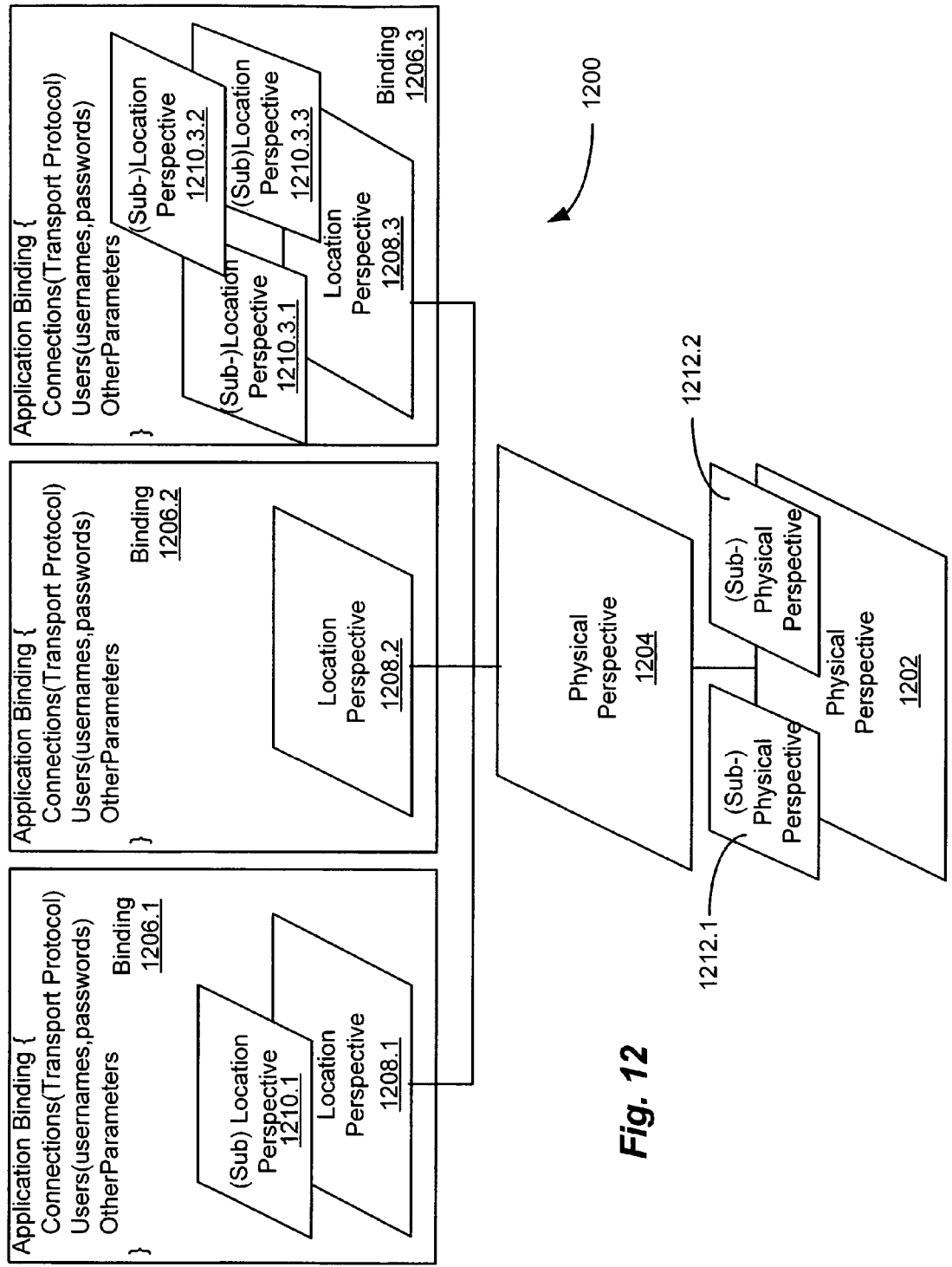
FIG. 12 is a conceptual view of the interrelationships of physical, coverage, and location perspectives of the configuration data employed by a configuration management system employed by the system of FIGS. 3a-3b.

FIG. 12 depicts a conceptual view 1200 of the interrelationships of the physical, coverage, and location perspectives of the configuration data. As shown in FIG. 12, there is one physical perspective 1202 of the data. In one embodiment, the physical perspective 1202 corresponds to an actual site or facility or a portion thereof, and relates to data describing the physical layout of the site or facility and its contents and the readers and associated antennae deployed (or intended to be deployed) therein. It is noted that the physical layout of the site or facility can be derived from a 2 or 3-dimensional floor plan. The physical perspective 1202 can be used to provision the placement, orientation, and configuration of the readers and associated antennae, and the placement of the location benchmark tags.

As further shown in FIG. 12, the conceptual view 1200 of the configuration data includes a coverage perspective 1204, which is bound to the physical perspective 1202. The coverage perspective 1204 relates to data corresponding to the results of computation, modeling, testing, and/or tuning of the readers within the site or facility. The data viewed from the coverage perspective 1204 can be used to determine the RF coverage of each of the readers and associated antennae and/or the cumulative RF coverage of all or a subset of the readers and associated antennae, and to assess the adequacy of the system coverage relative to the demands of the client applications.

FIG. 12 also depicts within the conceptual view 1200 a plurality of application bindings 1206.1-1206.3, which are overlaid on the physical and coverage perspectives 1202, 1204. Each of the application bindings 1206.1-1206.3 includes the connection data (e.g., transport and protocol data), the user data (e.g., usernames and passwords), and other parameters necessary to communicate the data processed and produced by each mid-level processor to the respective client applications. It is noted that while an application binding is normally in the service of a single client application, in some embodiments, one application binding may serve multiple client applications e.g., in the event the data it produces is distributed by a messaging software layer.

In the presently disclosed embodiment, each of the application bindings 1206.1-1206.3 supports one or more location perspectives such as locations perspectives 1208.1-1208.3. Each of the location perspectives 1208.1-1208.3 relates to data defining one or more 2-dimensional or 3-dimensional geometric locations that are logically superimposed onto the underlying physical and coverage perspectives 1202, 1204. For example, the location perspectives 1208.1-1208.3 may be designed by a system user using any suitable graphical or programmable user interface, and may be freely layered over the physical perspective 1202 or placed over or within the other location perspectives. When so layered, the location perspectives 1208.1-1208.3 may overlap or may be disjoint. This layering capability of the location perspectives 1208.1-1208.3 allows the user to create and employ template location perspectives, which may be reused within the site or facility or across multiple sites within an enterprise, thereby streamlining the work of deploying RFID systems across a multi-site campus.

It is noted that the multiplicity of locations defined within the location perspectives 1208.1-1208.3 may be used to convey configuration parameters to the interrogation scheduling functions in a user-friendly form (e.g., pace and priority), and to the tag data processing functions for controlling the processing of tag data collected from the respective locations. Such configuration parameters are bound to either a location in its entirety or to specific location boundaries.

Figure 26:
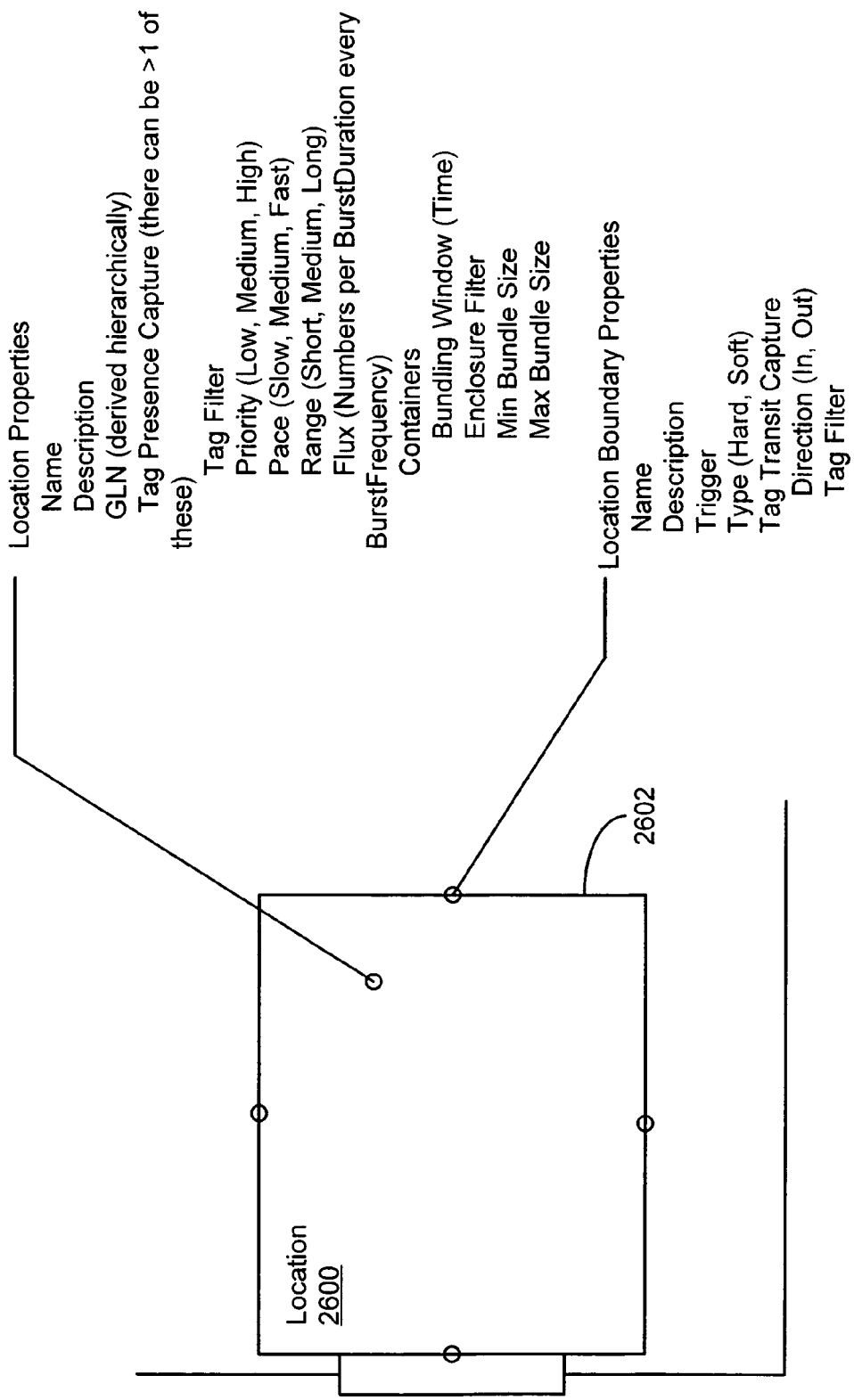
FIG. 26 is a diagram illustrating a representative location within an RFID environment and its associated location and boundary properties.

FIG. 26 depicts an illustrative location 2600 within an RFID environment. As shown in FIG. 26, the location 2600 has a rectangular shape, however, it is understood that the location 2600 may alternatively have any other suitable 2-dimensional or 3-dimensional geometric shape. In one embodiment, the configuration parameters of the location 2600 include the following location properties:

(1) Name of the Location
(2) Description of the Location
(3) Global Location Number (this number may be derived hierarchically from an enclosing location)
(4) Tag Presence Capture (there can be one or more of these)
  (a) Tag Filter Specification
    (i) Defines the type and data contents to be captured for tags detected within the boundaries of the Location
  (b) Location Priority (Low, Medium, High)
  (c) Tag Pace through the Location (Slow, Med, Fast)
  (d) Tag Range in this Location (Short, Medium, Long)
  (e) Tag Flux in this Location (Expected Number per BurstDuration every BurstFrequency)
  (f) Containerize in this Location
    (i) Bundling Window (Time) Enclosure Filter
    (ii) Min Bundle Size Max Bundle Size Further, each boundary (e.g., boundary 2602) of the location 2600 may also be independently parameterized with the following properties:

(1) Name of the Boundary
(2) Description of the Boundary
(3) Trigger Condition for the Boundary (may be an electromechanical or other type of sensor activation or a tag detection)
(4) Type of Boundary (Hard, Soft)
(5) Tag Flux across this Boundary (Expected Number per BurstDuration every BurstFrequency)
(6) Tag Transit Capture (There can be one or more of these)
  (a) Specifies the capture requirements for tags detected entering or exiting across this boundary
  (b) Direction (In, Out)
  (c) Tag Filter Specification (i) Defines the type and data contents to be captured for tags detected within the boundaries of the Location In addition, the configuration parameters may further include physical properties such as the antenna position, orientation, elevation, azimuth, and the typical range of tags from the antenna. In addition, the configuration parameters may include whether the tag reach is limited by the energizing limit or by the backscatter limit. This could be specified at the resolution of the entire RFID system, per location, or per antenna.

The presently disclosed configuration management system will be better understood with reference to the following illustrative example and FIG. 12. In this example, the physical and coverage perspectives 1202, 1204 are bound together, and the data corresponding to these perspectives is stored in a single file, e.g., MySite.rvf, which can be developed and maintained by a site designer or other suitably trained individual. In addition, the data corresponding to each of the location perspectives 1208.1-1208.3 is stored in a single file, e.g., DockDoors.rvl, which can be developed and maintained by an application designer or other suitably trained individual. Each file containing data corresponding to a respective one of the location perspectives 1208.1-1208.3 has its own history, utility, and reusability. The location perspectives 1208.1-1208.3 specify the physical extent of the locations, data capture specifications (including tag filtering parameters), and event generation specifications. It is understood that the data corresponding to the physical, coverage, and location perspectives may alternatively be stored in any suitable data structure.

It is noted that each of the location perspectives 1208.1-1208.3 may be designated as a base location perspective, and one or more sub-location perspectives may be conceptually placed on each base location perspective. For example, a sub-location perspective 1210.1 may be placed on the location perspective 1208.1, and sub-location perspectives 1210.3.1, 1210.3.2, 1210.3.3 may be placed on the location perspective 1208.3. Each sub-location perspective may be placed on a respective location perspective multiple times in an overlapping or disjoint manner. Similarly, one or more sub-physical perspectives 1212.1, 1212.2 may be conceptually placed on the physical perspective 1202 in an overlapping or disjoint manner.

Figure 13:
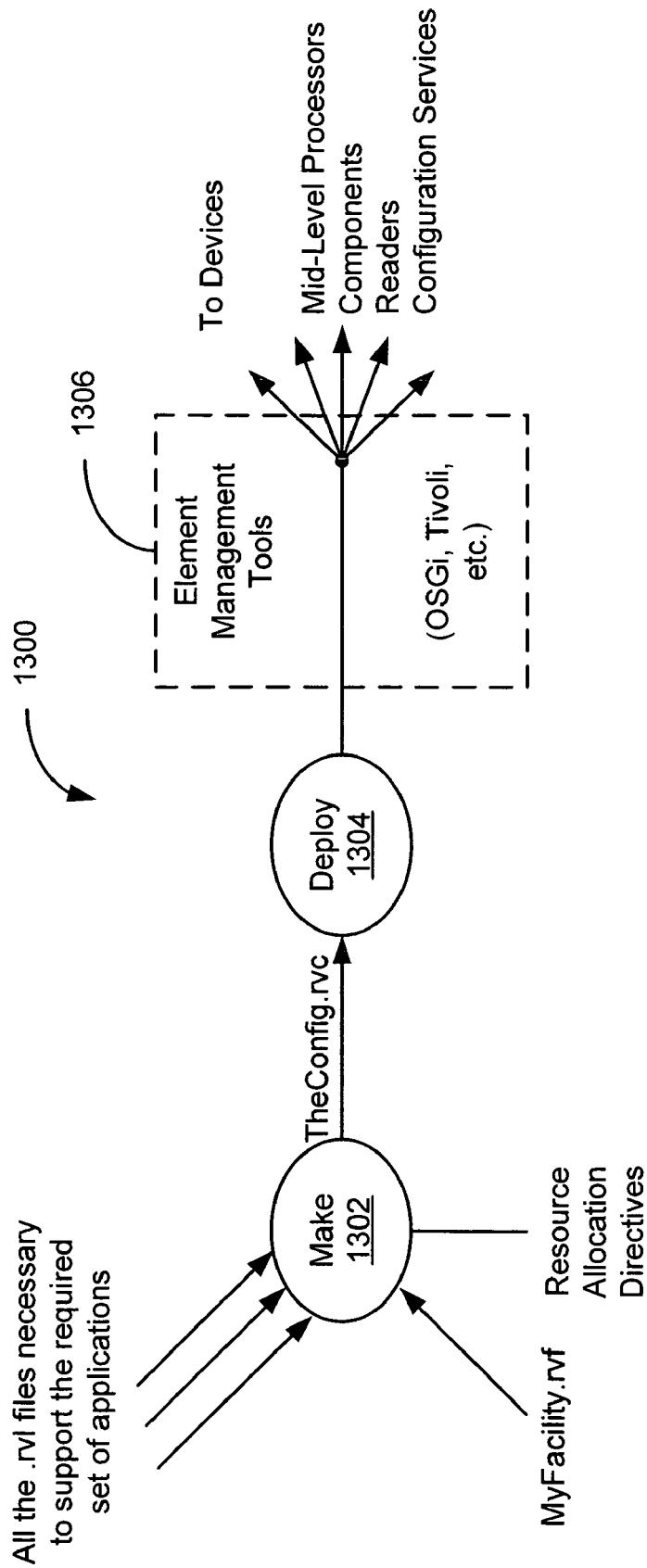
FIG. 13 is a diagram of a workflow that can be generated to create an operational set of configuration data for the system of FIGS. 3a-3b.

FIG. 13 depicts an illustrative workflow 1300 that may be generated to create an operational set of configuration data for the RFID system described herein. The illustrative workflow 1300 allows the various configuration elements to be developed independently by multiple site and client application designers within an organization. In the illustrated embodiment, the workflow 1300 operates on the following predefined file types:

(1) *.rvl file—Contains an application binding and data corresponding to one or more location perspectives. Each .rvl file may reference or incorporate other layered .rvl files. Further, each .rvl file employed within the RFID system is typically owned by a client application designer.

(2) *.rvf file—Contains data corresponding to the physical and coverage perspectives for the RFID system. Typically, there is one .rvf file defined for each physical site, however there may be more than one .rvf file if the readers deployed within the site do not share an RF domain. The .rvf file is typically owned by the site designer.

(3) *.rvc file—Contains the complete set of mid-level processor and reader configuration data that is ultimately loaded onto the RFID system to make the system operational.

As shown in FIG. 13, the workflow 1300 incorporates the following two facilities:

(1) Make facility 1302—A software facility that imports the system .rvf file, e.g., MySite.rvf, one or more .rvl files, e.g., DockDoors.rvl, and system resource allocation directives, which provide information on system-level hosting and redundancy preferences. The Make facility processes these inputs and produces the system .rvc file, e.g., TheConfig.rvc.

(2) Deploy facility 1304—A software facility that stores and disseminates the configuration data from the .rvc file to the various components and devices that comprise the RFID system either directly or through services offered by element management tools 1306 such as network registries and naming and host configuration servers and agents. The element management tools may comprise OSGi (Open Services Gateway Initiative) compatible management tools, Tivoli® management tools, or any other suitable element management tools. The Deploy facility 1304, either directly or via the element management tools, provides continuous access to the disseminated configuration data so that when mid-level processors, configuration services, and reader devices are added, replaced, or reconfigured within the system, they have immediate access to this data.

It is noted that the system configuration data may be stored within each mid-level processor in source form (.rvl and .rvf files), processed from (.rvc files), and/or in a disseminated form. It is appreciated that the above-described configuration management system may be employed within the confines of a single site or a multi-building or campus setting.

It will be appreciated by those of ordinary skill in the art that further modifications to and variations of the above-described interference monitoring in an RFID system including a coordinated RFID tag reader array may be made without departing from the inventive concepts disclosed herein. Accordingly, the invention should not be viewed as limited except as by the scope and spirit of the appended claims.

What is claimed is:

1. A radio frequency identification (RFID) tag data acquisition system, comprising:
 at least one RFID tag interrogator operative to transmit at least one first RF interrogation signal for interrogating RFID tags;
 a plurality of RFID receivers, each of said plurality of RFID receivers including an RF receiver component and an RF monitoring component, said RF receiver component being operative to receive RF signals including said at least one first RF interrogation signal transmitted by said RFID tag interrogator, said RF monitoring component being operative to determine at least one characteristic associated with said RF signals received by said RF receiver component; and
 a controller communicably coupled to said at least one RFID tag interrogator and said plurality of RFID receivers,
 wherein said plurality of RFID receivers are operative to generate information indicative of said at least one characteristic, and to forward said information to said controller,
 wherein said controller is operative to utilize said information in at least one of:
 a) a determination of the operational status of said at least one RFID tag interrogator;
 b) control of said at least one RFID tag interrogator;
 c) control of said RF receiver component; and
 d) control of said RF monitoring component,
 wherein each RF receiver component is operative to receive RF signals on at least one frequency channel, and wherein each RF monitoring component is operative to monitor said at least one channel for at least one external RF interference signal, and to determine at least one characteristic associated with said at least one external RF interference signal on the at least one monitored channel, wherein each RFID receiver is operative to generate information indicative of said at least one characteristic associated with the at least one external RF interference signal, and to forward said information to said controller, said controller being operative to utilize said information indicative of said characteristic associated with the external RF interference signal in at least one of the control of said RFID tag interrogator, the control of said RF receiver component, and the control of said RF monitoring component, wherein each RF receiver component has a respective channel associated therewith, wherein each RF receiver component is operative to receive RF signals on said channel associated therewith, and wherein each RF monitoring component associated with the respective RF receiver component is operative to monitor said channel for at least one external RF interference signal, and to determine at least one characteristic associated with said at least one external RF interference signal on the monitored channel, and wherein each RF monitoring component is operative, in response to monitoring at least one external RF interference signal on said channel associated therewith, to sample said at least one external RF interference signal at a predetermined sampling rate over a predetermined time interval, and wherein said information forwarded to the controller by each RFID receiver includes information indicative of at least one characteristic of the external RF interference signal sampled at the predetermined sampling rate over the predetermined time interval.

2. The system of claim 1 wherein said RF monitoring component is operative to determine at least one characteristic associated with said received first RF interrogation signal, the at least one characteristic including at least one first level associated with said received first RF interrogation signal.

3. The system of claim 2 wherein said first level associated with said received first RF interrogation signal corresponds to a first power level of the received first RF interrogation signal.

4. The system of claim 2 wherein said at least one first level associated with said received first RF interrogation signal corresponds to at least one first level of interference between said at least one RFID tag interrogator and said at least one RFID receiver.

5. The system of claim 4 wherein said RF monitoring component is operative to determine said first level of interference between said RFID tag interrogator and said RFID receiver by measuring a first power level of the received first RF interrogation signal.

6. The system of claim 4 wherein said controller is operative to utilize said information indicative of said first level of interference in the control of at least one of said RFID tag interrogator and said RF receiver component, said control of the RFID tag interrogator including scheduling at least one RF signal transmission by said RFID tag interrogator, said control of the RF receiver component including scheduling at least one RF signal reception by said RF receiver component, thereby reducing said first level of interference between said RFID tag interrogator and said RFID receiver.

7. The system of claim 1 wherein said at least one RFID tag interrogator is operative to transmit said at least one first RF interrogation signal on at least one first frequency channel, and wherein said RF receiver component is operative to receive said first RF interrogation signal on the same first channel upon which said first RF interrogation signal is transmitted by said RFID tag interrogator.

8. The system of claim 7 wherein said RF monitoring component is operative to determine at least one characteristic associated with said received first RF interrogation signal, said characteristic associated with the received first RF interrogation signal including a first level of interference between said RFID tag interrogator and said RFID receiver.

9. The system of claim 8 wherein said RF monitoring component is operative to estimate at least one characteristic associated with at least one second RF signal on at least one second frequency channel based on said first level of interference, said second channel being different from said first channel, said characteristic associated with the second RF signal on the second channel including an estimated second level of interference between said RFID tag interrogator and said RFID receiver.

10. The system of claim 7 wherein said RF receiver component is operative to receive at least one second RF signal on at least one second frequency channel, said second channel being different from said first channel, wherein said RF monitoring component is operative to determine at least one characteristic associated with said received second RF signal, and wherein said RFID receiver is operative to generate information indicative of said at least one characteristic associated with said received second RF signal, and to forward said information to the controller.

11. The system of claim 10 wherein said RF receiver component is operative to take wideband samples of said first RF interrogation signal received on said first channel and said second RF signal received on said second channel.

12. The system of claim 10 wherein said at least one characteristic associated with said received first RF interrogation signal includes at least one first level of said received first RF interrogation signal, and wherein said at least one characteristic associated with said received second RF signal includes at least one second level of said received second RF signal.

13. The system of claim 12 wherein said first level of said received first RF interrogation signal corresponds to a first level of interference between said RFID tag interrogator and said RFID receiver, and wherein said second level of said received second RF signal corresponds to a second level of interference between said RFID tag interrogator and said RFID receiver.

14. The system of claim 13 wherein said controller is operative to utilize said information indicative of said first level of interference and said information indicative of said second level of interference in the control of at least one of said RFID tag interrogator and said RF receiver component, said control of the RFID tag interrogator including scheduling at least one RF signal transmission by said RFID tag interrogator, said control of the RF receiver component including scheduling at least one RF signal reception by said RF receiver component, thereby reducing at least one of said first and second levels of interference between said RFID tag interrogator and said RFID receiver.

15. The system of claim 10 wherein said at least one second channel is adjacent to said at least one first channel upon which said RF interrogation signal is transmitted by said RFID tag interrogator.

16. The system of claim 15 wherein said at least one first channel and said at least one second channel adjacent thereto are within a specified frequency band.

17. The system of claim 15 wherein said at least one characteristic associated with said received first RF interrogation signal includes at least one first level of said received first RF interrogation signal, and wherein said at least one characteristic associated with said received second RF signal includes at least one second level of said received second RF signal.

18. The system of claim 17 wherein said first level of said received first RF interrogation signal corresponds to a first level of interference between said RFID tag interrogator and said RFID receiver, and wherein said second level of said received second RF signal corresponds to a second level of interference between said RFID tag interrogator and said RFID receiver.

19. The system of claim 15 wherein said at least one first channel comprises a plurality of first channels, wherein said at least one second channel comprises a plurality of second channels, and wherein each of the plurality of first channels is associated with at least one respective channel of the plurality of second channels.

20. The system of claim 19 wherein each association of a respective first channel with at least one respective channel of the plurality of second channels corresponds to a specified subband of frequencies.

21. The system of claim 20 wherein said at least one characteristic associated with said received first RF interrogation signal includes at least one first level of said first RF interrogation signal received on said respective first channel, and wherein said at least one characteristic associated with said received second RF signal includes at least one second level of said second RF signal received on said at least one respective channel of the plurality of second channels.

22. The system of claim 21 wherein said first level of said received first RF interrogation signal corresponds to a first level of interference between said RFID tag interrogator and said RFID receiver, and wherein said second level of said received second RF signal corresponds to a second level of interference between said RFID tag interrogator and said RFID receiver.

23. The system of claim 22 wherein said controller is operative to utilize said information indicative of said first level of interference and said information indicative of said second level of interference in the control of at least one of said RFID tag interrogator and said RF receiver component, said control of the RFID tag interrogator including scheduling at least one RF signal transmission by said RFID tag interrogator, said control of the RF receiver component including scheduling at least one RF signal reception by said RF receiver component, thereby reducing at least one of said first and second levels of interference between said RFID tag interrogator and said RFID receiver.

24. The system of claim 23 wherein said controller is operative to compare said information indicative of said second level of interference with a predetermined threshold level to determine whether said second interference level exceeds said predetermined threshold level.

25. The system of claim 24 wherein said predetermined threshold level is fixed.

26. The system of claim 24 wherein said predetermined threshold level is variable.

27. The system of claim 1 wherein each RF receiver component is operative to receive a respective RF signal on a respective frequency channel, and wherein each RF monitoring component is operative to determine at least one characteristic associated with the respective RF signal received by the RF receiver component on the respective frequency channel.

28. The system of claim 27 wherein the respective channels upon which said RF receiver components receive the respective RF signals are within a specified frequency band.

29. The system of claim 27 wherein said at least one characteristic includes at least one power level of the respective RF signal received by the RF receiver component on the respective channel.

30. The system of claim 29 wherein the RF monitoring components are operative to normalize the power levels of the respective RF signals received by the RF receiver components on the respective channels.

31. The system of claim 1 wherein each RF receiver component is operative to receive RF signals on an associated plurality of frequency channels, and wherein each RF monitoring component is operative to determine at least one characteristic associated with the RF signals received by the RF receiver component on the plurality of channels associated therewith.

32. The system of claim 31 wherein each plurality of channels associated with a respective RF receiver component is within a specified subband of frequencies.

33. The system of claim 31 wherein the at least one characteristic includes at least one power level of the RF signals received by the RF receiver component on the plurality of channels associated therewith.

34. The system of claim 33 wherein the at least one characteristic includes an aggregate of the power levels of the RF signals received by the RF receiver components on the pluralities of channels associated therewith.

35. The system of claim 33 wherein the RF monitoring components are operative to normalize the power levels of the RF signals received by the RF receiver components on the pluralities of channels associated therewith.

36. The system of claim 1 wherein each RF receiver component is operative to receive RF signals on an associated plurality of frequency channels, and wherein each RF monitoring component is operative to determine at least one characteristic associated with at least one RF signal received by at least a respective one of the RF receiver components on the plurality of channels associated therewith.

37. The system of claim 36 wherein said at least one characteristic associated with said at least one RF signal received by at least a respective one of the RF receiver components includes at least one level of interference between said at least one RFID tag interrogator and said plurality of RFID receivers.

38. The system of claim 37 wherein said controller is operative to utilize said information indicative of said level of interference in the control of said at least one RFID tag interrogator and in the control of the respective RF receiver components, said control of the RFID tag interrogator including scheduling at least one RF signal transmission by said RFID tag interrogator, said control of the RF receiver components including scheduling at least one RF signal reception by at least one of said RF receiver components, thereby reducing said level of interference between said RFID tag interrogator and said plurality of RFID receivers.

39. The system of claim 1 wherein said RFID tag interrogator is operative to transmit said first RF interrogation signal on at least one first frequency channel, wherein each RF receiver component is operative to receive said first RF interrogation signal on the same first channel upon which said first RF interrogation signal is transmitted by said RFID tag interrogator, and wherein each RF monitoring component is operative to determine at least one characteristic associated with the first RF interrogation signal received by a respective RF receiver component on the first channel.

40. The system of claim 39 wherein said at least one characteristic includes at least one first power level of said first RF interrogation signal received by the respective RF receiver component on the first channel.

41. The system of claim 40 wherein said controller is operative to generate at least one first power profile corresponding to said RFID tag interrogator based on a plurality of first power levels of the received first RF interrogation signal.

42. The system of claim 41 wherein said controller is operative to utilize said at least one first power profile as a baseline power profile of said RFID tag interrogator in the determination of the operational status of said RFID tag interrogator.

43. The system of claim 41 wherein said RFID tag interrogator is operative to transmit at least one second RF interrogation signal on said first channel, wherein each RF receiver component is operative to receive said second RF interrogation signal on said first channel, and wherein each RF monitoring component is operative to determine at least one characteristic associated with said received second RF interrogation signal including at least one second power level of the second RF interrogation signal received by a respective RF receiver component on the first channel.

44. The system of claim 43 wherein said controller is operative to generate at least one second power profile corresponding to said RFID tag interrogator based on a plurality of second power levels of the second RF interrogation signal, and to compare characteristics of the at least one second power profile with characteristics of the at least one first power profile in the determination of the operational status of said RFID tag interrogator.

45. The system of claim 1 wherein said RFID tag interrogator is operative to transmit a plurality of first RF interrogation signals on a plurality of first frequency channels, respectively, wherein each RF receiver component is operative to receive at least two of the first RF interrogation signals on at least two associated first channels, said at least two associated first channels being within a respective subband of frequencies, and wherein each RF monitoring component is operative to determine at least one characteristic associated with the at least two first RF interrogation signals received by a respective RF receiver component on the at least two associated first channels.

46. The system of claim 45 wherein said at least one characteristic includes at least one first power level of said at least two first RF interrogation signals received by the respective RF receiver component on the at least two associated first channels.

47. The system of claim 46 wherein said controller is operative to generate a plurality of power profiles corresponding to said RFID tag interrogator, each power profile being generated by the controller based on said first power levels of at least two first RF interrogation signals received by a respective RF receiver component on at least two associated first channels.

48. The system of claim 47 wherein said controller is operative to compare characteristics of respective ones of the plurality of power profiles in the determination of the operational status of said RFID tag interrogator.

49. The system of claim 1 wherein the respective channels associated with the RF receiver components are within a specified frequency band.

50. The system of claim 1 wherein the RF monitoring components are operative to monitor the channels associated with the corresponding RF receiver components simultaneously.

51. The system of claim 1 wherein said at least one characteristic associated with said at least one external RF interference signal includes at least one power level of the external RF interference signal.

52. The system of claim 51 wherein the RF monitoring components are operative to normalize the power levels of said external RF interference signals on the respective channels associated therewith.

53. The system of claim 1 wherein the predetermined sampling rate is greater than or equal to a Nyquist sampling rate.

54. The system of claim 1 wherein said information forwarded to the controller by each RFID receiver includes information indicative of at least one time domain characteristic of the external RF interference signal sampled by the RF monitoring component on the channel associated therewith.

55. The system of claim 1 wherein said information forwarded to the controller by each RFID receiver includes information indicative of at least one frequency domain characteristic of the external RF interference signal sampled by the respective RF monitoring component.

56. The system of claim 1 wherein said controller is operative to utilize said information indicative of the at least one characteristic of the external RF interference signal in the control of said RFID tag interrogator and in the control of at least one of the RF receiver components, said control of the RFID tag interrogator including scheduling at least one RF signal transmission by said RFID tag interrogator, and said control of at least one of said RF receiver components including scheduling at least one RF signal reception by the at least one RF receiver component.

57. The system of claim 1 wherein each RF receiver component is operative to receive RF signals on an associated plurality of channels, and wherein each RF monitoring component is operative to monitor the associated plurality of channels for at least one external RF interference signal, and to determine at least one characteristic associated with said at least one external RF interference signal on the plurality of channels associated therewith.

58. The system of claim 57 wherein the plurality of channels associated with each RF receiver component is within a specified subband of frequencies.

59. The system of claim 1 wherein each RF receiver component is operative to receive RF signals on an associated plurality of channels over a predetermined time interval, the RF receiver components receiving said RF signals on said channels associated with the corresponding RF receiver components at staggered time intervals, and wherein each RF monitoring component is operative to monitor said associated plurality of channels for at least one external RF interference signal, and to determine at least one characteristic associated with said at least one external RF interference signal on the plurality of channels associated therewith.

60. The system of claim 1 wherein said controller is operative to store at least one value of at least one frequency of transmission of said RFID tag interrogator, and to determine an identity of said RFID tag interrogator transmitting the first RF interrogation signal using said at least one stored value of transmission frequency.

61. The system of claim 60 wherein said controller is operative to determine the identity of said RFID tag interrogator transmitting the first RF interrogation signal using time causality relationships.

62. The system of claim 60 wherein said first RF interrogation signal has an identifying signal included therein, and wherein said controller is operative to determine the identity of said RFID tag interrogator transmitting the first RF interrogation signal by detecting the identifying signal included in said first RF interrogation signal.

63. The system of claim 1 wherein the at least one RFID receiver includes an RF transmitter component operative to transmit at least one second RF signal, and wherein the RFID tag interrogator includes an RF receiver component operative to receive said at least one second RF signal.

64. The system of claim 63 wherein the RFID tag interrogator includes an RF monitoring component, wherein the RF monitoring component included in the RFID receiver is operative to determine at least one power level associated with said first RF interrogation signal, and wherein the RF monitoring component included in the RFID tag interrogator is operative to determine at least one power level associated with said second RF signal.

65. The system of claim 64 wherein said RFID receiver and said RFID tag interrogator are operative to generate information indicative of said at least one power level of said received first and second RF signals, respectively, and to forward said information to said controller.

66. The system of claim 65 wherein said controller is operative to compare the power level of said received first RF interrogation signal with the power level of said received second RF signal in the determination of the operational status of said RFID tag interrogator.

67. A radio frequency identification (RFID) tag data acquisition system, comprising:
at least one RFID tag interrogator operative to transmit at least one first RF interrogation signal for interrogating RFID tags;
a plurality of RFID receivers, each of said plurality of RFID receivers including an RF receiver component and an RF monitoring component, said RF receiver component being operative to receive RF signals including said at least one first RF interrogation signal transmitted by said RFID tag interrogator, said RF monitoring component being operative to determine at least one characteristic associated with said RF signals received by said RF receiver component; and
a controller communicably coupled to said at least one RFID tag interrogator and said plurality of RFID receivers,
wherein said plurality of RFID receivers are operative to generate information indicative of said at least one characteristic, and to forward said information to said controller,
wherein said controller is operative to utilize said information in at least one of:
a) a determination of the operational status of said at least one RFID tag interrogator;
b) control of said at least one RFID tag interrogator;
c) control of said RF receiver component; and
d) control of said RF monitoring component,
wherein each RF receiver component is operative to receive RF signals on at least one frequency channel, and wherein each RF monitoring component is operative to monitor said at least one channel for at least one external RF interference signal, and to determine at least one characteristic associated with said at least one external RF interference signal on the at least one monitored channel,
wherein each RFID receiver is operative to generate information indicative of said at least one characteristic associated with the at least one external RF interference signal, and to forward said information to said controller, said controller being operative to utilize said information indicative of said characteristic associated with the external RF interference signal in at least one of the control of said RFID tag interrogator, the control of said RF receiver component, and the control of said RF monitoring component,
wherein each RF receiver component is operative to receive RF signals on an associated plurality of channels, and wherein each RF monitoring component is operative to monitor the associated plurality of channels for at least one external RF interference signal, and to determine at least one characteristic associated with said at least one external RF interference signal on the plurality of channels associated therewith, and
wherein each RF monitoring component is operative, in response to monitoring at least one external RF interference signal on at least one of the plurality of channels associated with the respective RF receiver component, to sample said at least one external RF interference signal at a predetermined sampling rate over a predetermined time interval, and wherein said information forwarded to the controller by each RFID receiver includes information indicative of at least one characteristic of the external RF interference signal sampled at the predetermined sampling rate over the predetermined time interval.

68. The system of claim 67 wherein the predetermined sampling rate is greater than or equal to a Nyquist sampling rate.

69. The system of claim 67 wherein said information indicative of said at least one characteristic of the external RF interference signal samples includes time domain signal sample information, and wherein said controller is operative to transform said time domain information to frequency domain information.

70. The system of claim 67 wherein said controller is operative to utilize said information indicative of the at least one characteristic of the external RF interference signal in the control of said RFID tag interrogator and in the control of at least one of the RF receiver components, said control of the RFID tag interrogator including scheduling at least one RF signal transmission by said RFID tag interrogator, said control of at least one of the RF receiver components including scheduling at least one RF signal reception by the at least one RF receiver component.

71. A radio frequency identification (RFID) tag data acquisition system, comprising:
at least one RFID tag interrogator operative to transmit at least one first RF interrogation signal for interrogating RFID tags;
a plurality of RFID receivers, each of said plurality of RFID receivers including an RF receiver component and an RF monitoring component, said RF receiver component being operative to receive RF signals including said at least one first RF interrogation signal transmitted by said RFID tag interrogator, said RF monitoring component being operative to determine at least one characteristic associated with said RF signals received by said RF receiver component; and
a controller communicably coupled to said at least one RFID tag interrogator and said plurality of RFID receivers,
wherein said plurality of RFID receivers are operative to generate information indicative of said at least one characteristic, and to forward said information to said controller,
wherein said controller is operative to utilize said information in at least one of:

a) a determination of the operational status of said at least one RFID tag interrogator;
b) control of said at least one RFID tag interrogator;
c) control of said RF receiver component; and
d) control of said RF monitoring component, wherein each RF receiver component is operative to receive RF signals on at least one frequency channel, and wherein each RF monitoring component is operative to monitor said at least one channel for at least one external RF interference signal, and to determine at least one characteristic associated with said at least one external RF interference signal on the at least one monitored channel, wherein each RFID receiver is operative to generate information indicative of said at least one characteristic associated with the at least one external RF interference signal, and to forward said information to said controller, said controller being operative to utilize said information indicative of said characteristic associated with the external RF interference signal in at least one of the control of said RFID tag interrogator, the control of said RF receiver component, and the control of said RF monitoring component, wherein each RF receiver component is operative to receive RF signals on an associated plurality of channels over a predetermined time interval, the RF receiver components receiving said RF signals on said channels associated with the corresponding RF receiver components at staggered time intervals, and wherein each RF monitoring component is operative to monitor said associated plurality of channels for at least one external RF interference signal, and to determine at least one characteristic associated with said at least one external RF interference signal on the plurality of channels associated therewith, and wherein each RF monitoring component is operative, in response to monitoring at least one external RF interference signal on said plurality of channels, to sample said at least one external RF interference signal at a predetermined sampling rate over the predetermined time interval, and wherein said information forwarded to the controller by each RFID receiver includes information indicative of at least one characteristic of the external RF interference signal sampled at the predetermined sampling rate over the predetermined time interval.

72. The system of claim 71 wherein the predetermined sampling rate is greater than or equal to a Nyquist sampling rate.

73. The system of claim 71 wherein said information forwarded to the controller by each RFID receiver includes information indicative of at least one time domain characteristic of the external RF interference signal sampled by the RF monitoring component on the respective plurality of channels.

74. The system of claim 71 wherein said information forwarded to the controller by each RFID receiver includes information indicative of at least one frequency domain characteristic of the external RF interference signal sampled by the RF monitoring component on the respective plurality of channels.

75. The system of claim 71 wherein said controller is operative to utilize said information indicative of the at least one characteristic of the external RF interference signal in the control of said RFID tag interrogator and in the control of at least one of the RF receiver components, said control of the RFID tag interrogator including scheduling at least one RF signal transmission by said RFID tag interrogator, and said control of at least one of said RF receiver components including scheduling at least one RF signal reception by the at least one RF receiver component.

* * * * *